(12) United States Patent
Biba et al.

(10) Patent No.: US 7,089,718 B2
(45) Date of Patent: Aug. 15, 2006

(54) APPARATUS FOR HEAT-SHRINKING FILM ONTO AN OPEN-TOPPED CONTAINER AND METHOD OF USING SAME

(75) Inventors: Scott I. Biba, Highland, WI (US); Robert J. Aloisi, Sheboygan Falls, WI (US); Christopher L. Jones, Waunakee, WI (US); Robert A. Hamersma, Gainesville, FL (US); Douglas E. Seals, Oregon, WI (US); William J. Bakker, Orangeville (CA); Noel A. Williams, Toronto (CA)

(73) Assignee: Green-Line Products, Inc., Mississauga (CA)

( * ) Notice: Subject to any disclaimer, the term of this patent is extended or adjusted under 35 U.S.C. 154(b) by 27 days.

(21) Appl. No.: 10/359,119

(22) Filed: Feb. 5, 2003

(65) Prior Publication Data

US 2004/0020172 A1    Feb. 5, 2004

Related U.S. Application Data

(60) Provisional application No. 60/387,527, filed on Jun. 10, 2002, provisional application No. 60/387,366, filed on Jun. 10, 2002, provisional application No. 60/387,339, filed on Jun. 10, 2002, provisional application No. 60/387,337, filed on Jun. 10, 2002.

(51) Int. Cl.
*B65B 53/02* (2006.01)
*B65B 51/10* (2006.01)

(52) U.S. Cl. .................... 53/557; 53/329.2; 53/329.5

(58) Field of Classification Search ............. 53/557, 53/281, 329.2–329.5
See application file for complete search history.

(56) References Cited

U.S. PATENT DOCUMENTS

| 208,856 | A | 10/1878 | Schumann |
|---|---|---|---|
| 586,613 | A | 7/1897 | Muslar |
| 658,710 | A | 9/1900 | Forker |
| 676,813 | A | 6/1901 | Du Brul |
| 779,991 | A | 1/1905 | Coale |
| 847,393 | A | 3/1907 | Ballard |
| 1,216,705 | A | 2/1917 | Kryzanowski |
| 1,395,584 | A | 11/1921 | Kennedy et al. |
| 1,626,409 | A | 4/1927 | Gwinn |
| 1,807,274 | A | 5/1931 | Beidler |
| 1,866,369 | A | 7/1932 | Podel |
| 1,867,502 | A | 7/1932 | Edstrom |
| 1,952,196 | A | 3/1934 | Coil |

(Continued)

FOREIGN PATENT DOCUMENTS

AU          27337/67          3/1969

(Continued)

OTHER PUBLICATIONS

Search Report for PCT/Application No. US 03//15406 dated Jan. 19, 2004.

(Continued)

*Primary Examiner*—Stephen F. Gerrity
(74) *Attorney, Agent, or Firm*—Finnegan, Henderson, Farabow, Garrett & Dunner, L.L.P.

(57) ABSTRACT

A system for heat-shrinking a film onto an open-topped container is provided, including at least one reflective cup having a reflective interior surface, and at least one radiant energy source. The reflective cup and the radiant energy source may be rotationally mounted. The interior surface of the reflective cup has as least an elliptical portion and a parabolic portion.

100 Claims, 41 Drawing Sheets

U.S. PATENT DOCUMENTS

| | | | |
|---|---|---|---|
| 2,507,445 A | 5/1950 | Krueger | |
| 2,712,682 A | 7/1955 | Warner | |
| 3,069,107 A | 12/1962 | Hirt | |
| 3,100,957 A | 8/1963 | King et al. | |
| 3,243,137 A | 3/1966 | Norman | |
| 3,260,775 A | 7/1966 | Orr | |
| 3,417,979 A | 12/1968 | Cable et al. | |
| 3,445,984 A | 5/1969 | Kelly | |
| 3,506,353 A | 4/1970 | Gilchrist, Jr. | |
| 3,509,680 A | 5/1970 | Weber | |
| 3,514,299 A | 5/1970 | Thanhauser | |
| 3,545,694 A | 12/1970 | Ehrat | |
| 3,591,767 A | 7/1971 | Mudie | |
| 3,621,574 A | 11/1971 | Yanke et al. | |
| 3,625,447 A | 12/1971 | Hank | |
| 3,639,762 A | 2/1972 | Hughes | |
| 3,657,862 A * | 4/1972 | Milne | 53/329.2 |
| 3,760,154 A | 9/1973 | Konger | |
| 3,783,582 A | 1/1974 | Willvonseder | |
| 3,835,897 A | 9/1974 | Gess | |
| 3,838,805 A | 10/1974 | Amberg | |
| 3,877,200 A | 4/1975 | Feldman | |
| 3,881,379 A | 5/1975 | Stumpf | |
| 3,952,961 A | 4/1976 | Antepenko | |
| 3,955,699 A | 5/1976 | Amberg et al. | |
| 3,964,360 A | 6/1976 | Schwartz | |
| 3,977,617 A * | 8/1976 | Salmon | 242/422.6 |
| 4,011,119 A | 3/1977 | Mitchell et al. | |
| 4,050,971 A | 9/1977 | Verkins et al. | |
| 4,058,699 A | 11/1977 | van Vloten | |
| 4,070,852 A | 1/1978 | Mitchell et al. | |
| 4,092,817 A | 6/1978 | Rist, III | |
| 4,112,837 A | 9/1978 | Altman et al. | |
| 4,117,751 A | 10/1978 | Inoue | |
| 4,127,211 A | 11/1978 | Zerbey | |
| 4,130,234 A | 12/1978 | Schmidt | |
| 4,134,248 A | 1/1979 | Freeman | |
| 4,146,157 A | 3/1979 | Dixon, Sr. et al. | |
| 4,156,626 A | 5/1979 | Souder | |
| 4,184,310 A | 1/1980 | Shelby | |
| 4,184,523 A | 1/1980 | Carrigan et al. | |
| 4,186,842 A | 2/1980 | Albert | |
| 4,199,917 A | 4/1980 | Mitchell | |
| 4,220,847 A * | 9/1980 | Focke et al. | 219/388 |
| 4,222,169 A | 9/1980 | Lockwood | |
| 4,226,072 A | 10/1980 | Balzer et al. | |
| 4,243,156 A | 1/1981 | Lobbestael | |
| 4,281,502 A | 8/1981 | Bonkowski | |
| 4,282,698 A | 8/1981 | Zimmermann | |
| 4,300,714 A | 11/1981 | Dahl et al. | |
| 4,319,441 A | 3/1982 | Credle | |
| 4,336,680 A | 6/1982 | Grevich | |
| 4,345,412 A | 8/1982 | Balzer et al. | |
| 4,447,184 A | 5/1984 | Buri et al. | |
| 4,519,428 A | 5/1985 | Moody | |
| 4,531,342 A | 7/1985 | Wittenborg | |
| 4,562,688 A | 1/1986 | Mueller | |
| 4,575,608 A | 3/1986 | Wictorin et al. | |
| 4,594,838 A | 6/1986 | Ficken et al. | |
| 4,605,392 A | 8/1986 | Achelpohl et al. | |
| 4,620,467 A | 11/1986 | Margraf et al. | |
| 4,624,169 A | 11/1986 | Nelson | |
| 4,688,367 A | 8/1987 | Bonkowski | |
| 4,691,503 A | 9/1987 | Frerich | |
| 4,715,920 A * | 12/1987 | Ruppman et al. | 156/344 |
| 4,731,649 A | 3/1988 | Chang et al. | |
| 4,736,568 A | 4/1988 | Shaw et al. | |
| 4,754,404 A | 6/1988 | Inoue | |
| 4,771,966 A | 9/1988 | Anderson | |
| 4,835,940 A | 6/1989 | Unger | |
| 4,858,090 A | 8/1989 | Downs | |
| 4,866,913 A | 9/1989 | Rebischung | |
| 4,974,392 A | 12/1990 | Mondini | |
| 4,989,753 A | 2/1991 | Brogna et al. | |
| 4,998,911 A | 3/1991 | Reeves, Jr. et al. | |
| 5,000,345 A | 3/1991 | Brogna et al. | |
| 5,058,630 A | 10/1991 | Wiley et al. | |
| 5,060,289 A * | 10/1991 | Abramson | 392/423 |
| 5,105,957 A | 4/1992 | Mannl | |
| 5,113,479 A | 5/1992 | Anderson et al. | |
| 5,139,222 A | 8/1992 | Koorey et al. | |
| 5,151,149 A * | 9/1992 | Swartz | 156/379.8 |
| 5,182,896 A | 2/1993 | Maccherone | |
| 5,193,596 A | 3/1993 | Patel | |
| 5,230,205 A | 7/1993 | Hautemont | |
| 5,237,796 A | 8/1993 | Bonkowski | |
| 5,249,410 A | 10/1993 | Bakker et al. | |
| 5,279,472 A | 1/1994 | Hongo et al. | |
| 5,363,629 A * | 11/1994 | Graffin | 53/329.3 |
| 5,444,814 A | 8/1995 | Hofius | |
| 5,511,360 A | 4/1996 | Bakker et al. | |
| 5,534,282 A | 7/1996 | Garwood | |
| 5,592,582 A | 1/1997 | Oparin et al. | |
| 5,594,831 A | 1/1997 | Oparin et al. | |
| 5,649,972 A * | 7/1997 | Hochstein | 219/531 |
| 5,682,729 A | 11/1997 | Buchko | |
| 5,805,769 A | 9/1998 | Cook et al. | |
| 5,890,349 A | 4/1999 | Heisler et al. | |
| 5,927,631 A | 7/1999 | Yoo | |
| 5,930,977 A | 8/1999 | Hsu | |
| 5,931,071 A | 8/1999 | Mori | |
| 5,939,726 A | 8/1999 | Wood | |
| 5,993,942 A | 11/1999 | Bakker et al. | |
| 6,001,292 A * | 12/1999 | Atake | 264/135 |
| 6,007,658 A | 12/1999 | Calvert | |
| 6,123,436 A * | 9/2000 | Hough et al. | 362/296 |
| 6,135,169 A | 10/2000 | Sandei et al. | |
| 6,219,996 B1 | 4/2001 | Searle | |
| 6,291,037 B1 | 9/2001 | Bakker et al. | |
| 6,305,796 B1 | 10/2001 | Szlucha et al. | |
| 6,387,209 B1 | 5/2002 | Nettesheim | |
| 6,418,701 B1 | 7/2002 | Navarro | |
| 6,467,511 B1 * | 10/2002 | Sollars | 242/422.6 |
| 6,739,109 B1 | 5/2004 | Fan | |

FOREIGN PATENT DOCUMENTS

| | | |
|---|---|---|
| DE | 198 47 176 A1 | 4/2000 |
| EP | 0 993 964 A2 | 4/2000 |
| GB | 2185241 A | 7/1987 |

OTHER PUBLICATIONS

Copending U.S. Appl. No. 10/183,415, filed Jun. 28, 2002.
Copending U.S. Appl. No. 10/183,416, filed Jun. 28, 2002.
Copending U.S. Appl. No. 10/183,417, filed Jun. 28, 2002.
Copending U.S. Appl. No. 10/183,470, filed Jun. 28, 2002.
Copending U.S. Appl. No. 10/236,724, filed Sep. 5, 2002.
Copending U.S. Appl. No. 10/358,804, filed Feb. 5, 2003.
Copending U.S. Appl. No. 10/358,808, filed Feb. 5, 2003.
Copending U.S. Appl. No. 10/358,857, filed Feb. 5, 2003.
Copending U.S. Appl. No. 10/358,899, filed Feb. 5, 2003.
European Search Report for EP 0993964 A3.
Search Report for Application No. PCT/US03/15406.
Office Action in co-pending U.S. Appl. No. 10/183,416, dated Nov. 15, 2004 (Ex. Corcoran).
Office Action in co-pending U.S. Appl. No. 10/236,724, dated Mar. 10, 2004 (Ex. Sipos).
Office Action in co-pending U.S. Appl. No. 10/236,724, dated Oct. 4, 2004 (Ex. Sipos).
Office Action in co-pending U.S. Appl. No. 10/358,899, dated May 19, 2004 (Ex. Jillions).

Office Action in co-pending U.S. Appl. No. 10/358,899, dated Oct. 8, 2004 (Ex. Jillions).

Office Action in co-pending U.S. Appl. No. 10/358,899, dated Feb. 24, 2005 (Ex. Jillions).

Office Action in co-pending U.S. Appl. No. 10/358,857, dated Aug. 16, 2004 (Ex. Gerrity).

Office Action in co-pending U.S. Appl. No. 10/358,857, dated Feb. 9, 2005 (Ex. Gerrity).

Office Action in co-pending U.S. Appl. No. 10/358,804, dated Nov. 18, 2004 (Ex. Paradiso).

* cited by examiner

APPARATUS FOR HEAT-SHRINKING FILM ONTO AN OPEN-TOPPED CONTAINER AND METHOD OF USING SAME

This application claims the benefit of U.S. Provisional Application No. 60/387,366, filed Jun. 10, 2002, U.S. Provisional Application No. 60/387,337, filed Jun. 10, 2002, U.S. Provisional Application No. 60/387,527, filed Jun. 10, 2002, and U.S. Provisional Application No. 60/387,339, filed Jun. 10, 2002, each of which is incorporated herein by reference in its entirety.

This invention pertains to apparatus and methods for heat shrinking thin film onto an open-topped container, such as a cup. According to one embodiment, this invention pertains to apparatus and methods for heat shrinking a film onto an open-topped container, where a plurality of reflectors are used to direct radiant energy to a specific area of the film to cause shrinking.

Presently, in the fast food drink industry, it is typical to serve a drink in a paper, plastic, or other disposable cup topped with a preformed plastic lid. The plastic lid fits relatively tightly over the brim formed at the top of, for example, a paper drink cup, and may include apertures to permit straws or openings to be formed in the lid to allow one to directly drink the contents of the cup without removing the lid.

Unfortunately, there are many problems associated with the use of these plastic lids. For example, the lids are bulky and create problems in storage and in disposal. Still further, the seal formed by the lids is dependent upon the lid being placed on properly, and these seals can leak if the lid is not properly placed or if the lids are not properly formed.

In order to overcome these problems, various devices and methods have been proposed in which a cover is placed on an open-topped container and then heated to shrink it into sealing engagement with the top of such a container. These prior art devices and methods, however, fail to provide a sufficiently cost efficient, easy, and inexpensive alternative to preformed rigid plastic lids. As a consequence, rigid plastic lids remain in widespread use.

Some of the main failings of these prior devices are that they are bulky, noisy, unresponsive, and expensive. Prior art heating systems which comprise blowing air over a hot element and then onto a film require large amounts of unnecessary heat, even when in standby mode, making temperature control very difficult. Further, the need for continuous elevated temperatures, as required by these heating systems, are expensive to maintain and may be undesirable to the immediate environment.

An improvement to these prior art systems is found in a device described in U.S. Pat. No. 5,249,410, incorporated herein by reference, which uses heat shrinkable film lids having annular energy absorbent regions formed thereon, preferably by application of an energy absorbent ink such as by printing. In this device for shrinking thin film over a container to form a lid, multiple radiant energy sources are utilized. The primary radiant energy source is located closely adjacent to the lip of the cup and moves peripherally around the lid while a secondary radiant energy source is stationed over the cup. When the primary energy source is activated, energy falling upon the energy absorbent region in the film, causing the film to shrink preferentially in the area around the lip of the cup, while energy from the secondary energy source may serve to tauten up the central portion of the lid. Alternatively, multiple primary radiant energy sources can be located around the periphery of the mouth of the cup. The apparatus disclosed in the '410 patent does not detail an efficient method of concentrating and redirecting energy toward the region of the film which is to be shrunk. In other arrangements, multiple energy sources at fixed locations, are provided.

In another arrangement of the above improvement, the radiant energy source includes multiple sources rotating around the circumference of the container. In still further arrangements, multiple energy sources at fixed locations, as well as fixed annular radiant energy sources, are provided.

In each of the above, the methods are not particularly efficient in directing the radiant energy to areas of the film which are to be shrunk. Accordingly, the above described structures suffer from disadvantages. For example, an unnecessary amount of heat may be generated leading to heat build-up in the lidding system components. In addition, this heat build-up can lead to potential heating of the contents of the cup. Further, a substantial amount of energy is wasted as it is not directed to the area where shrinkage is desired, leading to a slower sealing process and/or higher energy requirements.

The present invention provides a lidding device having a plurality of reflective cups which direct the radiant energy to the area(s) where shrinkage is desired. Thus, the time required to shrink a lid on a container may be reduced because the energy is more efficiently delivered to the shrinkage area. In addition, the reduced time may result in a reduction in the amount of heat generated.

This invention also pertains to an apparatus for positioning containers in an opening. In one embodiment, this invention pertains to an apparatus for positioning containers in a lidding system. In another embodiment, this invention pertains to an apparatus for positioning multiple sizes of containers in a lidding system.

In lidding systems, the container should be placed in the vicinity of the radiant energy sources to achieve proper sealing of the film to the lid. In addition, when the film contains graphics that may, for example, be centered on the top of the film, the container should be positioned under the film such that the graphics appear on the lid as intended. The opening of the lidding system that receives the containers should be large enough to accommodate the container having the largest brim diameter being sealed. In particular, typically container sizes range from 16 oz. to 32 oz. The brim diameter of the 32 oz. container is generally larger than that of the 16 oz. container. For example, the outer brim diameter of a 32 oz. cup may be approximately 4.2 inches, while the outer brim diameter of a 16 oz. cup may be approximately 3.5 inches. In that situation, when attempting to seal a 16 oz. container, the container may be placed off center of the opening, such that the film graphics are not appropriately positioned on the container. Moreover, if the container is sealed when it is off center of the opening, the sealing strength of the film around the perimeter of the container may not be uniform. Those of ordinary skill in the art will understand that other container sizes can be used with the present invention, e.g., 12 oz. to 48 oz.

The present invention provides a container positioning device that is capable of positively positioning containers, such as drink cups, having different diameters at the open end of the container, while reducing spillage of the contents of the container during the positioning operation. In particular, in one embodiment of the present invention, a pivotally mounted container positioning means is provided at the opening of the lidding system. The container positioning means may be spring mounted such that when a small container is placed into the opening, the container positioning means remains in its initial position, effectively reducing the diameter of the lidding system opening. When a larger diameter container is placed in the opening for sealing, the brim of the container may contact an upper portion of the container positioning means thereby forcing the spring loaded container guide away from the brim of the container.

This invention also pertains to an apparatus and method for braking and controlling tension in a web. More particularly, this invention pertains to an apparatus and method for maintaining a substantially uniform tension in a web as the web is transferred from a supply roll to a take-up reel.

In a converting operation, a web, such as film, paper, or foil, is transferred from a supply roll to a take-up reel. Generally, between the supply roll and the take-up reel is a converting station. To enhance performance in the converting station, it is generally desired to maintain a substantially uniform tension across the web. The failure to maintain a substantially uniform tension can lead to product with diminished quality, unusable product, or operational problems within the converting station.

The aforementioned problems are particularly evident in the area of converting thin films, such as polyolefin shrink film, other printed polyolefin films, packaging over wrap film, moisture or oxygen barrier films, or ovenable films, such as Mylar. Thin films are commonly used in the process of wrapping or sealing a variety of objects. When thin films are used in an automated system, control of the film is desired to maintain the uniformity of the wrapping or sealing process. In particular, when the thin film is fed from a supply roll to a take-up reel, or to a processing station, the tension on the film being fed from the supply roll has a tendency to change, potentially leading to non-uniformity in the sealing or wrapping process. One industry in which these problems have been observed is the fast food drink industry.

When lidding a container with a thin film, the thin heat shrink film must be supplied to the container to be lidded. The thin film is typically from about 60 to about 80 gauge. Generally, the thin film supply roll is housed within the lidding system and is unrolled to deliver a sheet of thin film to the container to be lidded. Before heat shrinking the film onto the open-topped container, the film is cut. For uniform sealing performance, it is desired that the tension in the film remain relatively constant. In prior designs, the supply roll is mounted on a center slip clutch, or other braking mechanism, positioned within an inner diameter of the film supply roll. The take-up reel, which is driven by a motor, such as a web feed belt motor, is used to advance the film across the container to be lidded.

Because the torque on the supply roll provided by the slip clutch or other braking device is constant, the film tension changes as the film is unrolled due to the change in roll diameter. In particular, because the moment arm on the supply roll decreases as the diameter of the supply roll decreases, the tension on the film increases. Uneven tension can adversely affect the sealing or wrapping process. In addition, when the film is advanced, the supply roll develops inertia due to the force applied to unroll the film. The resulting inertia causes overspin after the web feed belt motor stops, leaving the film loose in the area between the lidding section and the supply roll, further causing uneven tension in the roll.

The present invention provides a web brake and tension control apparatus. The web brake and tension control apparatus may include a mechanical arm having a first end, which is capable of being rotatably mounted to a frame of a lidding system, and a second end, which may be bent downward at an angular orientation to the first end. The second end may have a cross bar which contacts the web across its entire width. A force applying means may be attached to the mechanical arm at a point interposed between the first end and the second end. In use with the lidding system, the force applying means may be in tangential contact with the supply roll. The force applying means may provide tension between a contact surface of the web brake and tension controller and the film supply roll, thereby reducing overspin as the web is advanced and maintaining a substantially constant tension in the web. The outer end of the arm provides a substantially uniform tension on the web as it is advanced to the lidding section.

This invention also pertains to an apparatus for cutting a web. In particular, this invention pertains to an apparatus having improved safety for cutting a thin film prior to heat shrinking the film onto an open-topped container, such as a cup.

In a lidding system, the heat shrink film generally should be cut prior to heat shrinking the film onto the open-topped container. Prior to cutting, the film is advanced to the heat sealing area from a roll. Often, the film is generally rectangular in shape. Because it is sometimes desired that the cut-out of the film be substantially circular in shape to correspond to the top of the container, it is necessary to cut this shape out of the rectangular-shaped film. The film used for heat shrinking is typically very thin, for example, 75 gauge, making cutting difficult. In current known methods, a cutting system includes one or more film cutting members, such as knives or blades, which are attached to a heating element. During operation of the heat sealer, the operator's hand moves within the vicinity of the cutting system and can come in contact with the cutting members. In addition, when the cutting system requires service, the cutting members are often exposed, thereby creating a dangerous environment for the operator. It is desired to provide a safe cutting system that will reduce the risk of injury due to exposed cutting members both during the operation of the lidding system, as well as during maintenance of the equipment.

The present invention provides a cutting apparatus that limits exposure of the cutting members when the cutting apparatus is at rest. In particular, in one embodiment, when the cutting system is in a rest position, each cutting member may lie between, and be protected by, a wheel assembly. During the cutting operation, however, the cutting members are allowed to travel downward and contact the film. In addition, for safety during servicing, the wheel assembly may be mounted on a vertical shaft having a notched portion. During removal of the rotational assembly for servicing, clips can be placed on the notched portion, thereby preventing the cutting members from becoming exposed.

This invention also provides a modular rotational assembly. According to one embodiment, this invention pertains to a modular rotational assembly for use with a film cutting and sealing system that allows for quick removal and interchangeability of components.

Replacement of components of a machine can often be time consuming and can often lead to an unacceptable unavailability of the machine. This is particularly true when the components that must be replaced are integral with the machine and the replacement of the component renders the machine unavailable during the entire replacement time.

While this problem is not uncommon, one area where machine unavailability is particularly unacceptable is the fast food drink industry. One of the cornerstones of the fast food industry is the ability to deliver the product in a quick and efficient manner. When a machine is unavailable, the ability to meet the customers' demands is adversely affected.

In systems with moving components, it is necessary to perform maintenance on the components. In particular, after a period of operating time, for example in a lidding system, a radiant energy source may become inoperative, thus diminishing or destroying the effectiveness of the sealing process and necessitating replacement of the radiant energy source. Also, over time, a cutting member may become dulled or may break, such that it must be replaced. In the current systems, changing a cutting member and/or radiant energy source is time consuming, as the components must be changed directly within the lidding system. As such, when a cutting member and/or radiant energy source is being replaced, the lidding system can not be used. In addition, changing a cutting member and/or radiant energy source within the confined space of the lidding system is difficult.

The present invention provides a modular rotational assembly that may house at least one radiant energy source and/or at least one cutting member. The modular rotational assembly can be easily removed and then replaced by a spare modular rotational assembly with operable cutting member(s) and/or radiant energy source(s). Accordingly, the down time of the lidding system associated with replacement of the parts may be limited to the amount of time required to remove the modular rotational assembly and replace it with the spare assembly. After the modular rotational assembly is removed, the removed assembly can be sent to a repair facility for replacement of the cutting member(s) and/or radiant energy source(s).

Advantages of the invention may be set forth in part in the description which follows and in part may be apparent from the description or may be learned by practice of the invention. The advantages of the invention may be realized and attained by means of the instrumentalities and combinations particularly pointed out in the appended claims.

As embodied and broadly described herein, in one embodiment the invention includes a lidding system having a reflective cup system for heat-shrinking a film onto an open-topped container. The reflective cup system may comprise at least one reflective cup assembly where the reflective cup assembly includes a radiant energy source and a reflective cup, the reflective cup may have at least an elliptical portion and a parabolic portion. The radiant energy source may be located about the periphery of the container, where the reflective cup serves to concentrate the energy from the radiant energy source and redirect energy radially inwardly onto the area of the film which is to be shrunk. The reflective cup system may include at least two reflective cup assemblies. In one embodiment, a protective optical element is located at or near the opening of the reflective cup.

In another embodiment of the present invention, the lidding system may include a straw-hole lamp system for marking a straw-hole on the film. The straw-hole lamp system may include a reflector cup and a radiant energy source, and the reflector cup may have a reflective surface that is ellipsoidal.

In another embodiment, as embodied and broadly described herein, the invention includes a container positioning device including an lower plate having an opening and a container positioning means, wherein the container positioning means is capable of positively positioning a container in the lower plate opening. The container positioning device is capable of positioning a first container and at least a second container in the lower plate opening, wherein the first and second containers have different brim diameters.

In one embodiment, the container positioning means may include at least two posts extending substantially perpendicularly to the lower plate, wherein the at least two posts may be pivotally mounted about an extension bar. The container positioning means may further include at least one auxiliary guide. In another embodiment, the container positioning means device may include a biasing means, wherein the biasing means is capable of holding the at least two posts substantially perpendicularly to the lower plate.

In yet another embodiment, the container positioning device includes a container positioning means having a positioning saddle which may be generally disposed perpendicularly to the lower plate. The positioning saddle may be oriented such that it has an elongated vertical axis bowing toward, from the diametrical center of the lower plate opening, and a generally horizontal axis bowing away from the diametrical center of the lower plate opening, the word "axis," in the absence of a better word, being used to describe a curve running roughly down the center of a curved surface of the saddle. Throughout this specification and the claims, when we describe a curve on a surface as being "bowed" toward a reference, we mean that the medial portion of that curve is closer to the reference than the terminal portions. Moreover, the positioning saddle may be pivotally mounted on a bracket. Further, the container positioning device may include a biasing means, wherein the biasing means is capable of holding the positioning saddle substantially perpendicular to the lower plate.

In yet another embodiment of the present invention, the container positioning device may include a container positioning means having at least two first posts and at least two generally vertical pivotable second posts, wherein the first posts may be capable of positively positioning containers having at least a first brim diameter and the second posts may be capable of positioning containers having at least a second brim diameter. The first posts may be angularly attached to the lower plate at a first end and inclined inwardly toward the axis of the opening in the lower plate. Moreover, a second end of each of the first posts may be connected to a hinge means while a second, or lower, end of each of the second posts may be connected to the hinge means. This embodiment may include a biasing means wherein the biasing means is capable of extending the second posts angularly and inwardly away from the first posts.

In yet another embodiment of the present invention, the container positioning device may include an auxiliary container positioning means having an inner ring and a generally concentric outer ring mounted above the lower plate. The inner ring and/or outer ring may have an elongated body. Moreover, the inner ring may be in axially slideable communication with the outer ring. Further, the inner ring may be generally retained within the outer ring.

In yet another embodiment of the present invention, the container positioning device includes a container positioning means having two pivotally mountable arms, each arm having a first end and a distal end, and each arm having a rear guide extending downwardly from the distal end of the arm. In one embodiment, the rear guides may be posts or a saddle. The container positioning means may also include a side guard extending downwardly from each arm, where, in one embodiment, the side guards may be posts or auxiliary guides. The container positioning means may further include arms having curvilinear end portions. The arms of the container positioning means may be in communication via a linking means, including any art recognized linking means, such as a flexible plate or a flexible spring means section, or the linking means may slideably connect the arms. The container positioning means may further include a biasing means that causes the distal ends of the arms to tend toward one another.

In yet another embodiment of the present invention, an apparatus for heat-shrinking a film onto a container is provided, including a lidding system. The lidding system may include at least one radiant energy source, a supply roll, a take-up reel, and a container positioning device, the container positioning device may include a container positioning means, wherein the container positioning means may be capable of positively positioning a container in an lower plate opening. The container positioning means may be capable of positioning a first container and at least a second container in the lower plate opening, wherein the first and second containers have different brim diameters.

In still yet another embodiment of the present invention, a system for heat-shrinking a film onto an open-topped container may be provided comprising at least one reflective cup having a reflective interior surface, at least one radiant energy source, the reflective cup and radiant energy source may be rotationally mounted, wherein the interior surface of the reflective cup may have at least an elliptical portion and a parabolic portion, and a container positioning device, the container positioning device may include a container positioning means, wherein the container positioning means is capable of positively positioning a container in an lower plate opening.

In another embodiment of the present invention a method of heat-shrinking film onto an open-topped container may be provided comprising the steps of positioning a container in an lower plate opening by providing a container positioning device including an lower plate having an opening and a container positioning means, contacting the top of an opening of an open-topped container with a heat-shrink film, placing the covered open-topped container at an opening of a heat shrinking system, wherein the heat shrinking system may include at least one reflective cup having a reflective interior surface, and wherein the interior surface of the reflective cup may have at least an elliptical portion and a parabolic portion, and subjecting the covered container to radiant energy.

In yet another embodiment of the present invention, as embodied and broadly described herein, the invention may include a web brake and tension controller including a mechanical arm having a first end and a second end. A force applying means may be interposed between the first and second ends of the mechanical arm. The mechanical arm may be substantially U-shaped, where the top, open portion of the "U" is the first end, and the bottom, connected portion of the "U" is the second end. The U-shaped mechanical arm may be formed by two substantially parallel legs extending from the first end and connected by a cross bar at the second end. In another embodiment of the invention, a guide bar is connected to the cross bar.

In one embodiment, the invention may also includes a method of controlling the tension in a web comprising moving the web from a supply roll to a take-up reel, interposing a cross bar in the web path between the supply roll and the take-up reel, and applying a downward force on the supply roll.

In still yet another embodiment of the present invention, as embodied and broadly described herein, the invention may include a web cutter including at least one wheel assembly, wherein the wheel assembly may include a wheel housing and at least two wheel members, and a cutting member may be disposed between the wheel members, wherein the wheel assembly may have a first position where the cutting member does not extend below the wheel members and a second position where the cutting member extends below the wheel members. The web cutter of the present invention may also include an upper plate having at least one receiving hole, wherein the wheel assembly may include at least one post that is in slideable communication with the upper plate receiving hole, and where the cutting member is in fixed communication with the upper plate. In one embodiment, the web cutter may include at least two wheel assemblies. In another embodiment, the web cutter may include at least three wheel assemblies. In yet another embodiment, the web cutter may include at least two cutting members. In still yet another embodiment, the web cutter may include at least three cutting members. The wheel members may be rotatably mounted on a axis.

The web cutter of the present invention may also include a top plate, a vertical alignment mounting bracket, wherein the vertical alignment mounting bracket may be in communication with the top plate and in communication with the upper plate, and a fixed ring, wherein the fixed ring may be capable of being in communication with a distal end of the wheel assembly post. The fixed ring may have a fixed ring recess capable of receiving a top plate positioning member. The top plate positioning member may be in fixed communication with the top plate. Moreover, the web cutter may include a spring member, wherein the spring member may be capable of maintaining a separating force between the top plate and the fixed ring. The web cutter of the present invention may also include a lower plate having a cutting groove capable of receiving the cutting member.

The invention may also include a web cutter having a modular rotational assembly, wherein the modular rotational assembly may include an upper plate having at least one receiving hole, at least one wheel assembly, wherein the wheel assembly may include a wheel housing and at least two wheel members, and a cutting member disposed between the wheel members, wherein the wheel assembly may have a first position wherein the cutting member does not extend below the wheel members and a second position wherein the cutting member extends below the wheel members.

In addition, in one embodiment, the present invention includes a method of cutting film including providing a thin film above a lower plate, providing at least one wheel assembly, wherein the wheel assembly may include a wheel housing and at least two wheel members, and wherein the wheel assembly may be in communication with an upper plate, providing at least one cutting member disposed between the wheel members, wherein at a first position the cutting member does not extend below the wheel members, moving the at least one wheel assembly downwardly into communication with the lower plate such that the at least one cutting member extends below the wheel members and is in communication with the film, and rotating the upper plate such that the cutting member advances and cuts the film. The method may further include an upper plate having at least one receiving hole, and wherein the wheel assembly may include at least one post that is in slideable communication with the upper plate receiving hole, and wherein the cutting member may be in fixed communication with the upper plate. Moreover, the method of cutting a web may include a vertical alignment mounting bracket in communication with a top plate that is capable of acting downwardly to move the at least one wheel assembly into communication with the lower plate. A glass clamp may be in communication with the vertical alignment bracket. In addition, a solenoid may be in communication with the glass clamp, the solenoid capable of exerting a downward force on the glass clamp to move the vertical alignment bracket downwardly, thereby moving the at least one wheel assembly into communication with the lower plate. The rotational movement of the upper plate may be provided by a driver.

Further, the present invention includes a method of cutting film comprising providing a thin film above a lower plate, providing a modular rotational assembly, wherein the modular rotational assembly may include an upper plate having at least one receiving hole, at least one wheel assembly, wherein the wheel assembly may include a wheel housing and at least two wheel members, and at least one cutting member disposed between the wheel members, wherein at a first position the cutting member does not extend below the wheel members, moving the modular rotational assembly downwardly into communication with the lower plate such that the at least one cutting member extends below the wheel members and is in communication with the film, and rotating the upper plate such that the cutting member advances and cuts the film.

In another embodiment of the present invention, as embodied and broadly described herein, the invention may include a modular rotational assembly having an upper plate and at least one radiant energy source. The modular rotational assembly may have at least two radiant energy sources. Moreover, the modular rotational assembly may have at least three radiant energy sources. The invention may also include at least one reflective cup, wherein the radiant energy source is located within the reflective cup.

In another embodiment, the invention may include a modular rotational assembly having an upper plate and a web cutter. The web cutter may include at least one cutting member and at least one wheel assembly. The web cutter may have at least two or more wheel assemblies. Each wheel assembly may include at least two wheels and a wheel housing.

In yet another embodiment, the invention may include a modular rotational assembly having an upper plate, at least one radiant energy source, and a web cutter. The web cutter may include at least one cutting member and at least one wheel assembly.

The accompanying drawings, which are incorporated herein and constitute a part of this specification, illustrate embodiments of the invention, and, together with the description, serve to explain the principles of the invention.

DESCRIPTION

Figure 1:
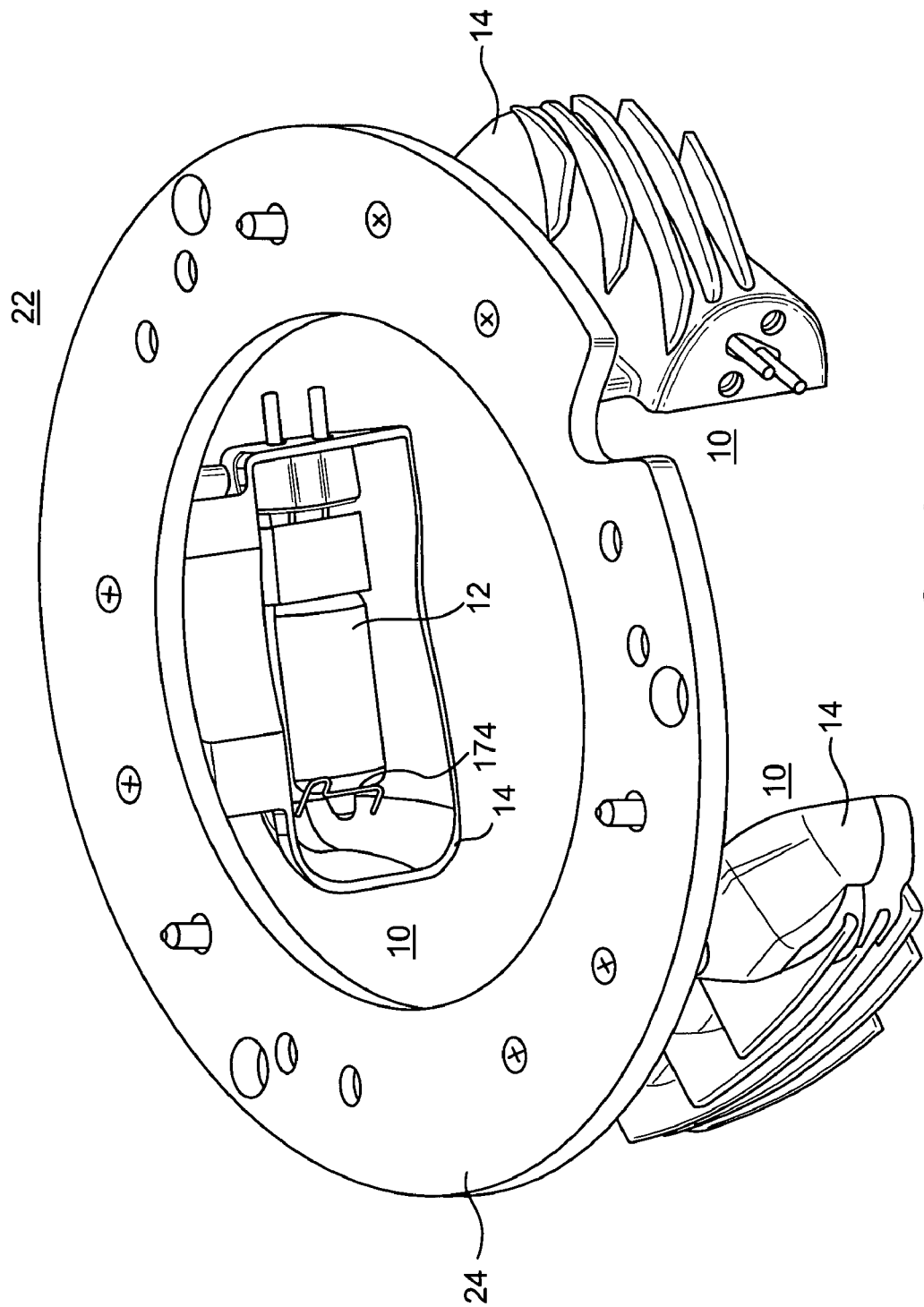
FIG. 1 illustrates a modular rotational assembly according to an embodiment of the present invention.

Reference will now be made in detail to embodiments of the present invention, examples of which are illustrated in the accompanying drawings. While the following description is directed to open-topped containers, such as cups, those of ordinary skill in the art will appreciate that the invention is equally applicable to other open-topped containers, including, but not limited to, food cartons and pharmaceutical containers.

In accordance with the invention, as broadly described, the lidding device may include a modular rotational assembly. The modular rotational assembly may include a reflective cup system having at least one energy source and at least one reflective cup, and, optionally, a protective glass or plastic optical element. In general, the radiant energy source preferably emits radiant energy as visible and near infrared radiation. A substantial portion of the emitted radiant energy may contact the surface of the reflective cup and then be directed toward a thin energy-absorbing film that will shrink when impinged on by visible and near infrared radiation.

In the present invention, film may be provided covering the top of, and extending downwardly past the brim of, an open-topped container, such as a drinking cup. The radiant energy from the radiant energy source may be directed to the area just below the periphery of the top of the cup, i.e., just below the brim. Thus, the radiant energy directed to the area just below the brim causes the film to shrink in the area around the brim, thereby forming a lid.

The film may be any art recognized film that will shrink in the presence of radiant energy. In particular, the film may be a plastic wrapping film which has the capability of shrinking when it is heated to near the melting point of the film. These films are commonly manufactured from plastic resins such as polyvinyl chloride (PVC); polypropylene (PP); linear-low density polyethylene (LLDPE); low density polyethylene (LDPE); high density polyethylene (HDPE); copolymers of ethylene and vinyl acetate (EVA); copolymers of ethylene and vinyl alcohols (EVOH); ionomers (e.g., SURLYN®, by E.I. du Pont de Nemours and Company of Wilmington, Del.)); copolymers of vinylidene chloride (e.g., PVDC, SARAN™ ("SARAN" is a trademark of The Dow Chemical Company of Midland, Mich.)); copolymers of ethylene acrylic acid (EAA); polyamides (PA); polyester, polystyrene, nylon and copolymers of ethylene and octene.

According to one embodiment, the film may be a bi-axially oriented thin shrink film having a thickness of between 40 to 120 gauge (1.02 mm to 3.05 mm). In another embodiment, the film may be a bi-axially oriented thin shrink film having a thickness of between 60 to 100 gauge (1.52 mm to 2.54 mm). One film that has been used is a 75 gauge (1.91 mm) Clysar ABL polyolefin shrink film sold by Bemis Corporation of Minneapolis, Minn. Another film that has been used is a 75 gauge (1.91 mm) Clysar XLPT-115 polyolefin shrink film, also sold by Bemis Corporation of Minneapolis, Minn. Yet another appropriate shrink film may be made of polyvinyl chloride and is sold under the trade name #2024 Reynolon®, by Reynolds Metals Company of Richmond, Va. Appropriate shrink film would be readily apparent to the skilled artisan. Any art recognized film would be appropriate, such as 75 gauge (1.91 mm) Intertape Exfilm polyolefin shrink film. When used to cover food products, the film should be food contact-approved by the appropriate regulatory authorities. In one embodiment, the film should have a width of between approximately 3–12 inches.

To ensure that the film sufficiently shrinks when contacted by radiant energy, the film may include a radiant energy absorbing substance. Any art recognized radiant energy absorbing substance may be used. One or more radiant energy absorbing substances may be used with a single film. The substance(s) may be applied to the film, such as by printing, brushing, spray coating, electrostatic coating, electrodeposition coating, flow coating, roller coating, dip coating, or other means known to those of ordinary skill in the art, or the substances may be incorporated into the shrink film. In some cases, such films may require special treatment to be made more adaptable to printing of the energy absorbent material thereon, such as the application of a charged electric field, known as corona treating, which is done before printing to ensure adhesion of the absorbent material, and its carrier vehicle, if any. Other methods of promoting adhesion of the absorbent material include flame treatment or chemical primer application. For other films, such as polyvinyl chloride shrink films, corona treating is not necessary for acceptable printing results.

One such substance that works well in this environment is carbon black pigment. Other substances that would achieve satisfactory results include graphite and iron oxide. According to one embodiment of the present invention, the carbon black pigment may be included as a functional component in ink that is applied to the surface of the film. The carbon black pigment may be printed on the surface of the film, or incorporated into the film. A carbon pigment-containing black ink sold by Coates Ink, a division of Sun Chemical, under the trade name Brazilia TN15787, can be used in the present invention. This ink is readily adapted for printing onto the film substrate. The Brazilia inks are available in many colors and are broadly usable as absorbing materials according to the invention if the ink meets the requirements specified hereinabove.

Materials may be included in or on the film as an indicator. For example, as discussed below with regard to drink marking, materials may be included that when contacted by radiant energy react so as to make a mark, i.e., an indicia, on the surface of the film. In particular, the energy sensitive indicia-former may change from one visual condition to a second visual condition. Change in visual condition would include, but not be limited to, change in appearance, hue, shade, perceptibility, including an enhancement in perceptibility, brightness, lightness, reflectiveness, absorptivity and color, including, for example, light gray to dark gray and white to black.

One indicia-former that can be used in the present invention is a thermochromic pigment or dye, which may be dispersed in a suitable carrier. Embodiments of appropriate thermochromic inks are set forth in co-pendinci U.S. patent application Ser. No. 10/359,347, entitled "Packaging Material and Products Comprising Indicia-Former Which Changes From a First Visual Condition to a Second Visual Condition and Indicates a Characteristic of the Package Contents," filed in the U.S. Patent and Trademark Office on Feb. 5, 2003, and incorporated herein by reference in its entirety. The materials may be used in the form of a thermochromic ink incorporating a thermochromic pigment or dye in a carrier vehicle. The thermochromic ink may be applied to the film substrate by printing, incorporating within the substrate, or other methods known to those of ordinary skill in the art. The energy sensitive indicia-former may be an irreversible thermochromic ink that is white below about 90° C. and undergoes an irreversible color change to black at a temperature above about 90° C. One thermochromic ink meeting these requirements is sold by Sherwood Technologies Ltd. of Nottingham, UK, under the trade name Sherwood Type 90™. Those of ordinary skill in the art will understand that there a variety of ink systems comprising one or more inks that can function as the absorbent material and as the heat sensitive indicia-former. The described thermochromic ink can be used with the ink systems described herein.

Those of ordinary skill in the art will understand that a variety of ink colors can be used to obtain satisfactory results with the present invention and that a variety of inks other than thermochromic ink can also be used. Other inks that can be used in the invention are photochromic ink and electrochromic ink such as are disclosed in U.S. Pat. No. 5,830,529, the disclosure of which is incorporated herein by reference. When using photochromic and electrochromic inks as an indicia former, an energy absorbent layer is not required. In addition, those of ordinary skill in the art will appreciate that it is not necessary to coat the entire film with ink. Moreover, those of ordinary skill in the art will appreciate that ink patterns can be used in applying the indicia-former to the film substrate.

In one embodiment relating to films used to cover drink containers, an absorbent material comprising an ink composition containing carbon black may be printed onto the film substrate. As this ink composition is black in appearance due to its carbon black content, white ink may be applied over the portions of the black ink on which the indicia-former is to be located to show the contents of the container, in order to provide appropriate contrast for the indicia-former. Then the indicia-former may be superimposed on the areas of white ink, in one embodiment by printing.

There are, of course, numerous possible combinations of the absorbent layer, optional contrast layer and energy sensitive indicia-former that can be employed in carrying out the invention.

Those of ordinary skill in the art will understand that a variety of ink concentrations can achieve satisfactory results in the present invention. The second ink which acts as an energy sensitive indicia-former may be, as identified above, an ink that undergoes conversion from one color to another that contrasts with the color of the absorbent material upon a predetermined increase in temperature. Alternatively, it may be an ink that undergoes a different sort of visually observable conversion, such as a dye or luminescent pigment that is covered by a patch that disintegrates upon a specific increase in temperature. The energy sensitive indicia-former should undergo a conversion from a first visual state to a second visual state upon exposure to appropriate energy, and that such changes in visual state or condition are perceptible to the human eye.

In another embodiment of the present invention, at least two ink layers may be applied to the film to provide an area for which shrinkage is desired. One layer may be a reflective layer and the second layer may be a radiant energy absorbing layer. The radiant energy absorbing layer may contain an energy absorbing substance, such as carbon black, which increases the shrink rate of the film. The reflective layer, when included, acts as a reflector and reflects some of the radiant energy that passes through the energy absorbing layer back to the energy absorbing layer, thereby increasing the amount of energy absorbed by the energy absorbing layer.

Ink systems that have been found to be adequate for use with the current invention are described below. Those of ordinary skill in the art will understand that there are a variety of ink systems, having one or more ink layers, that can be used with the present invention.

According to one embodiment, in a two layer ink system, the film may include a white ink, i.e., reflective layer, and a maroon ink, i.e., energy absorbing layer. One white ink that may be used with the present invention is sold by Coates Ink under the trade names Lunar TN12316 and Alfalam. In one embodiment of an energy absorbing layer, carbon black is mixed into the maroon layer. To enhance shrinkage of the film, carbon black may be added at a concentration of at least approximately 6% by dry weight of the ink formulation. In addition, at least 0.03 lbs. of carbon black may be added to every 3000 sq. ft. of printed area of the film. Those of ordinary skill in the art will understand that a variety of ink concentrations can achieve satisfactory results in the present invention. The white layer acts as a reflector so that the radiant energy that passes through the maroon layer will be reflected back towards the maroon layer, thereby enhancing impingement of the maroon layer by the radiant energy. While the invention has been described in terms of a white or maroon layer, those of ordinary skill in the art will appreciate that a variety of colors can be used to achieve a reflective layer and an energy absorbing layer.

In another two layer ink system, the film is coated with an aluminum particulate silver ink and then a blue or black ink, where the blue or black ink may include a substantial amount of a material which is highly energy absorbent for the particular energy source being utilized, such as carbon black. As with the white layer described above, the silver layer acts as a reflector so that the radiant energy that passes through the blue layer will be reflected back towards the blue layer, thereby enhancing impingement of the blue layer by the radiant energy.

A four layer ink system may be appropriate when lighter, more decorative, colors are desired on the top surface of the film. In particular, it is sometimes desired to apply a decorative layer above the absorbent layer. In one embodiment of a four layer ink system, the four layer ink system has a silver reflective layer, an absorbent layer, a white reflective layer, and a decorative layer. The decorative layer may contain multiple colors that are lighter than the maroon and dark blue generally which can be used with two layer systems. The decorative layer may also contain advertising slogans and indicia useful for identifying the contents of the lidded container. In one embodiment, the white reflective layer may be locally replaced instead by a layer comprising the energy sensitive indicia-former, which may itself be close to white in its untreated condition. Those of ordinary skill in the art will understand that a variety of layer color combinations can be used to achieve the desired results.

Each of the above formulations is acceptable for use with the current invention. The four layer ink system provides acceptable film shrink and superior appearance. The two color system achieves acceptable film shrink and appearance at a lower cost.

Those of ordinary skill in the art will understand that the desirable number of ink layers used can depend on a variety of factors, e.g., cost. In addition, those of ordinary skill in the art will understand that it is not necessary to coat the entire film with ink. In particular, in those area where shrinkage is not desired, the ink coating need not be applied and may, in fact, be undesirable. Moreover, those of ordinary skill in the art will appreciate that ink patterns can be used on any ink layer.

In one embodiment of the invention, referring to FIG. 1, the lidding system may include a modular rotational assembly 22. The modular rotational assembly 22 may include at least one reflective cup assembly 10 and an upper plate 24. The reflective cup assembly 10 may include a radiant energy source 12 and a reflective cup 14. The radiant energy source 12 may be located within the reflective cup 14. As shown in FIG. 1, the radiant energy source 12 may be retained in the reflective cup assembly 10 by a retaining clip 174. The retaining clip 174 resists displacement of the radiant energy source 12 during transport. The retaining clip 174 may be spring loaded. The modular rotational assembly 22 may have at least two reflective cup assemblies 10. In one embodiment, depicted in FIG. 1, the modular rotational assembly 22 has three reflective cup assemblies 10. Those of ordinary skill in the art will understand that more than three reflective cup assemblies 10 may be used in the present invention.

The reflective cup assembly 10 may be in communication with the upper plate 24. In particular, each reflective cup 14 may be connected to the upper plate 24. The reflective cup 14 can be connected to the upper plate 24 via bolts, screws, or other connection means (not shown) known to those of ordinary skill in the art.

Figure 2:
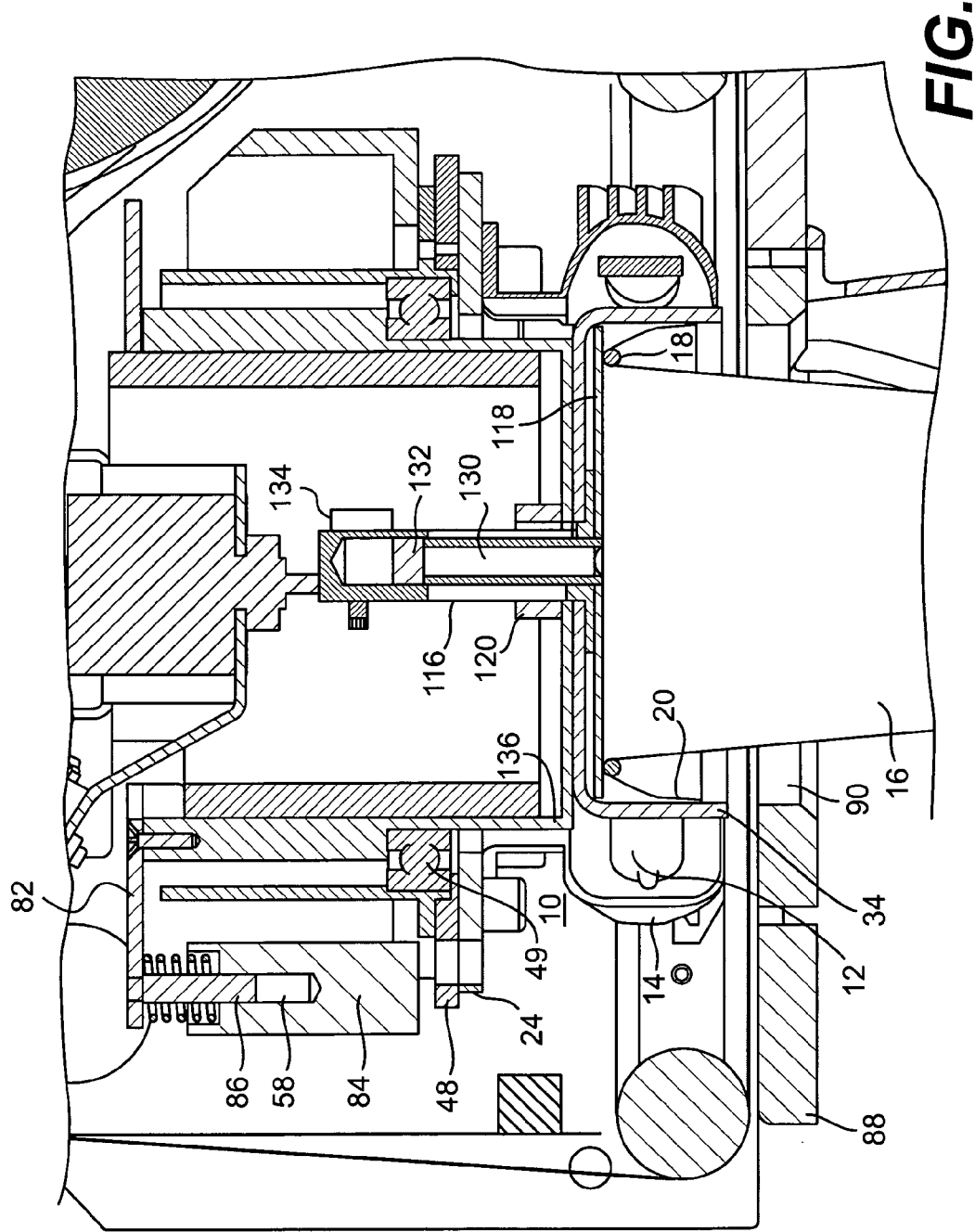
FIG. 2 is a cut away view of a lidding system according to an embodiment of the present invention.

The lidding system may further include a modular rotational assembly driver 48, as shown in FIG. 2. The assembly driver 48 is capable of providing rotational movement to the modular rotational assembly 22, including the reflective cup assembly 10 (see FIG. 1). The assembly driver 48 can be a gear, or other known means for providing rotational movement. The driver 48 may be connected via bearings 49 to a vertical mounting bracket 136 (see FIG. 2). The assembly driver 48 is capable of being driven by a motor driven drive system (not shown) that transfers energy for movement of the driver 48. When the assembly driver 48 is moved, the modular rotational assembly 22 is rotated at least around a portion of the circumference of a brim 18 of a beverage container 16.

The modularity of the rotational assembly 22 allows for the removal of the modular rotational assembly 22 for servicing and maintenance. In particular, in one embodiment the upper plate 24 is connected to the driver 48 by bolts (not shown), or other fastening means. To remove the rotational assembly 22, the upper plate 24 may be disconnected from the driver 48 by removal of the bolts, or other fastening means.

Figure 14:
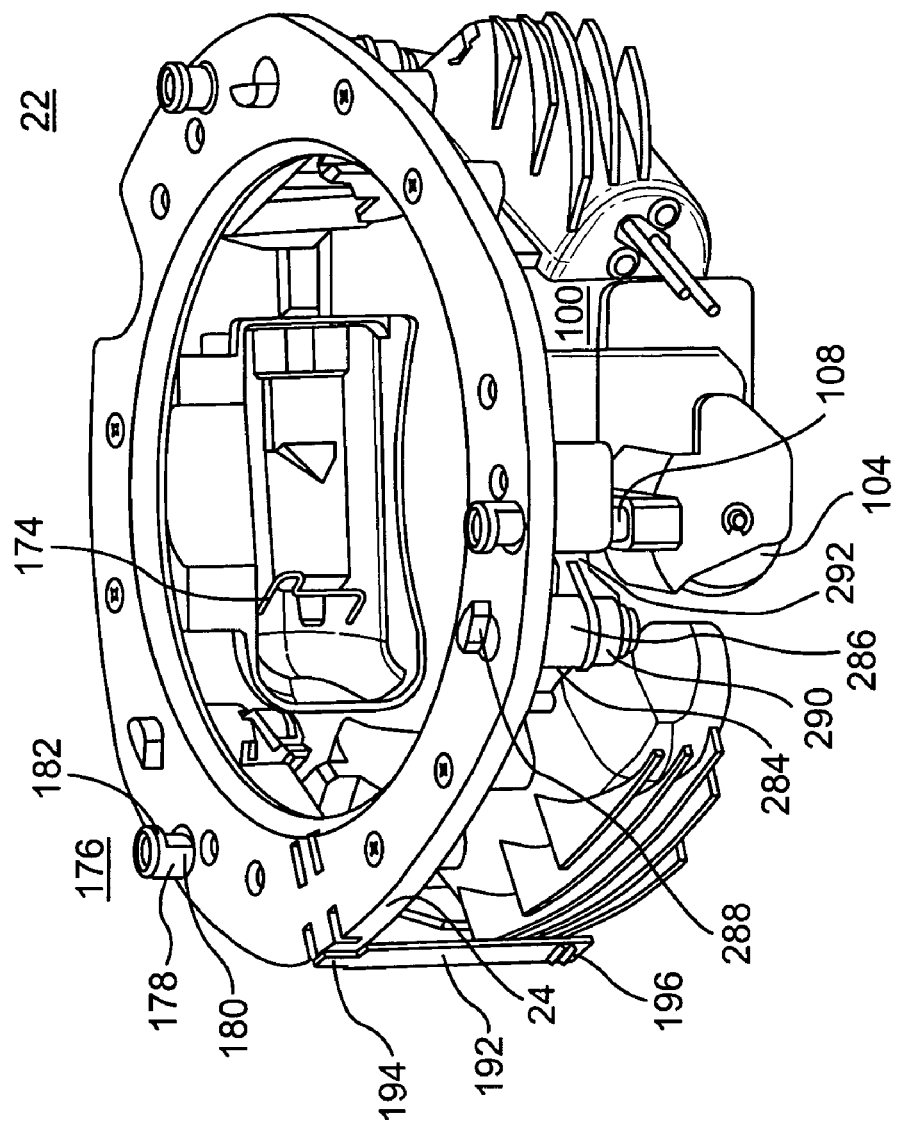
FIG. 14 illustrates a modular rotational assembly according to another embodiment of the present invention.

In another embodiment, the modular rotational assembly 22 is capable of being attached to and detached from the driver 48 via a slide locking means 176. In particular, as depicted in FIG. 14, the upper plate 24 may include at least one locking post 178, the locking post 178 may have a lower body portion 180 and an upper body portion 182, and, further, extend above the upper plate 24. The locking post 178 may have a substantially cylindrically shaped body. The lower body portion 180 may be smaller in diameter than the upper portion 182 of the locking post 178. In the embodiment depicted in FIG. 14, the upper plate 24 has three locking posts 178. Those of ordinary skill in the art will understand that more than three locking posts 178 can be included in the modular rotational assembly 22. In the embodiment depicted in FIG. 14, the locking posts 178 are integral with the cutting member assembly 100 (discussed in detail below) and extend through the upper plate 24. Those of ordinary skill in the art will understand that the locking posts 178 can be separate from the cutting member assembly 100 and, instead, be attached to and extend upwardly from the surface of the upper plate 24.

Figure 15:
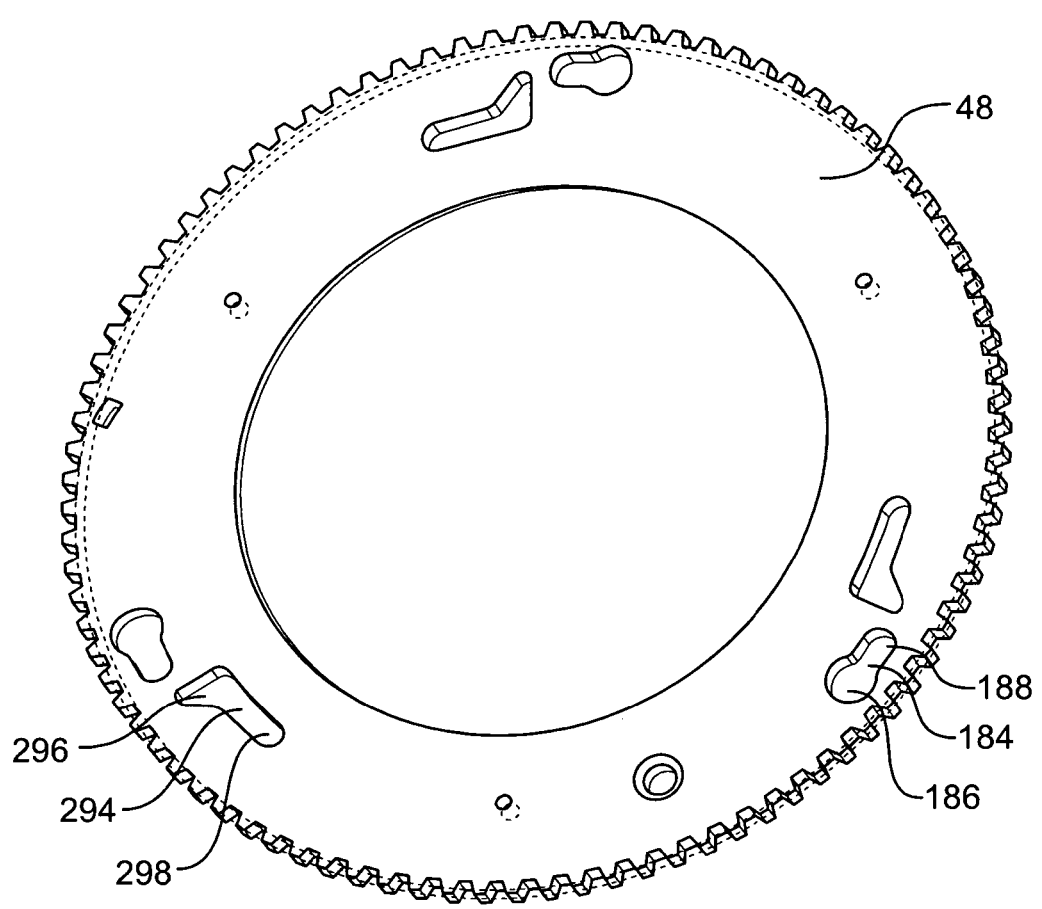
FIG. 15 illustrates a driver according to an embodiment of the present invention.
Figure 16:
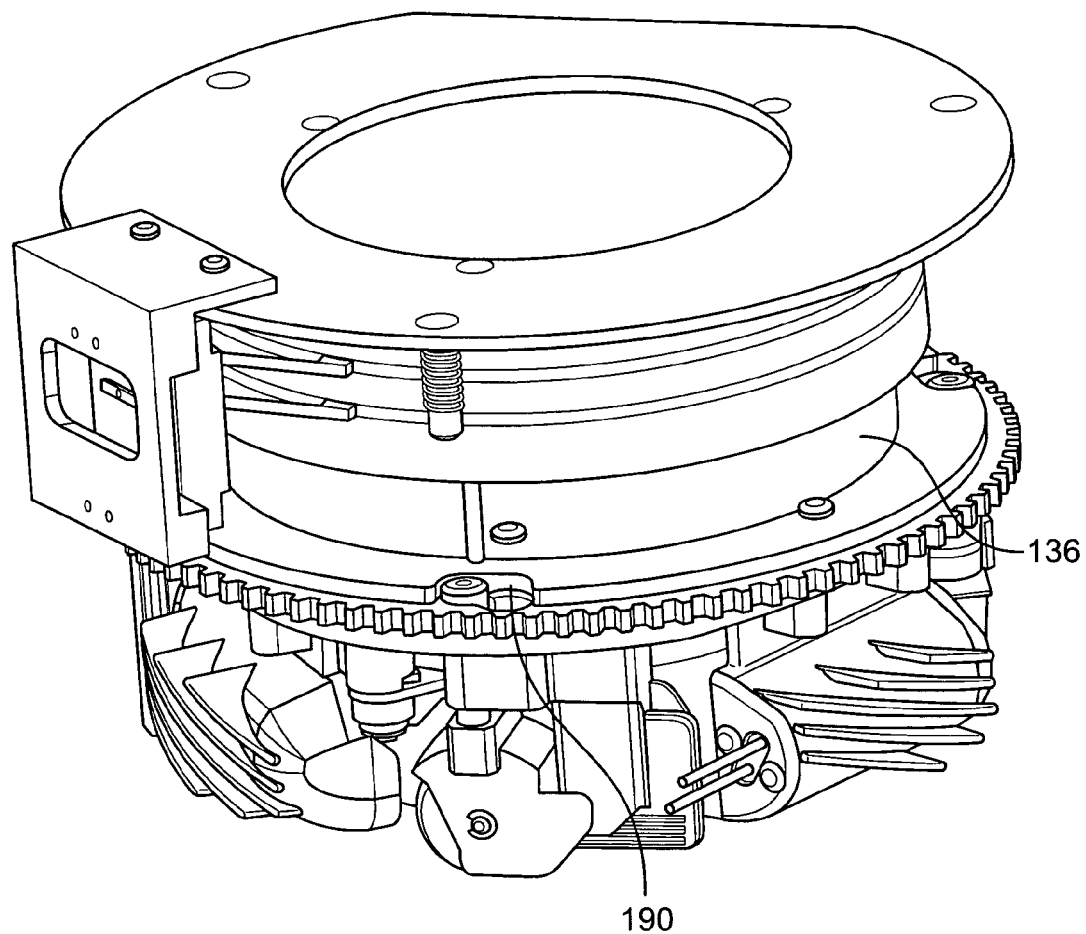
FIG. 16 illustrates an assembly of a portion of a lidding system according to an embodiment of the present invention.

When the slide locking means 176 is provided to allow the modular rotational assembly 22 to be attached to and removed from the driver 48, the driver 48 should have a detent 184 capable of receiving the locking post 178. FIG. 15 depicts a driver 48 having a detent 184 for receiving a locking post 178. As shown, the detent 184 has a larger receiving section 186 capable of receiving the upper portion 182 of the locking post 178 and a smaller receiving section 188 capable of receiving the lower body portion 180. The opening in the smaller receiving section 188 of the detent 184 is smaller than the upper portion 182 of the locking post 178, such that when the locking post 178 is located in the smaller receiving section 188 of the detent 184, the upper portion 182 is substantially prevented from being pulled through the driver 48. The driver 48 should have at least one detent 184 for each locking post 178 on the modular rotational assembly 22. Moreover, when a slide locking means 176 is included in the system, the vertical mounting means 136 should have cutouts 190 (see FIG. 16) to allow for the movement of the locking posts 178 during the locking operation (discussed below).

To attach the modular rotational assembly 22 to the driver 48, the assembly 22 is moved upwardly such that the locking posts 178 extend through the larger receiving section 186 of the detents 184 in the driver 48. The entire modular rotational assembly 22 is then turned slightly such that the locking posts 178 are moved into the smaller receiving section 188 of the detents 184, thereby locking the modular rotational assembly 22 into place.

A release lever 192 may be provided to assist in holding the modular rotational assembly 22 in this locked state. In particular, as shown in FIG. 14, the release lever 192 may be in communication with the upper plate 24, with one end of the release lever 192 extending upwardly such that it is communication with the driver 48. The driver 48 may have a receiving orifice 193 (see FIG. 15) that is capable of being in communication with the release lever 192. Once the modular rotational assembly 22 is locked into place, rotation of the assembly 22 is substantially prevented until the release lever 192 is moved such that it is not in communication with the driver 48. In the embodiment depicted in FIG. 14, the release lever 192 is pivotable, such that by pressing on a lower portion 196 of the release lever 192, the upper portion 194 is removed from contact with the driver 48 and the modular rotational assembly 22 can be rotated and removed from engagement with the driver 48. Those of ordinary skill in the art will understand that there are other means for preventing the unwanted disengagement of the modular rotational assembly from the driver, such as, for example, by providing a spring means or other known holding means.

Each radiant energy source 12 is capable of producing radiant energy for shrinking a film 20 by emitting radiant energy having wavelengths in the visible and near infrared range. Those of ordinary skill in the art will understand that the wavelength of the energy emitted by the radiant energy source is not particularly critical so long as the ink chosen is sufficiently absorbent over a range of the wavelengths emitted such that film shrinkage is reasonably rapid. Of course, care must be taken to insure that the surfaces serving as reflectors are actually reflective for radiation in the chosen wavelengths if radiation outside the visible range is emitted.

One radiant energy source 12 that may be used in the present invention is a conventional tungsten halogen lamp emitting light energy having wavelengths at least between approximately 600–1400 nm. Those of ordinary skill in the art will understand that a number of different radiant energy sources are available which produce sufficient visible and near infrared radiation, such as xenon arc lamps. The energy source may have a total wattage of between 150–1000 watts for compatibility with standard electrical wiring/circuiting. One radiant energy source that has been successfully used is a Ushio 120V300W FNB. As depicted in FIG. 2, the radiant energy source 12 is axially oriented, however, those of ordinary skill in the art will understand that other radiant energy source orientations can be effective.

Figure 3:
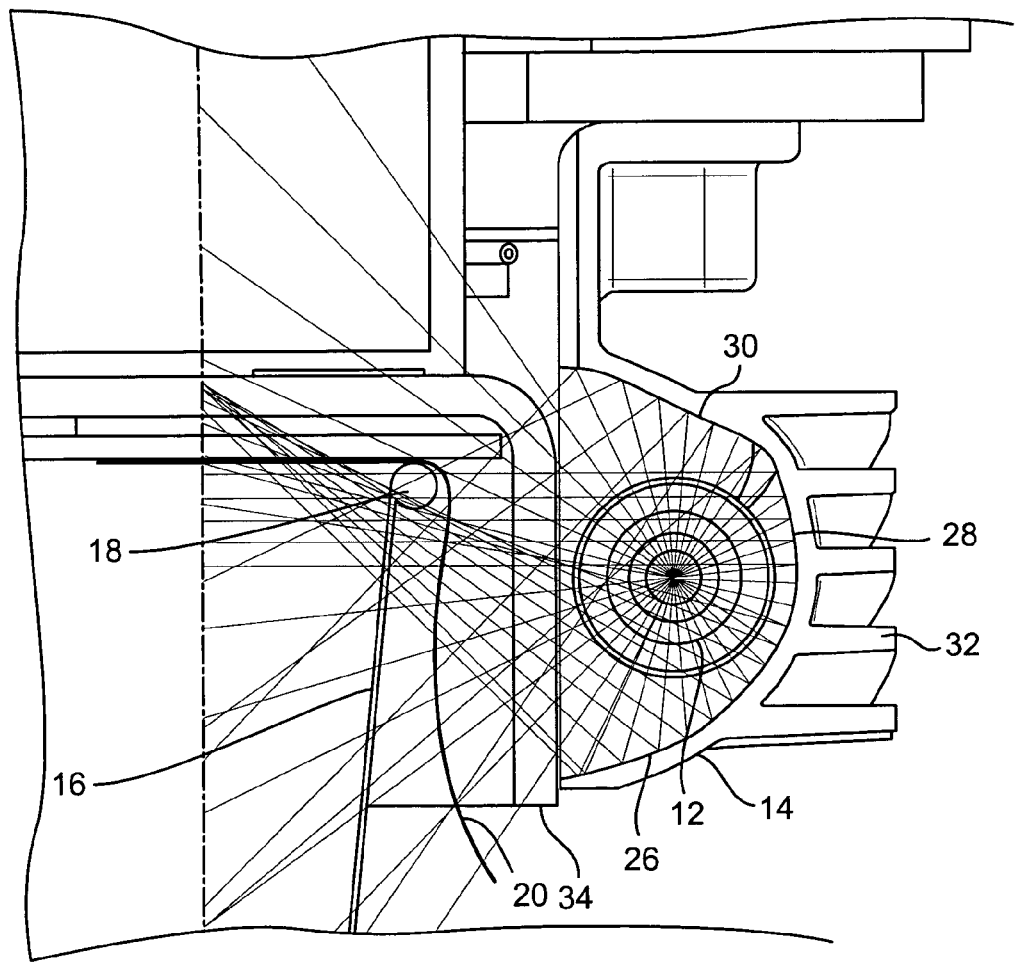
FIG. 3 illustrates a reflective cup assembly according to an embodiment of the present invention.

In operation, each reflective cup 14 reflects radiant energy emitted from its corresponding radiant energy source 12 and directs it to the area where film shrinkage is desired, i.e., a target area on the film 20. As depicted in FIG. 3, in one embodiment the cross-section of the reflective cup 14 has multiple geometries. In particular, in this embodiment, the lower portion 26 of the reflective cup 14, i.e., the area below a point just above the centerline of the radiant energy source 12, is elliptical. The elliptical lower portion 26 reflects a substantial portion of the incident light in an upward direction to the area just below the brim 18 of the beverage container 16, thereby causing the incident light to strike the film 20 at the area just below the brim 18 of the beverage container 16. The upper middle portion 28 of the reflective cup 14 of this embodiment, i.e., the area just above the centerline of the radiant energy source 12, is parabolic, with the focal point of the parabola coincident with the center of the radiant energy source 12. The upper middle portion 28 reflects the incident light in a substantially parallel and horizontal pattern, thereby causing the incident light to substantially strike the film 20 at the area just below the brim 18 of the beverage container 16. The upper portion 30 of the reflective cup 14 in this embodiment, located above the middle portion 28, is a substantially linear surface that reflects the incident light in a downward direction, therefore causing a substantial portion of the incident light to contact the entire upward area of the beverage container 16. The downward reflection of the incident light deflects light that would otherwise contribute to heat build-up in the components in the reflective cup assembly 10. The front face of the reflective cup 14, i.e., the portion facing the beverage container 16, is open, or can be covered with a protective optical element as described below.

In the embodiment depicted in FIG. 3, the reflective cup 14 has cooling fins 32. When the reflective cup 14 rotates, the fins 32 provide airflow over the heat generating components, thereby reducing heat build-up in the system.

The inner surface of the reflective cup 14 may have a smooth, mirror-like surface to aid in reflecting the radiant energy. For example, the inner surface may have a metallized silver-coated or gold-coated mirrored surface to reduce reflection losses. Those of ordinary skill in the art will understand that there are a variety of surfaces and coatings that can be used to reflect radiant energy. In addition, those of ordinary skill in the art will understand that similar results can be achieved using different numbers of surfaces and shapes. Further, an overcoat may be used to prevent oxidation of the metallized layer.

In operation, the beverage container 16, such as a cup, is filled with a liquid beverage, such as water, carbonated or non-carbonated soda, or coffee. During the lidding operation, described below, liquid could potentially splash onto parts of the reflective cup assembly 10, such as the radiant energy sources 12 or the reflective cups 14, causing damage or reducing efficiency. In one embodiment, as shown in FIGS. 2 and 3, a protective optical element 34 is interposed between the beverage container 16, and the radiant energy sources 12 and the reflective cups 14. The protective optical element 34 should be constructed of materials that minimize loss of radiant energy, thereby allowing sufficient radiant energy to pass through and contact the film. In one embodiment, the protective optical element 34 may be constructed of plastic. In another embodiment, the protective optical element 34 may be constructed of glass. In addition, an optical coating may be used to minimize energy loss and/or heat build-up in the protective optical element 34. Those of ordinary skill in the art will understand that a variety of materials can be used to construct the protective optical element 34. The protective optical element 34 can be a separate element, as shown in FIGS. 2 and 3, or it can be integral with the reflective cup 14.

Figure 4:
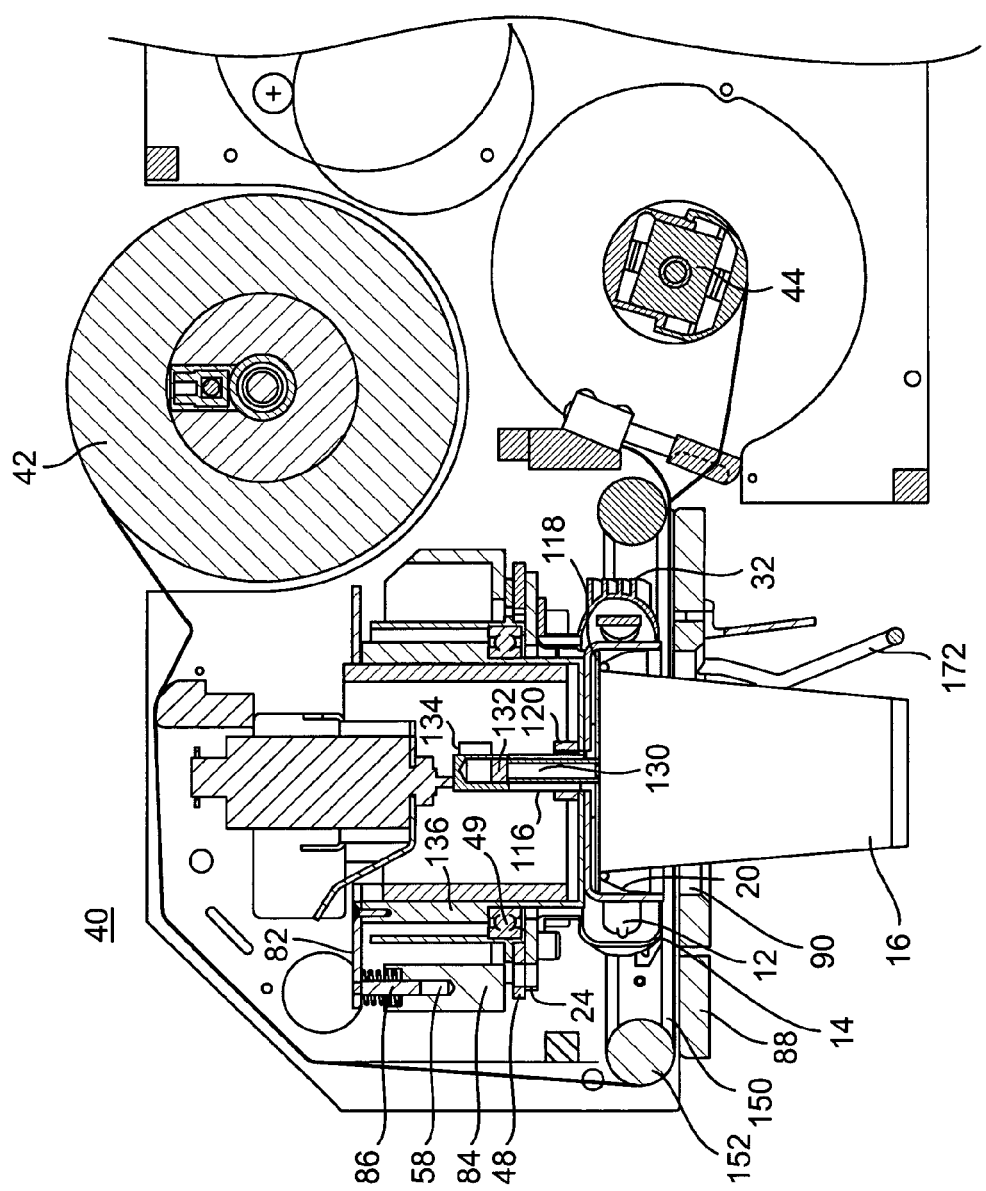
FIG. 4 is a schematic of a lidding system including a modular rotational assembly according to an embodiment of the present invention.
Figure 6:
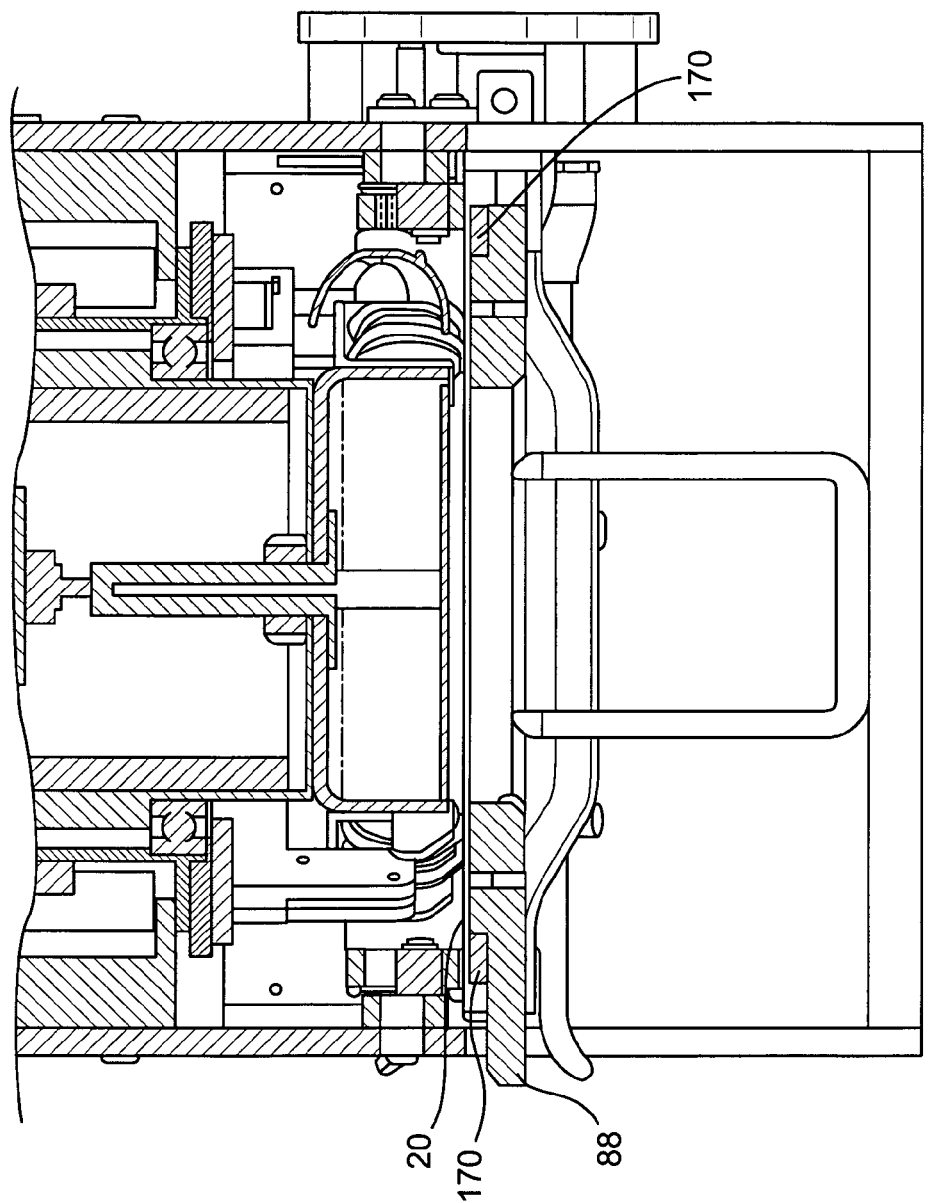
FIG. 6 is a perspective view of another embodiment of a portion of a lidding system according to the present invention.

The above described reflective cup assembly 10 can be used with the lidding system 40, now described. As depicted in FIG. 4, the lidding system 40 generally includes a supply roll 42, a take-up reel 44, and a film 20. In operation, the film 20 is transferred from the supply roll 42 to the take-up reel 44. In the embodiments depicted in FIGS. 4 and 9, the film 20 is transferred from the supply roll 42 to the take-up reel 44 by drive belts 150. In particular, in one embodiment, two drive belts 150 are included such that the drive belts 150 contact the outer edges of the film 20 as the film 20 is fed through the lidding system 40. Those of ordinary skill in the art will understand that more than two drive belts can be used. The drive belts 150 are oriented in the film feed, i.e., machine, direction, and may be further mounted on drive belt rollers 152, where the drive belt rollers 152 provide rotational movement for the drive belts 150. In particular, the drive belt rollers 152 are in communication with the motor driven drive system (discussed above and not shown) that transfers energy for movement of the drive belt rollers 152. In operation, the film 20 is interposed between, and in contact with, the drive belts 150 and a lower plate 88. As the drive belt rollers 152 rotate the drive belts 150, the frictional forces between the film 20 and the drive belts 150 cause the film 20 to be transferred from the supply roll 42 to the take-up reel 44. In one embodiment, shown in FIG. 6, the lower plate 88 can have a slide plate 170 to allow for easier movement of the film 20 over the lower plate 88. The slide plate 170 can be fabricated of aluminum having a non-stick coating, or other material with a reduced coefficient of friction. In one embodiment, the take-up reel 44 is operated in overdrive and includes a slip clutch (not shown) to assist in maintaining proper tension in the film 20.

Figure 9:
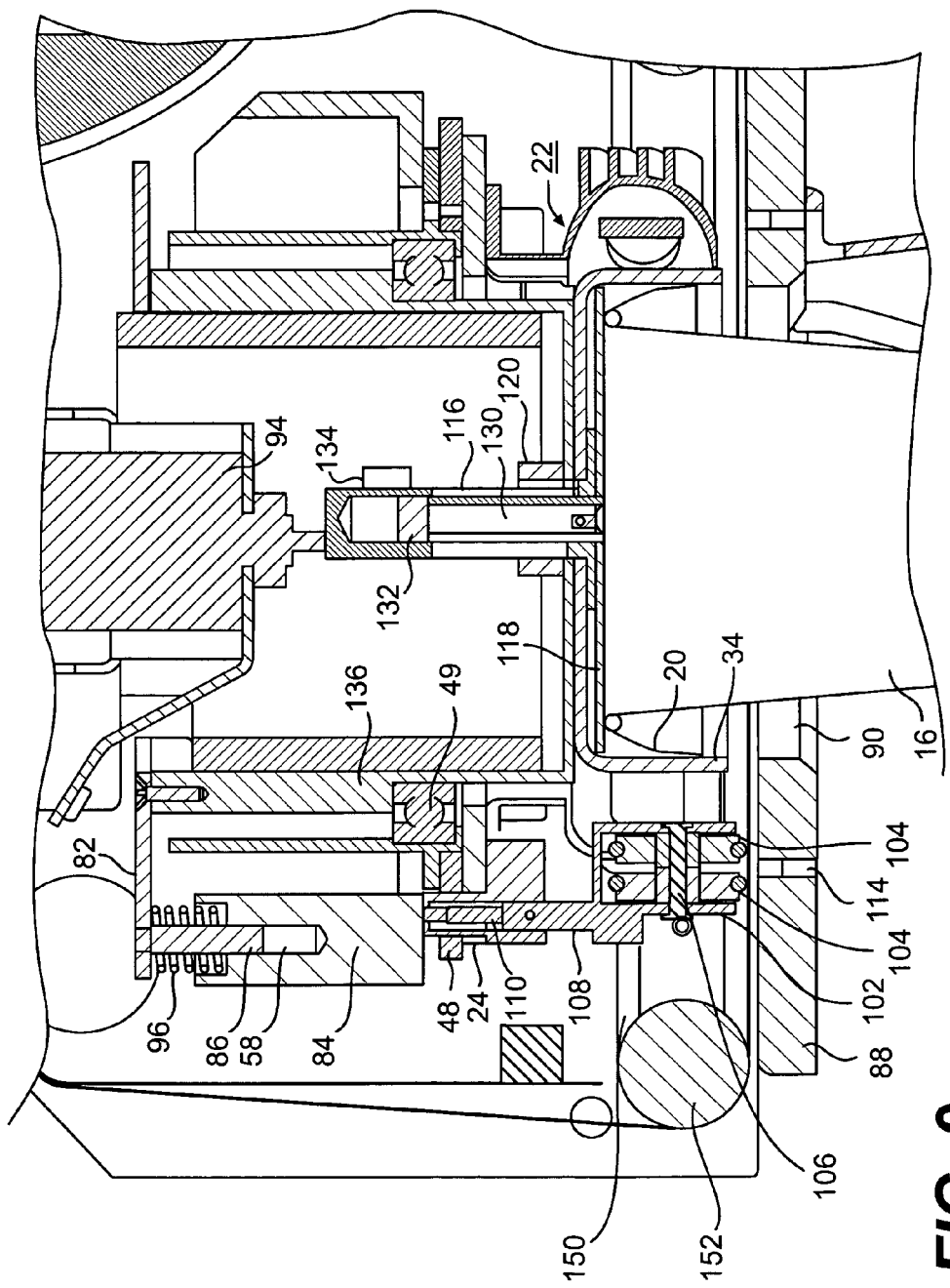
FIG. 9 is a cut away view of a lidding system including a web cutter according to an embodiment of the present invention.

Referring to FIG. 4, the modular rotational assembly 22 is located between the supply roll 42 and the take-up reel 44. Referring to FIGS. 2, 4, and 9, the lidding system 40 may further include a top plate 82, a fixed ring 84, and the lower plate 88. The modular rotational assembly 22 may be interposed between the fixed ring 84 and the lower plate 88. The top plate 82 may be in communication with the fixed ring 84. In particular, the top plate 82 may have top plate positioning members 86 that are in communication with fixed ring recesses 58 in the fixed ring 84.

The lower plate 88 may be positioned beneath the modular rotational assembly 22. The lower plate 88 may have an opening 90 for receiving an open-topped container 16. The opening 90 may be substantially circular. Moreover, the opening 90 may have a diameter slightly larger than the outside brim 18 diameter of the largest beverage container 16 to be lidded with the device. In one embodiment, the lower plate 88 has an opening 90 of from about 3.25" to about 4.50". In another embodiment, the lower plate 88 has an opening 90 of about 4.25". The lower plate 88 can have an opening of greater than 4.50".

The lidding system 40 may further include a glass clamp 116 and an activation plate 118. The glass clamp 116 may be connected to a vertical alignment mounting bracket 136 via a mechanical holding means 120, such as a nut. Those of ordinary skill in the art will understand that there are a variety of other means for connecting the glass clamp 116 to the mounting bracket 136, such as clamps, clips, pins, screws, and the like.

The lidding system 40 may also include a post 130, having an activation source 132, such as a magnet, located at an end opposite the activation plate 118, and a reed switch 134. The post 130 and activation source 132 may be located within the diameter of the glass clamp 116. The reed switch 134 may be attached to, and located on the exterior of, the glass clamp 116. In one embodiment, the lidding system 40 has a container positioning member 172 (see FIG. 4) that assists the operator with placement of the cup for lidding.

The lidding system of the present invention may further include a container positioning device, which may include the lower plate 88 and a container positioning means 198. The container positioning means 198 may be located proximate the opening 90 in the lower plate 88. The container positioning means may positively position the container 16 in the opening 90 of the lower plate 88.

Figure 17:
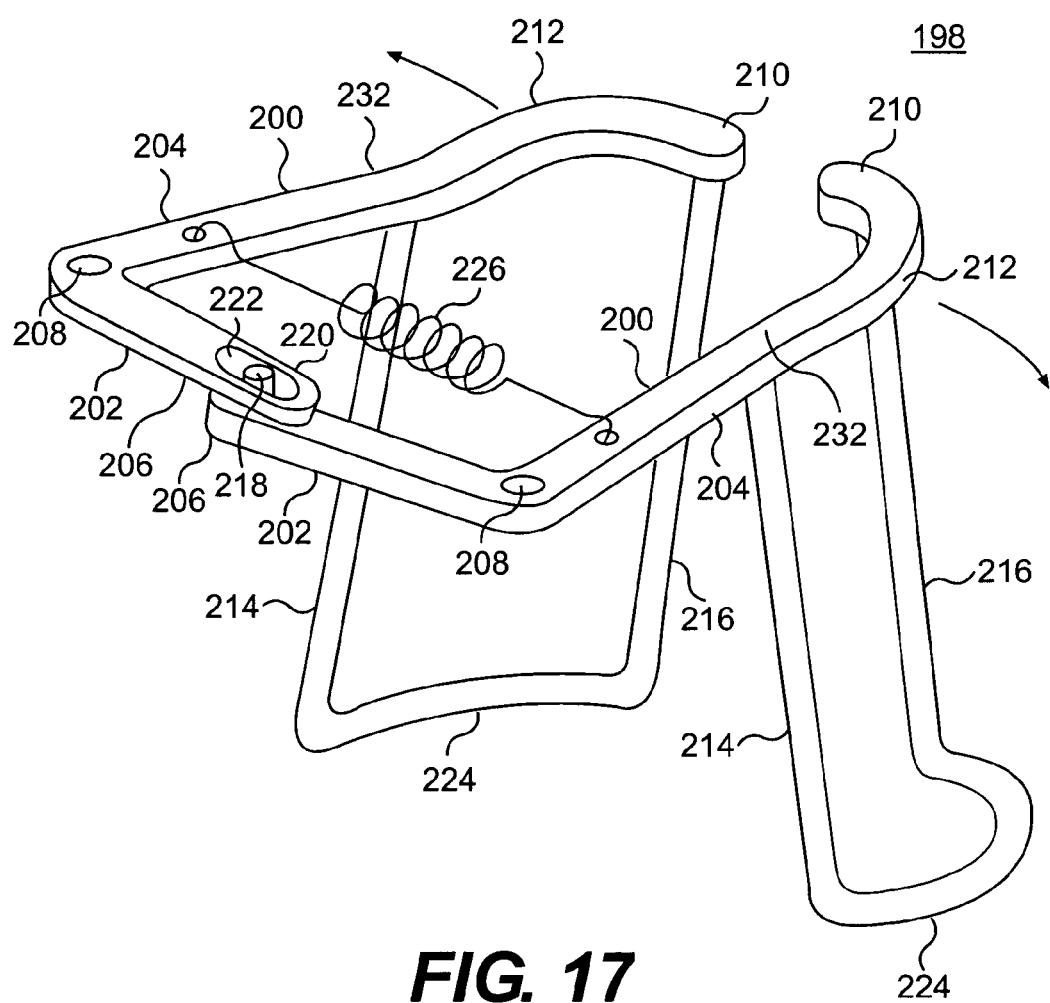
FIG. 17 illustrates an embodiment of a container positioning means according to the present invention.

In one embodiment of the present invention, as depicted in FIG. 17, the container positioning means 198 includes two pivotally mounted arms 200, the arms 200 each having a first leg 202 and a second leg 204. The first leg 202 of each arm 200 has a first end 206, and may be joined to the second leg 204 at a pivot point 208. The second leg 204 of each arm 200 has a distal end 210. Each of the arms 200 may be mounted to the lower plate at the pivot point 208. The arms 200 may be mounted by a pin, screw, bolt, or other mounting means known to those of ordinary skill in the art. The mounting means should allow each arm 200 to freely pivot about an axis substantially perpendicular to the surface of the lower plate 88. An end portion 212 of the second leg 204 may have a curvature that approximates the curvature of the brim of the smallest container 16 to be centered. In the embodiment depicted in FIG. 17, the curvilinear end portion 212 has a first end 232 and a second end, the second end being juxtaposable with the distal end 210 of the second leg 204. Each arm 200 may have a downwardly projecting side guide 214 and a downwardly projecting rear guide 216 to assist in positioning a container. The side guide 214 may be outwardly and downwardly flaring from the arm 200 at the first end 232 of the curvilinear end portion 212. The rear guide 216 may be outwardly and downwardly flaring from the second end 210 of the curvilinear end portion 212. In the embodiment depicted in FIG. 17, the side and rear guides are posts. The distal ends of the side guide 214 and the rear guide 216 may be connected by an alignment bar 224.

The arms 200 of the container positioning means may have a biasing means 226 that urges the distal ends 210 of the arms 200 towards one another. As shown in FIG. 17, the biasing means may be a coil spring. Those of ordinary skill in the art will understand that the spring means can be a flat spring, flexible plate, or any other means capable of providing a biasing force capable of causing the distal ends of the arms to tend towards one another. In addition, the two arms 200 of the container positioning means 198 may be connected via a linking means 218 at the first ends 206 of the first legs 202. In particular, in the embodiment depicted in FIG. 17, a pin 220 on one arm 200 reciprocates within a recess 222 formed in the second arm 200. Those of ordinary skill in the art will understand that other linking means, such as an elastically deformable plate, can be used to connect the arms. Moreover, those of ordinary skill in the art will understand that the first legs 202 of the two arms 200 can be a single deformable part joined by a spring means section.

Figure 18:
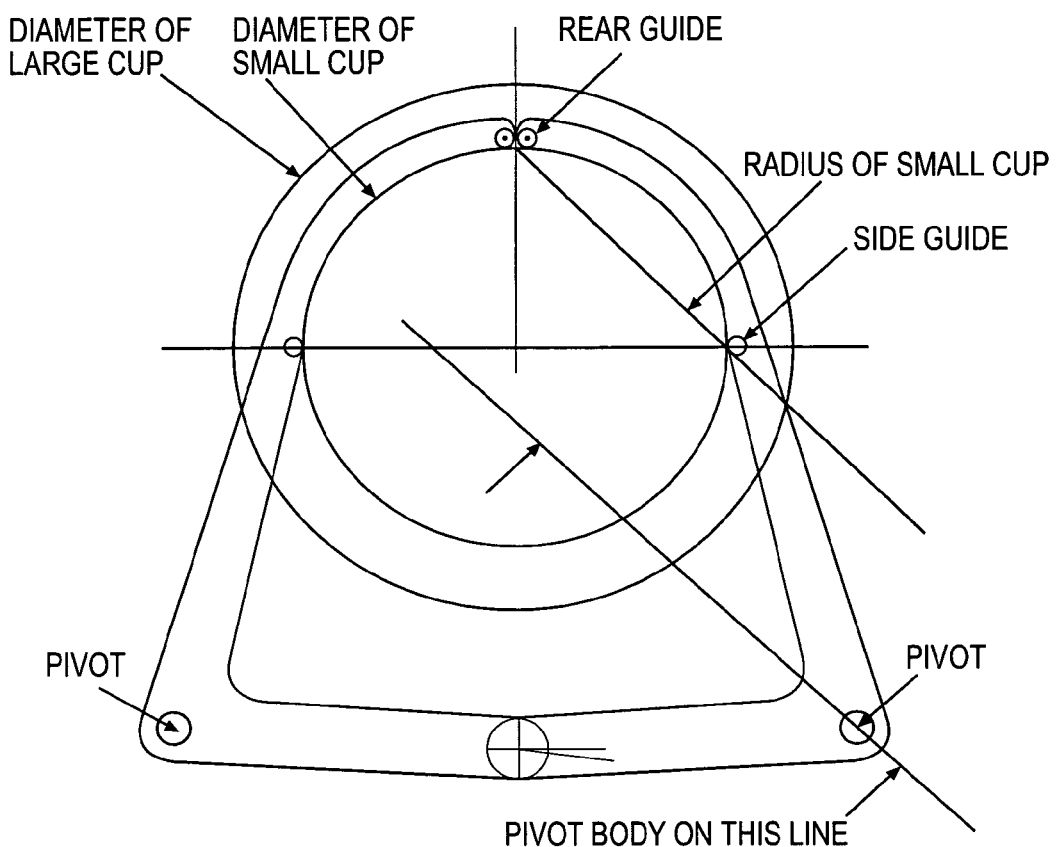
FIG. 18 illustrates a method of determining the geometry of a container positioning means according to the present invention.

The geometry of the container positioning means 198 of this embodiment can be determined using the following steps. Referring to FIG. 18, a circle can be drawn representing the smallest sized container to be centered. A horizontal diameter can then be drawn, where the intersections between the line and the circle identify the location of the side guide. Next, a radius can be drawn at a right angle from the diameter line to the top of the circle, identifying the location where the rear guides meet. A line is then drawn connecting the rear guide to the side guide. Finally, draw a line parallel to that drawn in the previous step, the line drawn one radius distance toward the center of the circle. The pivot point for the arm can be selected at any convenient point on this line that lies outside the circle. The opposing arm is a mirror image.

The operation of the above embodiment will now be discussed. When an open-topped container 16 having a smaller brim 18 diameter is inserted into the lower plate opening 90, e.g., a 16 oz. or 22 oz. container 16, the brim 18 may contact the side and rear guides 214, 216 of the container positioning means 198 as it is positioned in the opening 90. While the container 16 may contact the side and rear guide 214, 216 for purposes of centering the container 16, pressure necessary to move the guide surfaces need not be exerted on the guides.

When a large diameter container 16, e.g., a 32 oz. container, is inserted into the opening 90, the brim 18 diameter is larger than the effective opening 90 of the lower plate 88. As such, as the larger diameter container 16 is inserted into the opening 90, the brim of the container 16 exerts pressure on the side and/or rear guides 214, 216, thereby forcing the arms 200 to pivot about their respective pivot points 208 and increasing the effective opening 90 diameter such that the container can be fully inserted. During insertion, the arms should rotate outwardly an equal distance, thereby keeping the container 16 centered in a side-to-side direction. Moreover, the rear guides 216, which are attached to the arms 200, should move a roughly equivalent distance and, therefore, center the container 16 in a front-to-back direction. When the container 16 is removed, the biasing means 226 return the arms 200, and hence the side and rear guides 214, 216 to their starting position. Moreover, the structure of the container positioning means 198, i.e., the side and rear guides 214, 216 extending downwardly a significant distance, and possibly downwardly flaring, allows a container to easily be inserted into the container positioning means 198 from both a front direction and a lower direction, i.e., both horizontally and vertically.

Figure 19:
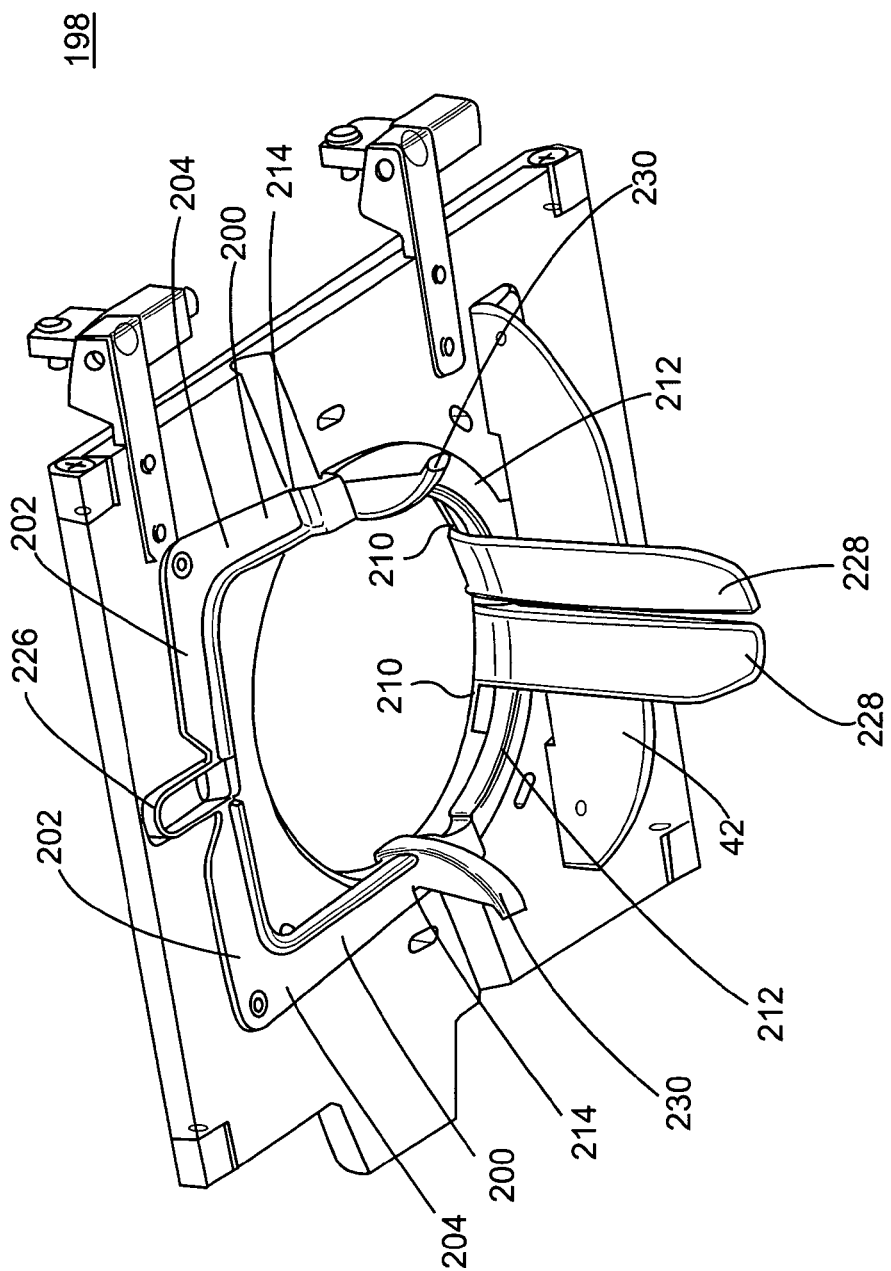
FIG. 19 illustrates a container positioning means according to another embodiment of the present invention.
Figure 20:
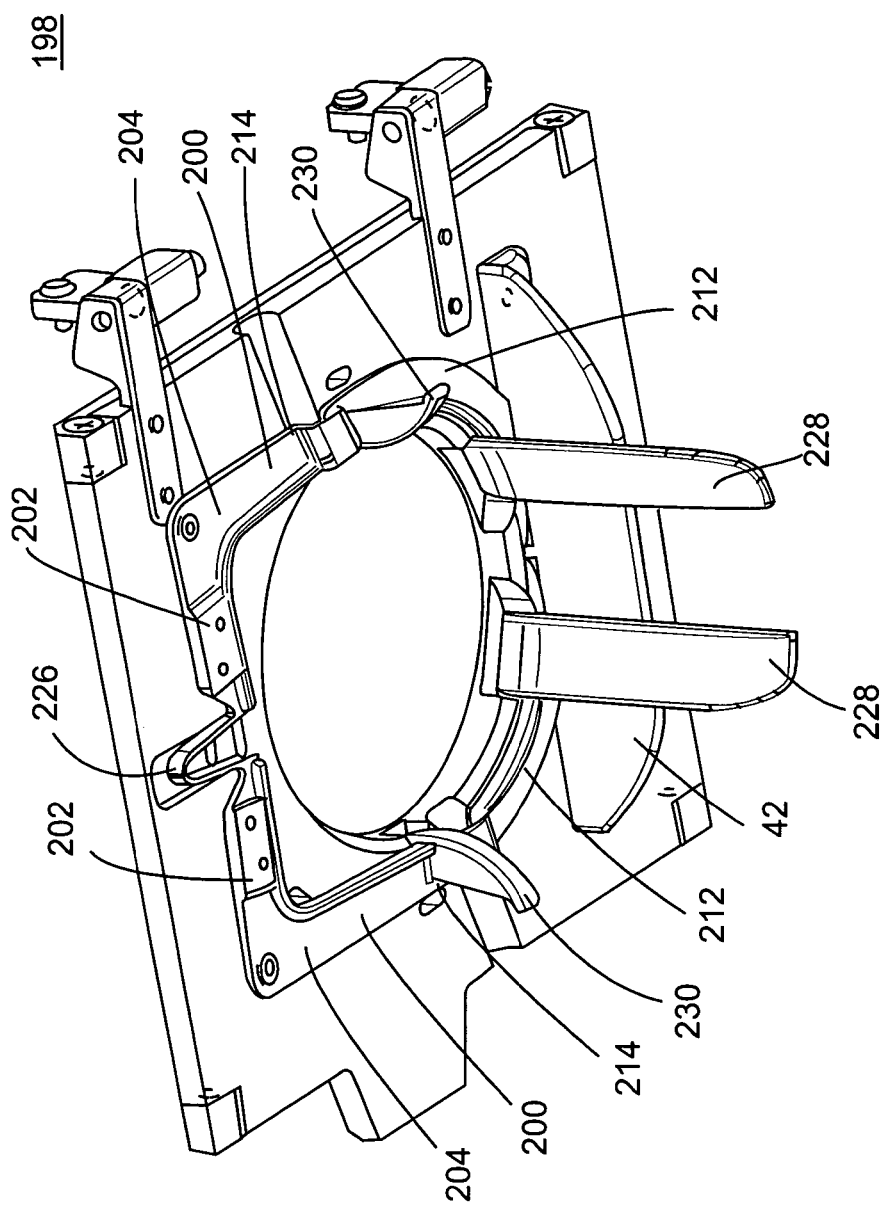
FIG. 20 illustrates another view of the container positioning means of the embodiment of FIG. 19.

FIGS. 19–20 depict another embodiment which in some aspects may be a variation of the above described embodiment. In particular, as shown in FIG. 19, the arms 200 of the container positioning means 198 are constructed of a single piece with the linking means 218 being a flexible spring means section that is integral with the arms 200. In one embodiment, the linking means 226 may also be a separate wire form piece. In addition, the side guides may be curved auxiliary guides 230 and the rear guides may be saddles 228, the saddles 228 being associated with each distal end 210 of the arms 200. As with the previous embodiment, the auxiliary guides 230 may extend downwardly from the arm 200 at the first end 234 of the curvilinear end portion 212, and each saddle 228 may extend downwardly from the second end 210 of the curvilinear portion 212. The saddles 228 may be oriented generally perpendicularly to the lower plate 88. Also depicted in FIGS. 19–20 is a protective guard 42 for assisting in keeping liquids away from moisture sensitive equipment.

The operation of the container positioning means 198 as depicted in FIGS. 19–20 is similar to that as the embodiment depicted in FIG. 17. FIG. 19 depicts the container positioning means 198 at rest, while FIG. 20 depicts the container positioning means 198 in an open position as if a larger diameter container 16 had been inserted. In particular, as shown in FIG. 20, when a larger diameter container 16 has been inserted, the auxiliary guides 230 may be forced outwardly towards the edges of the opening 90 of the lower plate 88 by the force exerted by the brim 18 of the container 16. The auxiliary guides 230 substantially maintain side-to-side centering of the container 16. As the arms 200 are forced outwardly, the distal ends 210 of the arms 200 likewise move outwardly, thereby moving the saddles 228 both outwardly and away from each other, as well as backward. As such, the saddles 228 substantially maintain the front-to-back centering of the container 16. Moreover, the described structure allows containers to be inserted into the container positioning means from both a forward direction and a lower direction. In particular, the curved auxiliary guides 230 may flare outwardly, thereby reducing the opportunity for interference with the container during insertion of the container.

In each of the above-described embodiments, the container positioning means 198 provides at least four positive potential contact points, i.e., the side and rear guide surfaces 214, 216, and the auxiliary guides 230 and saddles 228, respectively, capable of positively positioning a container 16. By "positively positioning" we mean that the contact points are capable of positioning a container in a predetermined location within the lidding system. The contact points are capable of positioning the container without the necessity of the operator manually moving the contact points, other than by the force of the container itself. In particular, the four positive potential contact points contact the container 16, thereby limiting both side-to-side and front-to-back movement of the container 16 as it is centered and moved through the lower plate 88. Moreover, the above-described container positioning means 198 do not unduly inhibit placement of the container 16 as it is moved by the operator into position for centering until the container 16 is centered under the lower plate opening 90.

The container positioning means 198 can be used to center the container 16 within the opening 90 in the lidding system. However, those of ordinary skill in the art will understand that the container positioning means 198 can be used to position the container in any desired location, whether in the center of the opening, or forward or backward, or left or right, of the opening 90. The desired position of the container 16 in the opening 90 will depend on various factors, including, but not limited to, any pattern that may be imprinted on the film.

Other embodiments of container positioning means that may be used in the present invention are set forth in co-pending U.S. patent application Ser. No. 10/236,724, filed Sep. 5, 2002, which is incorporated herein by reference in its entirety.

Figure 36:
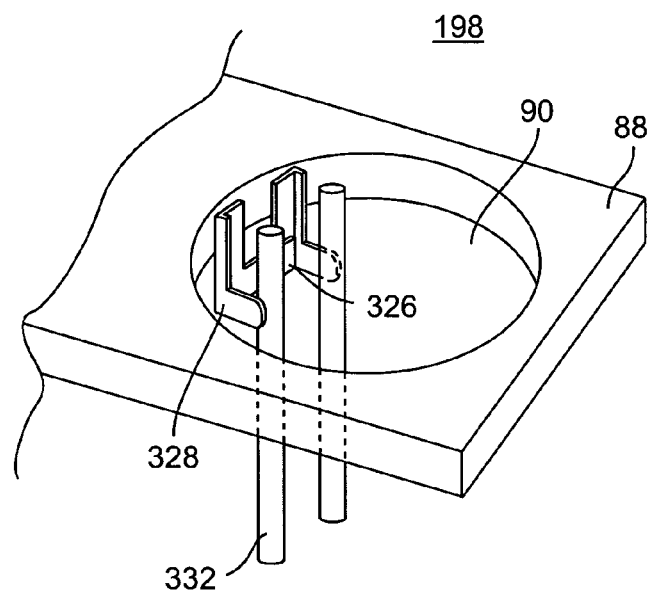
FIG. 36 illustrates a container positioning device according to another embodiment of the present invention.
Figure 37:
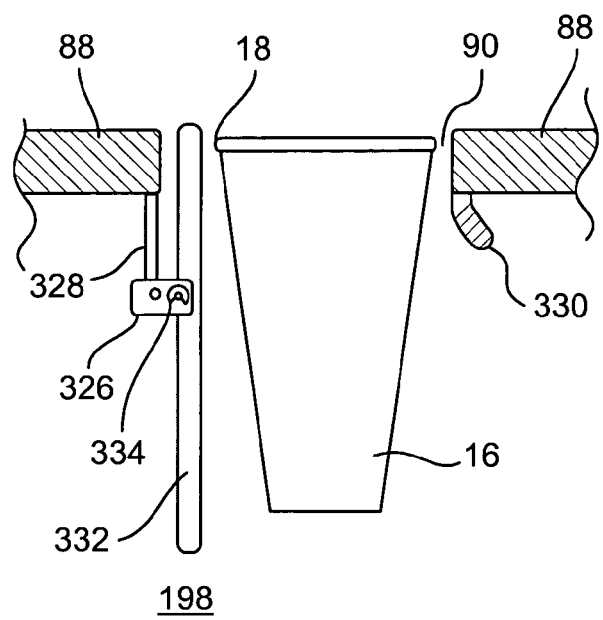
FIG. 37 illustrates a side view of the container positioning device depicted in FIG. 36.
Figure 38:
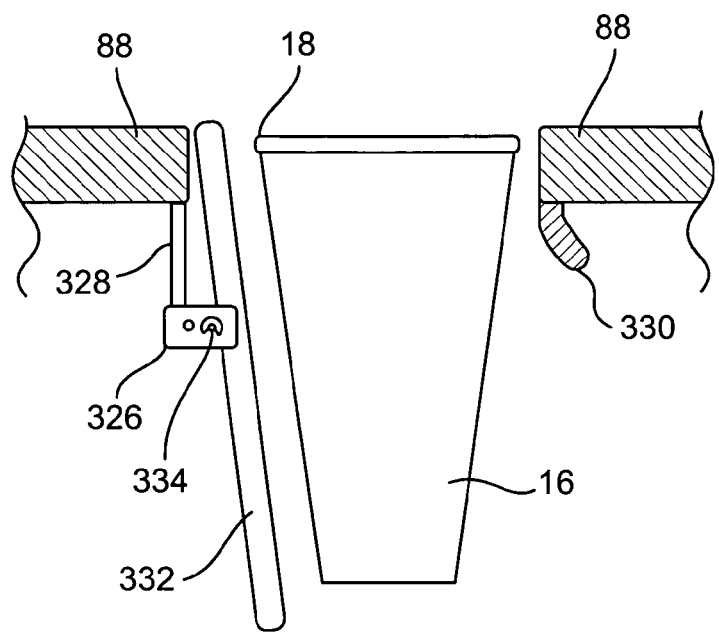
FIG. 38 illustrates another side view of the container positioning device depicted in FIG. 36.

In another embodiment, as shown in FIG. 36, the container positioning means 198 may include two pivotally mounted posts 332. The posts 332 may be pivotally mounted about a generally horizontal U-shaped hinge bracket 326 defined at near the lower end of a downwardly projecting extension bar 328. The container positioning device may further include at least one auxiliary guide 330 disposed near the operator side of an opening 90 of the lower plate 88 (see FIGS. 37 and 38). Those of ordinary skill in the art will understand that, while the auxiliary guide 330 is depicted in the figures as a protrusion from the lower plate 88, the auxiliary guide 330 can be any means for guiding a container into the lower plate 88, such as a chamfered edge on the lower plate 88. The container positioning means 198 may be opposite or away from the operator. In particular, the container positioning means 198 should not block operator access to the opening 90. The auxiliary guide 330 may be opposed to the container positioning means 198. As shown in FIGS. 37 and 38, an extension bar 328 may extend downwardly from the lower plate 88. The container positioning means 198 may be attached to the extension bar 328 via the substantially U-shaped hinge bracket 326. Those of ordinary skill in the art will appreciate that attachment means other than a substantially U-shaped hinge bracket 326 can be used to attach the container positioning means 198 to the extension bar 328 so long as interference with the container is avoided. As depicted in FIG. 36, the two posts 332 may extend substantially perpendicularly to the lower plate 88. The two posts 332 may be disposed away from the operator side of the opening 90. Those of ordinary skill in the art will understand that the container positioning means can have more than two posts.

As shown in FIGS. 36–38, the lower plate 88 may have an opening 90 for receiving an open-topped container 16. The opening 90 may be substantially circular. Moreover, the opening 90 has a diameter larger than the outside brim 18 diameter of the largest open-topped container 16 to be lidded with the device. The upper end of the container positioning means 198 may extend such that it is within the plane of the opening 90. As such, the opening 90 should be large enough to accommodate the brim 18 diameter of the largest open-topped container 16, as well as the upper portion of the container positioning means 198. In one embodiment, the opening 90 may be large enough such that when a smaller diameter container 16, e.g., 16 oz. or 22 oz., is inserted into the opening 90, the brim 18 of the container 16 need not exert pressure sufficient to pivot the container positioning means 198 (see FIG. 37). However, the opening 90 may be sized such that when a larger diameter container 16 is inserted into the opening 90, the brim 18 of the container 16 will contact the upper end of the container positioning means 198, pivoting it away from the brim 18, thereby increasing the effective diameter of the opening 90 (see FIG. 38).

As shown in FIG. 37, a biasing means 334 may be included. The biasing means 334 is capable of holding the container positioning means 198 substantially perpendicularly to the lower plate 88 when external pressure is not applied to the container positioning means 198. When included, the biasing means 334 may be located at the pivot point of the container positioning means 198. At least one auxiliary guide 330 may extend downwardly from the lower plate 88. The auxiliary guide 330 may be located opposed to the container positioning means 198. More than one auxiliary guide 330 may be used in this invention. When more than one auxiliary guide 330 is used with this invention, the auxiliary guides 330 may be positioned such that the center point of the auxiliary guides 330 is opposed to the container positioning means 198.

The operation of the above embodiment will now be discussed. Prior to insertion of an open-topped container 16 into the opening 90, the container positioning means 198 is positioned substantially perpendicularly to the lower plate 88. When an open-topped container 16 having a smaller brim 18 diameter is inserted into the lower plate opening 90, e.g., a 16 oz. or 22 oz. container 16, the brim may contact the container positioning means 198 as it is positioned in the opening 90. While the container may contact the container positioning means 198 for purposes of centering the container 16, pressure necessary to pivot the container positioning means 198 need not be exerted on the container positioning means 198. Therefore, the container positioning means 198 may not pivot (see FIG. 37). The auxiliary guide 330 may be included to assist the operator in centering the container 16.

When a larger diameter container 16, e.g., a 32 oz. container, is inserted into the opening 90, the brim 18 diameter is larger than the effective opening 90 of the lower plate 88. As such, as the larger diameter container 16 is inserted into the opening 90, the brim 18 of the container 16 exerts pressure on the upper portion of the container positioning means 198, thereby forcing the upper portion of the container positioning means 198 to pivot away from the container 16 and increasing the effective opening 90 diameter such that the container 16 can be fully inserted (see FIG. 38). The auxiliary guide 330 assists in positioning the container 16 in rough axial alignment with the opening 90 in the lower plate 88. In particular, the auxiliary guide 330 forces the operator to exert pressure against the container positioning means 198 in order to fully insert the container 16 into the opening 90. After the container 16 has been removed, the biasing means 334 returns the container positioning means 198 to its starting position.

Figure 39:
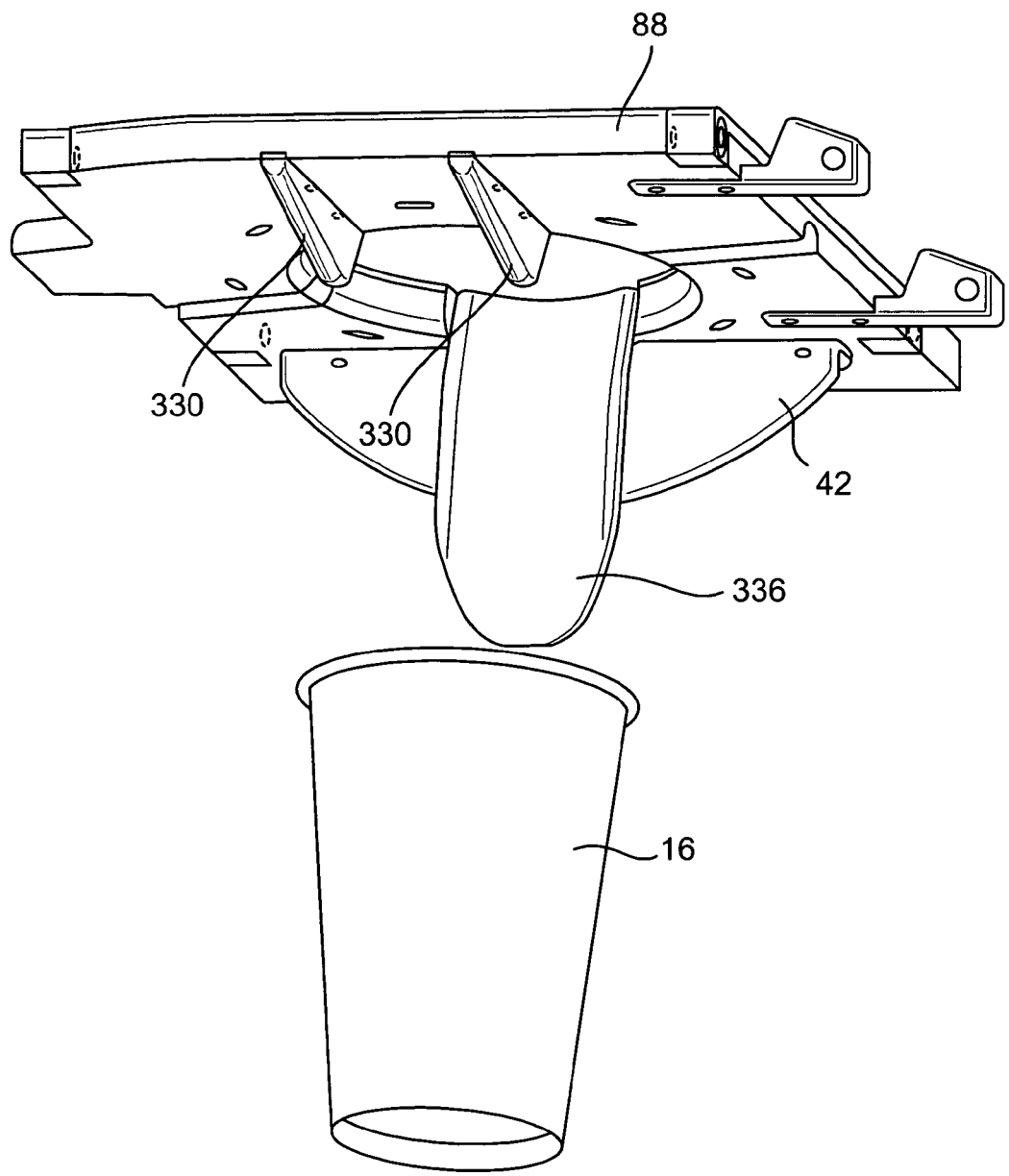
FIG. 39 illustrates a container positioning device according to yet another embodiment of the present invention.
Figure 40:
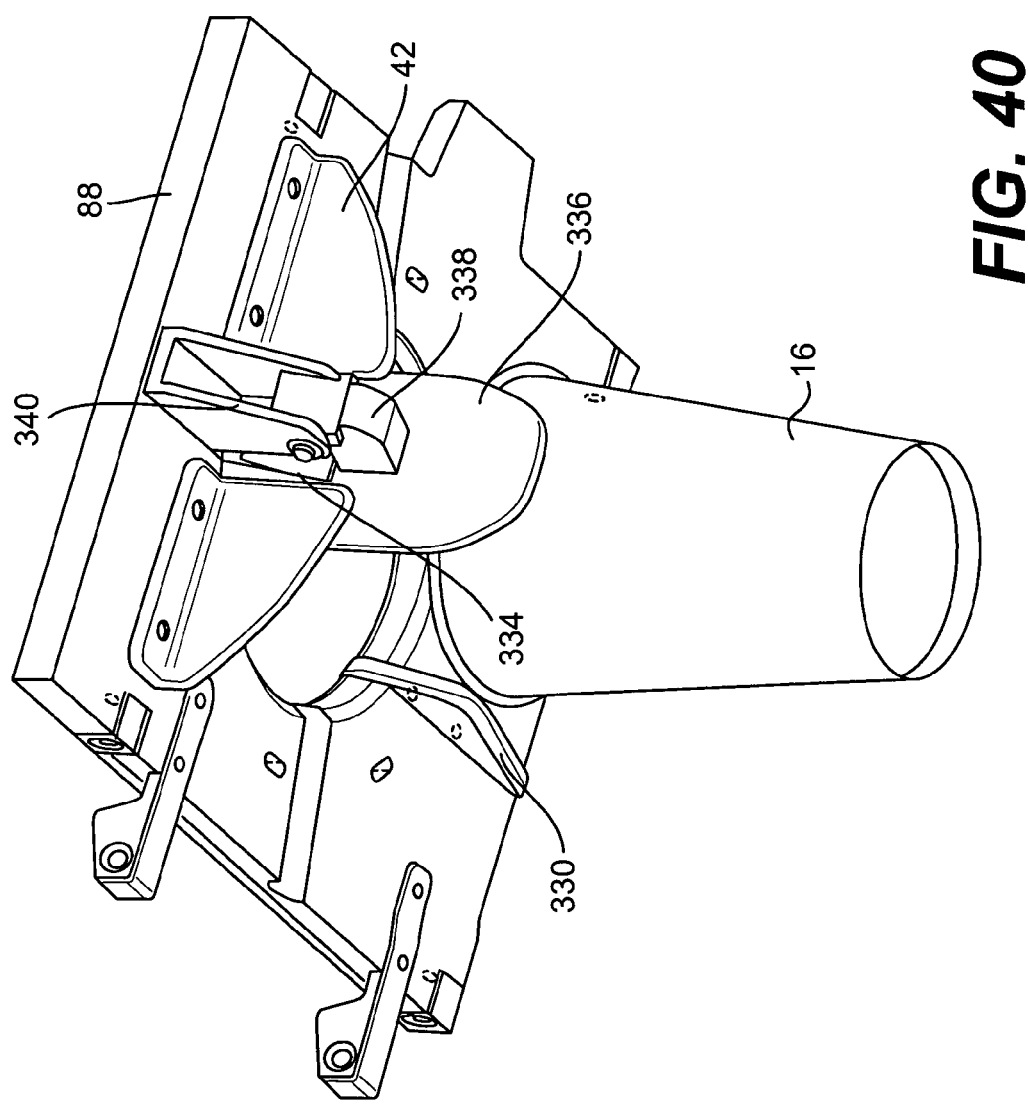
FIG. 40 illustrates a rear view of the container positioning device depicted in FIG. 39.

In another embodiment of the present invention, as depicted in FIGS. 39 and 40, the container positioning means 198 includes a positioning saddle 336. In one embodiment, the horizontal surface of the positioning saddle 336 is curved inwardly to roughly conform to the curve of the container 16 to be centered. Those of ordinary skill in the art will understand that it is not necessary for the positioning saddle 336 to be curved, and that any generally concave shape that will assist in centering a container can be used with this invention. In this embodiment, as shown in FIG. 40, the positioning saddle 336 has a bracket 338 that is integral with the positioning saddle 336, the bracket 338 being pivotally attached to a hinge bracket 326. In addition, the hinge bracket 338 is attached to the lower plate 88. A biasing means 334 may be provided to urge the positioning saddle 336 substantially perpendicularly to the lower plate 88. This embodiment may include at least one auxiliary guide 330. In the embodiment depicted in FIGS. 39 and 40, two auxiliary guides 330 are provided opposite to the positioning saddle 336. Finally, in this embodiment a protective guard 42 may be provided. The protective guard 42 can assist in keeping liquids away from moisture sensitive equipment. The operation of this embodiment is as described above.

Figure 41:
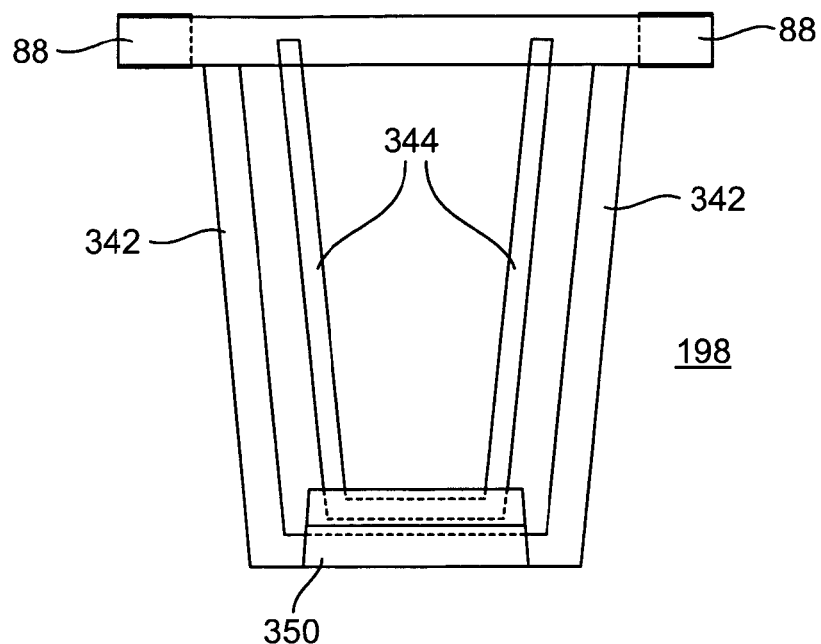
FIG. 41 illustrates a container positioning device according to yet another embodiment of the present invention.
Figure 42:
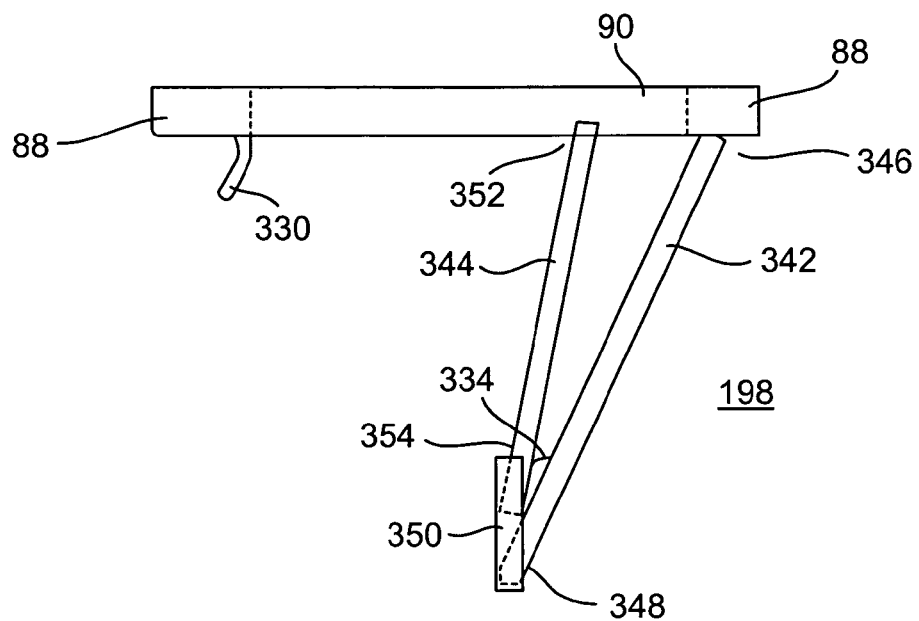
FIG. 42 illustrates a side view of the container positioning device depicted in FIG. 41.

In yet another embodiment of the present invention, as depicted in FIGS. 41–42, the container positioning means 198 includes two sets of posts capable of guiding the container into the opening 90. In particular, this embodiment has at least two outer posts 342 capable of guiding larger diameter containers 16 and at least two inner posts 344 capable of guiding smaller diameter containers 16. The inner posts 344 are located between the two outer posts 342 and are generally vertical and pivotable. Auxiliary guides 330, as described above, may be included in this embodiment.

As depicted in FIG. 42, the outer posts 342 have a first end 346 and a second end 348. Each of the outer post first ends 346 is fixedly attached to the lower plate 88, the lower plate 88 having an opening 90 as described above. In particular, the outer post first ends 346 are attached at the periphery of the lower plate opening 90. In the embodiment depicted in FIG. 42, the outer posts 342 are angularly attached to the lower plate 88 and inclined inwardly toward the axis of the opening 90 in the lower plate 88. Each of the outer post second ends 348 is connected to a hinge means 350. The inner posts 344 have a first end 352 and a second end 354. Each of the inner post second, or lower, ends 354 is connected to the hinge means 350. The hinge means 350 may have a biasing means 334 that causes the inner posts 344 to extend angularly and inwardly away from the outer posts 342 such that the inner post first ends 352 are within the diametrical plane of the opening 90. Those of ordinary skill in the art will understand that the biasing means 334 can be a spring, a flexible plate, or other means capable of providing a biasing force capable of causing the inner posts 344 to extend inwardly away from the outer posts 342.

The operation of the above embodiment will now be discussed. When an open-topped container 16 having a smaller brim 18 diameter is inserted into the lower plate opening 90, e.g., a 16 oz. or 22 oz. container 16, the brim 18 may contact the inner posts 344 of the container positioning means 198 as it is positioned in the opening 90. While the container 16 may contact the inner posts 344 of the container positioning means 198 for purposes of centering the container 16, pressure necessary to move the inner posts 344 towards the outer posts 342 need not be exerted on the inner posts 344. At least one auxiliary guide 330 may be included to assist the operator in centering the container 16.

When a larger diameter container 16, e.g., a 32 oz. container, is inserted into the opening 90, the brim 18 diameter is larger than the effective opening 90 of the lower plate 88. As such, as the larger diameter container 16 is inserted into the opening 90, the brim 18 of the container 16 exerts pressure on the inner posts 344 of the container positioning means 198, thereby forcing the inner posts 344 to move in the direction of the outer posts 342 and away from the container 16, increasing the effective opening 90 diameter such that the container 16 can be fully inserted. When an auxiliary guide 330 is used it can assist in positioning the container 16. In particular, the auxiliary guide 330 may force the operator to exert pressure against the inner posts 344 in order to fully insert the container 16 into the opening 90. After the container 16 is removed, the biasing means 334 returns the inner posts 344 to their starting position.

In each of the above-described embodiments, the container positioning means 198 provides at least two positive contact points, i.e., the posts 332, the terminal edges of the saddle 336, and the inner and outer posts 344 and 342, respectively, capable of positively positioning a container 16. In particular, the two positive contact points contact the container 16, thereby limiting lateral movement, i.e., side to side movement, of the container 16 as it is centered and moved through the lower plate 88. Moreover, the above-described container positioning means 198 do not inhibit placement of the container 16 as it is moved by the operator into position for centering until the container 16 is centered under the lower plate opening 90.

Figure 43:
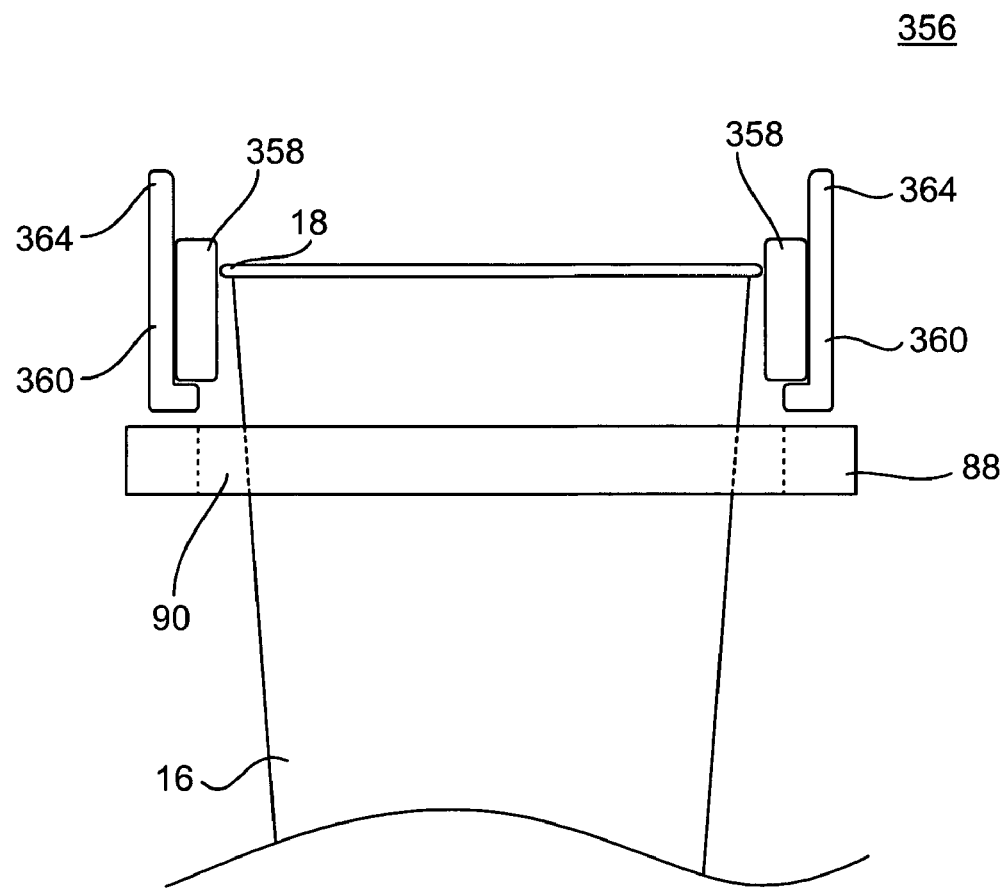
FIG. 43 illustrates an auxiliary container positioning device according to the present invention.
Figure 44:
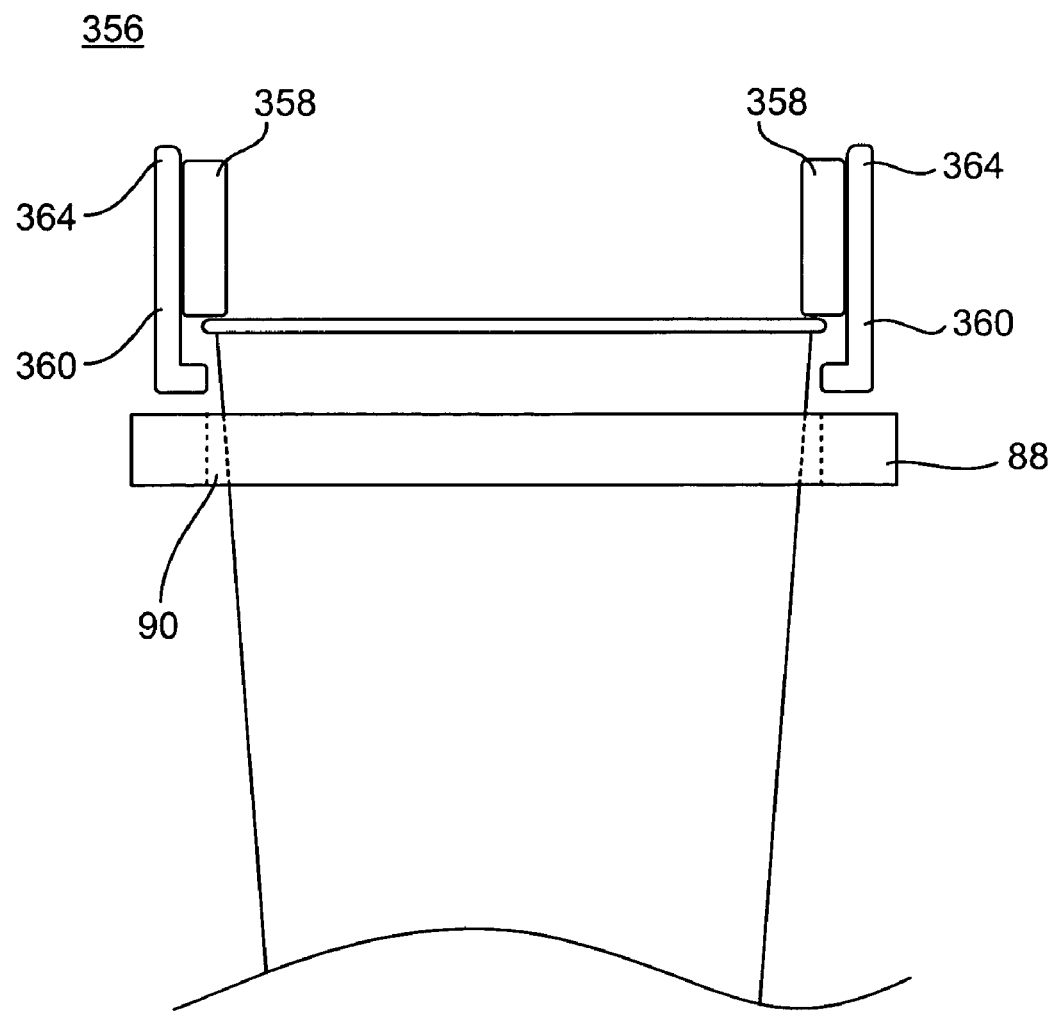
FIG. 44 illustrates another view of the auxiliary container positioning device according to the present invention.

In yet another embodiment of the present invention, as depicted in FIGS. 43 and 44, an auxiliary container positioning device 356 is included. The auxiliary container positioning device 356 may be used in combination with the container positioning device. When used with the container positioning device, the auxiliary container positioning device 356 is disposed above the lower plate 88 opposite the container positioning device. The auxiliary container positioning device 356 is capable of maintaining the positioning of the container 16 after it passes through the container positioning device. The auxiliary container positioning device 356 includes an inner ring 358 and a generally concentric outer ring 360, both disposed above the lower plate 88. In one embodiment the inner ring 358 may have an elongated body 362 and the outer ring 360 may have an elongated body 364. In one embodiment, the outer ring elongated body 364 extends past the inner ring elongated body 362. The inner diameter of the outer ring 360 should be slightly larger than the brim 18 diameter of the largest container 16 to be inserted into the auxiliary container positioning device 356. The inner ring 358 is positioned inside of the outer ring 360 and in axial slideable communication with the outer ring 360. The outer diameter of the inner ring 358 may be approximately the same diameter of the brim 18 of the largest container 16 to be inserted into the auxiliary container positioning device 356 and the inner diameter of the inner ring 358 should be slightly larger than that of the brim 18 diameter of a smaller diameter container 16. That is, when a larger diameter container 16 is inserted into the container positioning device, the brim 18 of the container 16 may contact the diameter of the inner ring 358. The inner ring 358 may be retained by the outer ring 360 to prevent the lower surface of the inner ring 358 from contacting the lower plate 88.

In one embodiment, e.g., when used with a radiant energy lidding device, the inner ring 358 and the outer ring 360 may be constructed of materials that minimize loss of radiant energy, thereby allowing sufficient radiant energy to pass through and contact a film. The rings 358, 360 may be constructed of plastic, glass, or other material that minimizes the loss of radiant energy. In addition, known optical coatings may be used to minimize energy loss and/or heat build-up in the rings 358, 360. Those of ordinary skill in the art will understand that a variety of materials can be used to construct the rings 358, 360.

The operation of the above embodiment will now be discussed. When an open-topped container 16 having a smaller brim 18 diameter is inserted through the lower plate opening 90, e.g., a 16 oz. or 22 oz. container 16, the container 16 may be inserted through the inner ring 358. While the smaller diameter container 16 may not contact the inner ring 358, the inner ring 358 may act as a guide for centering the container 16 (see FIG. 43). When a larger diameter container 16, e.g., a 32 oz. container, is inserted through the opening 90, the brim 18 diameter is larger than the opening of the inner ring 358, but smaller than the opening of the outer ring 360. As such, the brim 18 will contact the inner ring 358, pushing it upwards (see FIG. 44). In addition, the outer ring 360 may act as a guide for centering the container 16. When the container positioning device of this embodiment is used with a lidding system as described below, the inner ring 358 may contact an activation plate. After the container 16 is removed, the inner ring 358 returns to its starting position.

The lidding operation of the described apparatus will now be explained. After the beverage container 16 is filled with the desired beverage, the operator places the beverage container 16 in contact with the film 20 that has previously been cut (for example, see discussion below), and in proximity of the reflective cup assembly 10. The beverage container 16 is moved into the sealing position by pushing the activation plate 118, as well as the post 130 and activation source 132, upward. At an upward end of travel, the activation source 132 trips the reed switch 134, thereby activating the radiant energy source(s) 12 and initiating the rotational movement of the modular rotational assembly 22 by the driver 48.

As the reflective cup assembly 10 rotates, the radiant energy emits diffusely in all directions from the radiant energy source 12. A portion of the radiant energy travels directly to the area of the beverage container 16 located directly beneath the brim 18 of the beverage container 16. Another portion of the radiant energy contacts the reflective cup 14 and is directed to desired shrinkage area of the film 20 located around the brim 18 of the beverage container 16. As the radiant energy contacts the film 20, radiant energy is absorbed and the film 20 shrinks, forming a seal around the lid of the beverage container 16. The lidded beverage container 16 is then removed from the lidding system 40. When the container 16 is removed, a sensor (not shown) starts the advancement of the film 20 for the next lidding cycle.

The above-described lidding system 40 significantly may reduce film sealing time over prior art systems, while potentially achieving greater sealing strengths. In particular, as shown in Table 1 below, in the system described in U.S. Pat. No. 5,249,410, when the sealing duration was set at 1.4 seconds, the average sealing strength was 14.99 lbs. The sealing strength was measured using a hand held force gauge pressing downward on the center of the film with a ¾" diameter ball. In the lidding system of this invention, on the other hand, with a 1.0 second sealing time, the average sealing strength was 19.36 lbs. In each of the trials a 75 gauge Bemis Clysar XLP polyolefin shrink film was used, The following table lists the results of the trials.

TABLE 1

|  | '410 Patent (lbs) | Lidding System (lbs) |
| --- | --- | --- |
| 1 | 15.21 | 20.58 |
| 2 | 17.41 | 15.32 |
| 3 | 16.75 | 18.47 |
| 4 | 16.79 | 19.35 |
| 5 | 11.53 | 20.42 |
| 6 | 16.70 | 18.82 |
| 7 | 15.84 | 23.58 |
| 8 | 13.40 | 21.51 |
| 9 | 15.38 | 19.52 |
| 10 | 10.91 | 16.00 |
| average | 14.99 | 19.36 |

As such, the sealing strength of a film on a container using the lidding system of the present invention may be up to at least about 16 lbs. In one embodiment, the sealing strength of a film on a container using the lidding system of the present invention may be up to at least about 19 lbs.

In one embodiment, the radiant energy source(s) 12 may be pre-heated. In particular, phase control methods may be employed to control the output of the radiant energy sources 12, thereby reducing the amount of time required to sufficiently shrink the film 20 and, in addition, providing more consistent film shrinking. In one embodiment, the phase control method employed may include an AC photocoupler (not shown) to monitor the AC voltage, and a microcontroller (also not shown) to regulate the drive triac controlling the radiant energy sources 12. In an example operation, when the line voltage reaches approximately 0 volts, the micro-controller will delay turning on the triac for an specified amount of time, such that for every cycle the radiant energy sources 12 will only be energized for a portion of the time. The radiant energy sources 12 may be energized from about 1–20% of the cycle time. Graph 1, below, is illustrative.

[00163] In one embodiment, the radiant energy source(s) 12 may be pre-heated. In particular, phase control methods may be employed to control the output of the radiant energy sources 12, thereby reducing the amount of time required to sufficiently shrink the film 20 and, in addition, providing more consistent film shrinking. In one embodiment, the phase control method employed may include an AC photocoupler (not shown) to monitor the AC voltage, and a micro-controller (also not shown) to regulate the drive triac controlling the radiant energy sources 12. In an example operation, when the line voltage reaches approximately 0 volts, the micro-controller will delay turning on the triac for an specified amount of time, such that for every cycle the radiant energy sources 12 will only be energized for a portion of the time. The radiant energy sources 12 may be energized from about 1-20% of the cycle time. Graph 1, below, is illustrative.

Graph 1: AC Phase Control

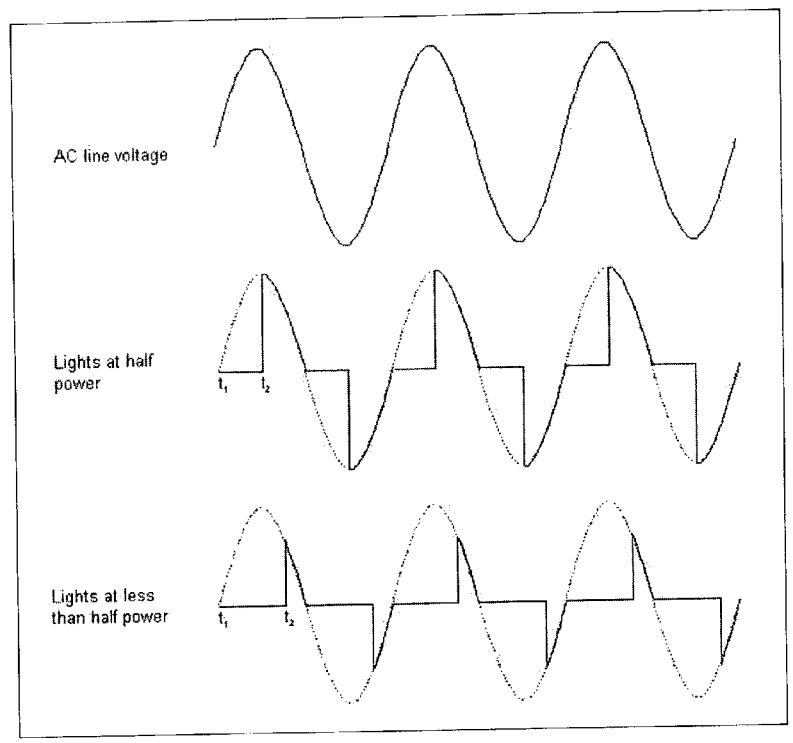

By only energizing the radiant energy sources 12 for a fraction of each cycle, the micro-controller can control the effective output of the radiant energy sources 12. Because the AC line voltage cycles at 60 Hz, and the radiant energy sources 12 cannot energize and de-energize that quickly, the actual output of the radiant energy sources 12 is proportionate to the average voltage across the radiant energy sources 12.

By controlling the light and heat output of the radiant energy sources 12, as described above, the micro-controller can minimize the time required to sufficiently shrink the film 20 onto a beverage container 16 by keeping the output of the radiant energy sources 12 at a low level when they are not being used. In this manner, the radiant energy sources 12 do not take as long to reach full illumination as they do from a cold start. Moreover, by pre-warming the radiant energy sources 12, a more consistent shrink may be provided. When the radiant energy sources 12 are energized from a cold start every time, the radiant energy source 12 output tends to shrink the film more when the lidding cycle frequency is high than when the lidding cycle frequency is low. This is because after frequent cycling the radiant energy sources are in a pre-warmed state and the subsequent energizing can overexpose the film to radiant energy contributing to undesirable heat build-up.

Figure 5:
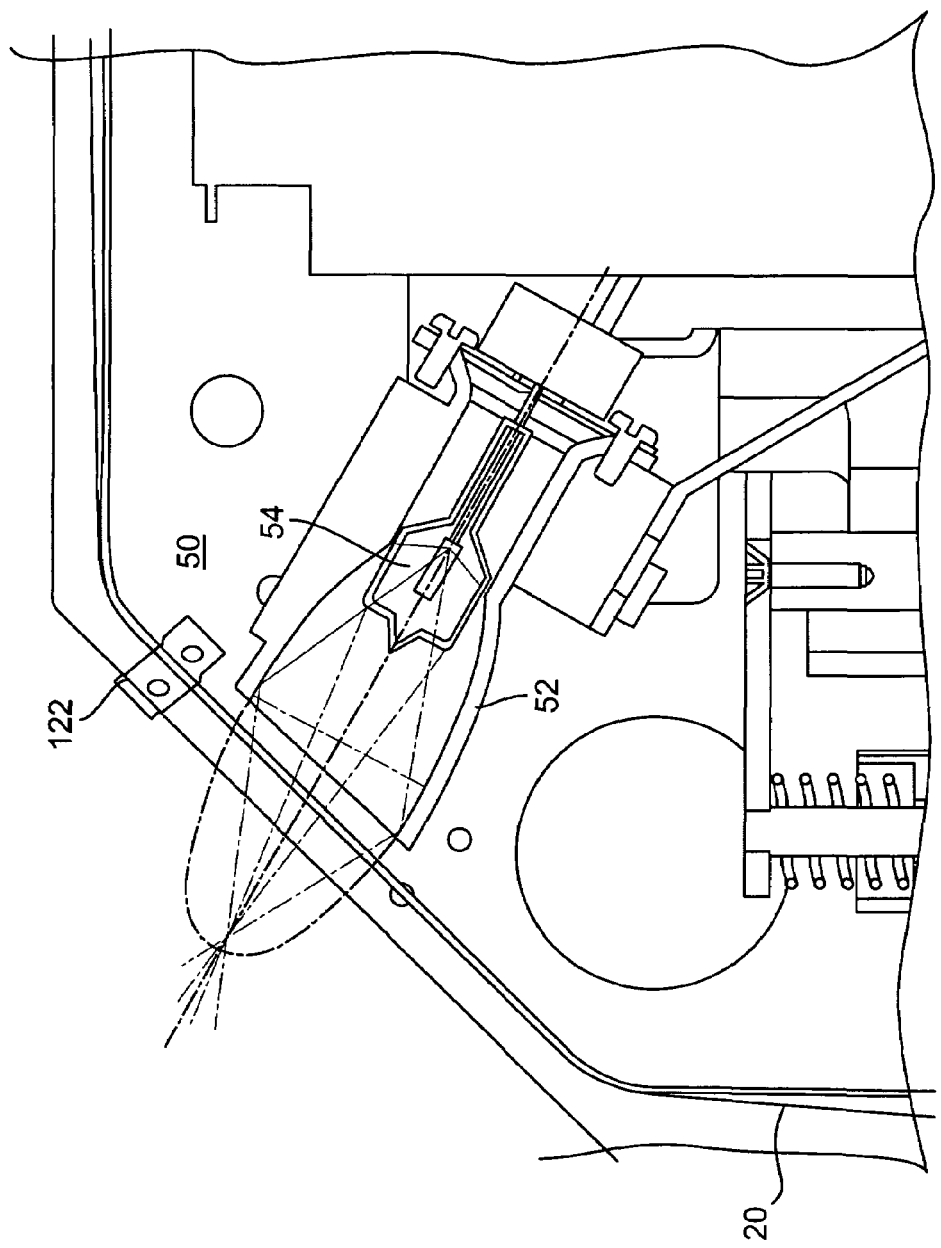
FIG. 5 illustrates a straw-hole marking system according to an embodiment of the present invention.
Figure 21:
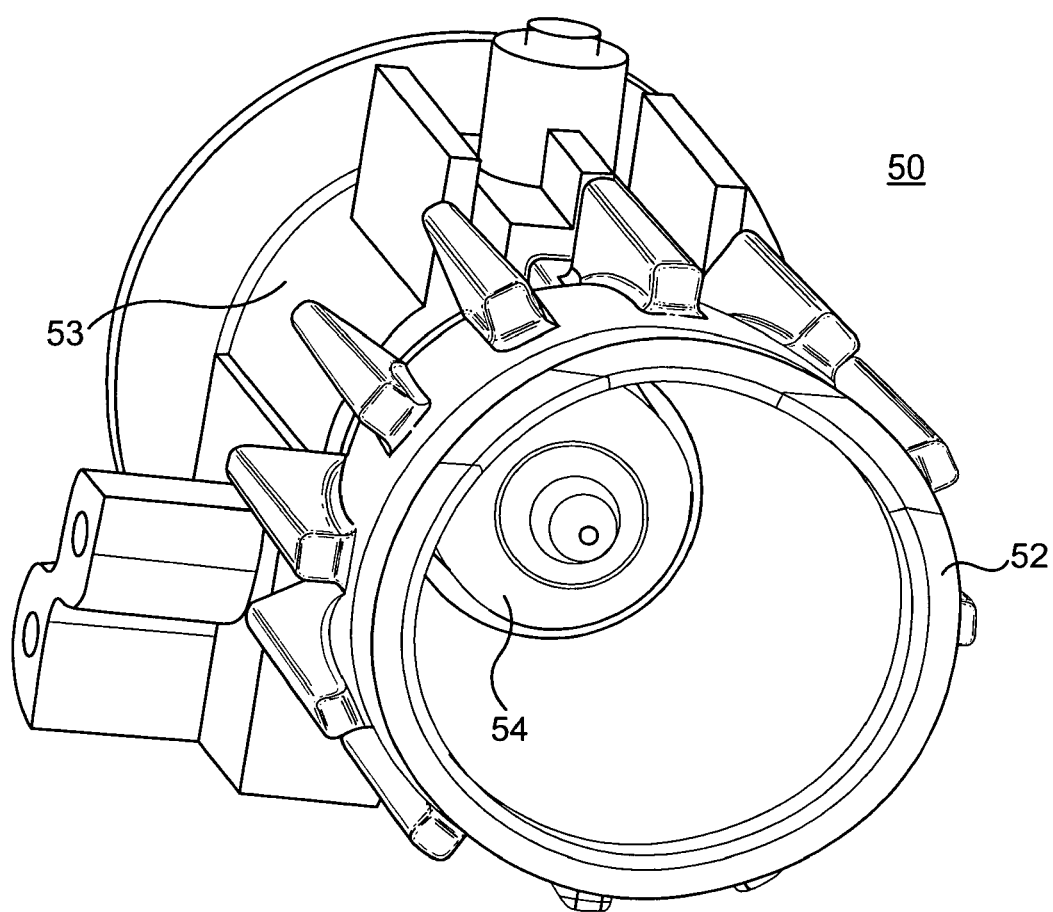
FIG. 21 illustrates a straw-hole lamp according to an embodiment of the present invention.

In another embodiment, depicted in FIG. 5, the lidding system includes a straw-hole lamp system 50 for marking a straw-hole on the film 20. The straw-hole lamp system 50 may include a reflector cup 52 and a radiant energy source 54. In particular, the lidding system may have a straw-hole reflector cup 52 for reflecting and concentrating radiant energy for impinging the surface of the film 20. In the depicted embodiment, the reflector cup 52 has an inner surface that is ellipsoidal. The radiant energy source 54 may have a wattage of between approximately 50–150. The wattage should be chosen to provide sufficient energy to shrink the film, without burning through the film. In one embodiment, the wattage may be approximately 100 watts. One radiant energy source that has been successfully used is an Osram JC24V-100W/G6.35, available from Osram Sylvania, Inc. of Danvers, Mass. The ellipsoidal surface of the reflector cup 52 reflects a substantial portion of the incident light towards the straw-hole target area on the film 20, therefore causing the incident light to strike the film 20. The area impinged on by the radiant energy may be larger than a typical drinking straw, e.g., approximately ½". Those of ordinary skill in the art will understand that other reflective cup 52 shapes, such as spherical or parabolic, can be used with the current invention. In one embodiment, as shown in FIG. 21, the straw-hole lamp system 50 is a two-part structure, including a reflective cup 52 and a lamp housing 53. In this embodiment, the reflective cup 52 is capable of being removed from the lamp housing 53 for ease in changing the radiant energy source 54. The two pieces may couple via a twist-lock or snap-lock arrangement, and those of ordinary skill in the art will understand that there are a wide variety of other methods of coupling the two pieces.

In operation, when the radiant energy impinges on the film 20, the activated portion of the film 20, which may be printed with an energy absorbing substance, retracts from the center of the aperture area, leaving a substantially circular area on the film 20 that is thinner than the area not impinged on by radiant energy. The thinner area is weaker, allowing a straw to be inserted therethrough with less force. In addition, as the film 20 retracts, an outer ring of thicker film may be formed providing a strengthening annulus around the thinner area. The strengthening annulus may assist in preventing the film 20 from tearing after the straw is inserted.

The radiant energy source 54 may be pulsed for a period of time sufficient to shrink, but not burn through, the film 20. In one embodiment, a pulse-width modulated signal from a micro-controller (not shown) is included to control the average voltage level of the radiant energy source 54. This allows the radiant energy source 54 to be maintained in a continually pre-warmed state. In particular, the average voltage across the radiant energy source 54 may be controlled by varying the duty cycle of a high frequency signal, thereby controlling the light and heat output. In one embodiment, the high frequency signal may be approximately 7 kHz. Graph 2, below, is illustrative.

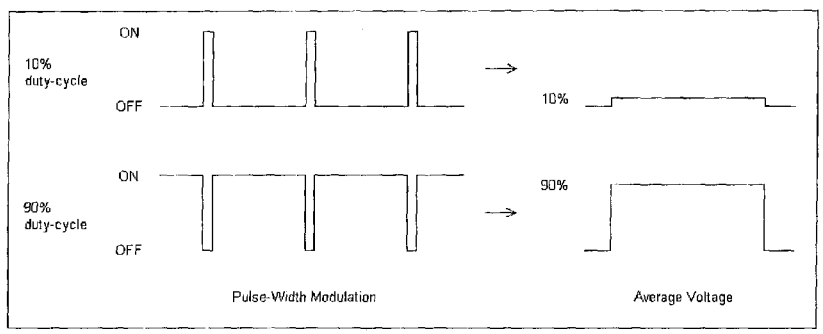

By keeping the duty cycle low, for example 1–5%, the radiant energy source 54 can be kept on at a low level, such that when it is turned on fully or pulsed at a higher duty cycle, it may transmit a more consistent amount of energy to the film regardless of the shrinking cycle frequency. Moreover, this allows for more flexibility in controlling the light and heat output of the pulse, by providing the ability to vary the voltage across the radiant energy source 54 as well as the duration of the pulse.

In another embodiment, the lidding system may have a drink marking system 234 for identifying the contents of the container after it has been lidded. In particular, the embodiment depicted in FIG. 22 includes fixed radiant energy assemblies 236 positioned proximate the surface of the film 20 being lidded onto the container. The fixed radiant energy assemblies 236 can direct radiant energy such that it impinges on the surface of the film 20 covering the container 16. Each fixed radiant energy assembly 236 may include a reflective cup housing 238, a reflective cup 240, and a radiant energy source 242.

Figure 22:
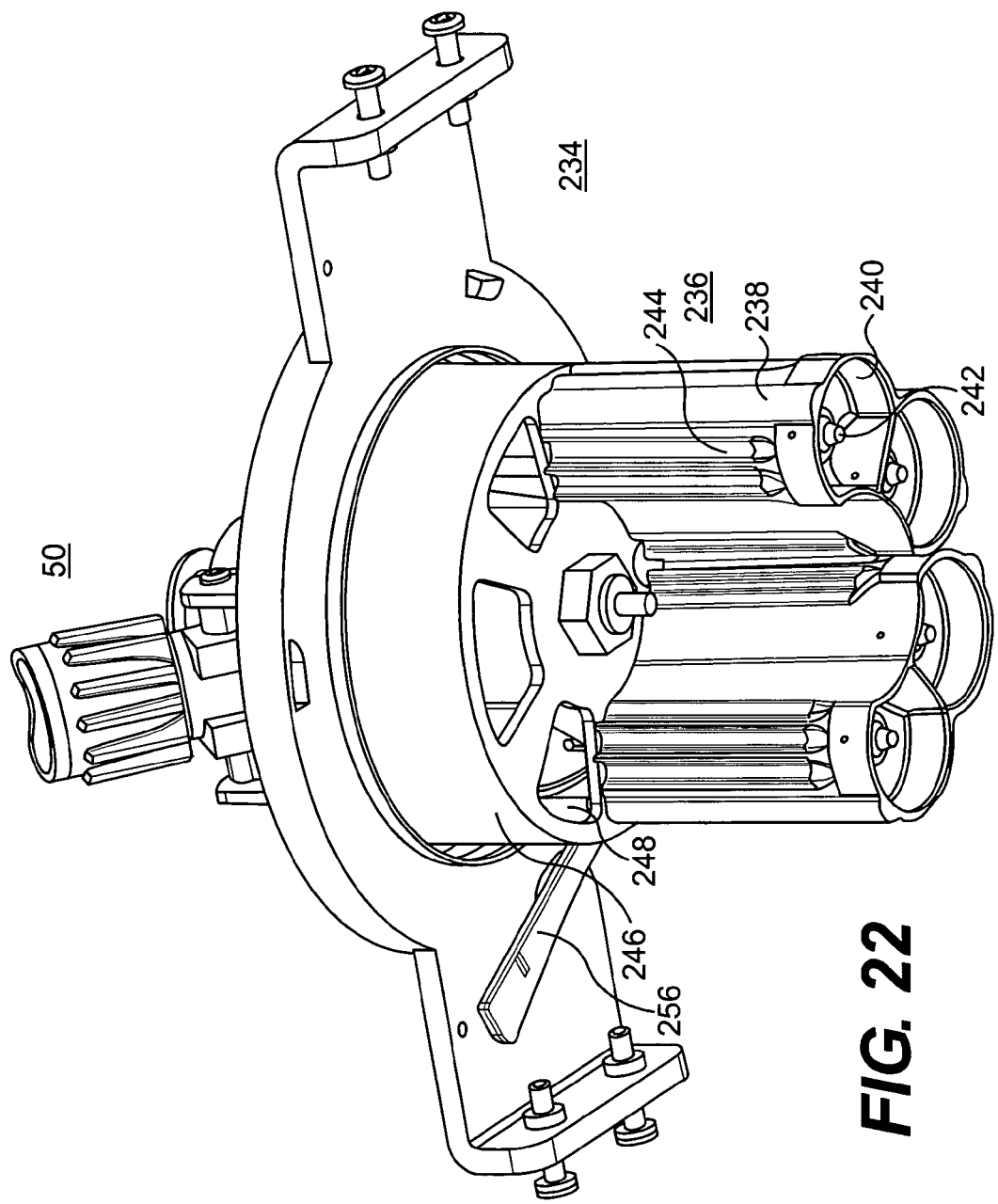
FIG. 22 illustrates a drink marking means according to an embodiment of the present invention.
Figure 23:
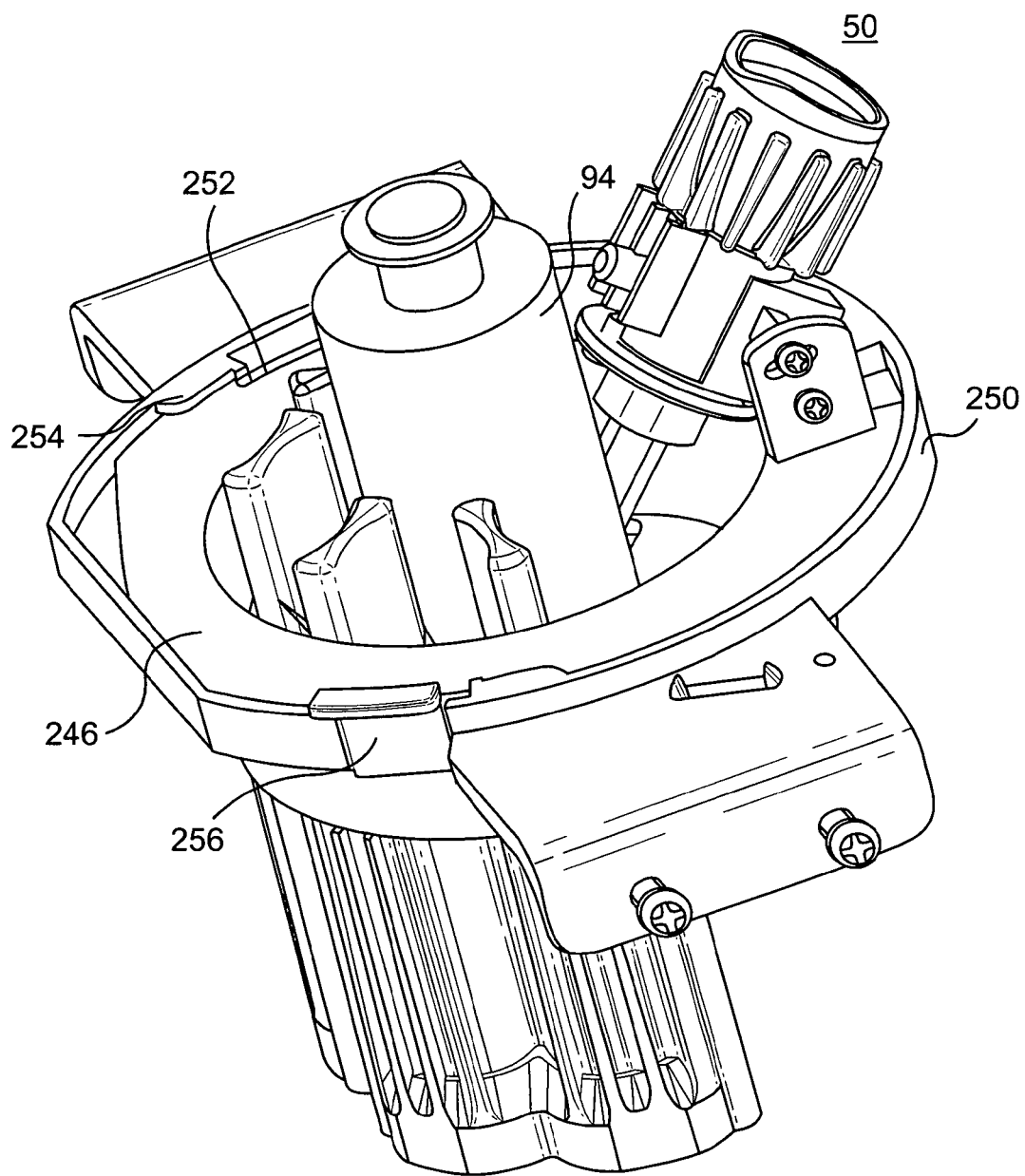
FIG. 23 is another view of the drink marking means of the embodiment depicted in FIG. 22.

As depicted in FIG. 22, the reflective cup housing 238 may have an elongated surface, and may further include heat dissipating fins 244 located on the exterior of the housing 238. One end of the reflective cup housing 238 may house the reflective cup 240. The second end of the reflective cup housing 238 may be in communication with a marking assembly housing 246. The marking assembly housing 246 may have a number of orifices 248 capable of receiving and holding the second end of the reflective cup housing 238. When a drink marking system 234 and a straw-hole lamp system 50 are both included in the lidding system, both the reflective cup housings 238 and the straw-hole lamp system 50 may be in communication with the marking assembly housing 246, as depicted in FIGS. 22–23. Finally, as shown in FIG. 23, a solenoid 94 (discussed below) may likewise be in communication with the marking assembly housing 246.

Moreover, while not necessary, the marking assembly housing 246 may be modular to allow for easy removal from and insertion into the lidding system. In particular, in the embodiment shown in FIG. 23, the marking assembly housing 246 is rotatably lockable into an upper portion flange 250 of the vertical mounting bracket 136, the upper surface of the marking assembly housing 246 having cutouts 252 that are capable of communicating with receiving portions 254 located on the upper portion flange 250 of the vertical mounting bracket 136. To insert the marking assembly housing 246, it is placed in communication with the upper portion flange 250 of the vertical mounting bracket 136 such that the receiving portions 254 fall within the cutouts 252 and then the marking assembly housing 246 is turned slightly to lock. The upper portion flange 250 of the vertical mounting bracket 136 may also have a locking lever 256 to prevent the marking assembly housing 246 from shifting once locked in place.

Figure 24:
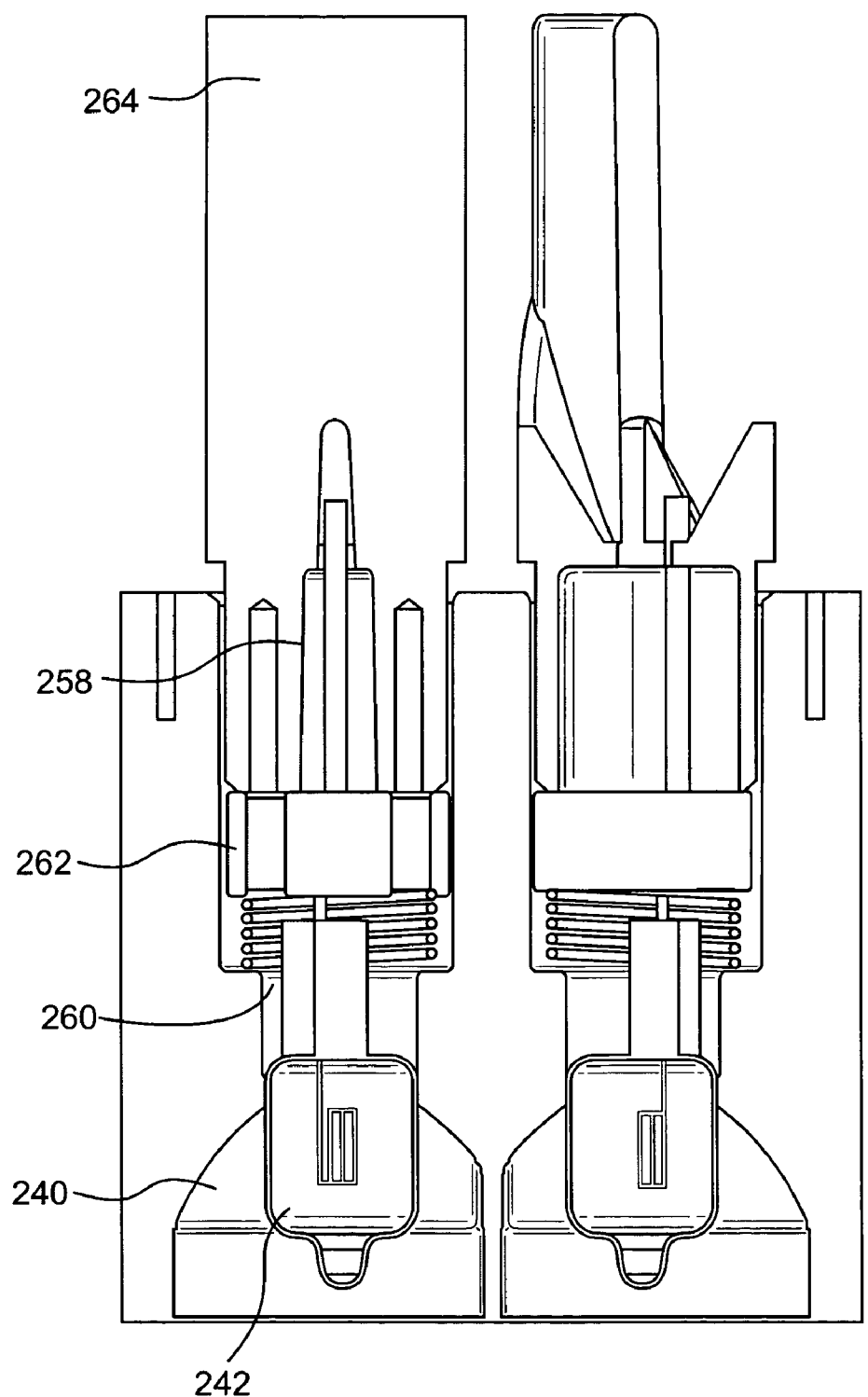
FIG. 24 illustrates a cross section of the drink marking means of the embodiment depicted in FIG. 22.

As shown in FIG. 24, the radiant energy source 242 may be located within the reflector cup 240. The reflective cup 240 may be provided for reflecting and concentrating radiant energy for impinging the surface of the film 20. The reflective cup 240 may have a reflective inner surface. In the depicted embodiment, the reflective cup 240 has an inner surface that is substantially ellipsoidal. Those of ordinary skill in the art will understand that other reflective cup shapes, such as fully ellipsoidal, spherical, or parabolic, can be used with the current invention. The radiant energy source 242 may have a wattage of between approximately 50–150. The wattage should be chosen to provide sufficient energy to shrink the film, without burning through the film.

In one embodiment, the wattage may be approximately 100 watts. One radiant energy source that has been successfully used is an Osram JC24V-100W/G6.35, available from Osram Sylvania, Inc. of Danvers, Mass. The substantially ellipsoidal surface of the reflective cup 240 reflects a substantial portion of the incident light towards the drink mark target area on the film 20, therefore causing the incident light to strike the film 20.

Figure 25:
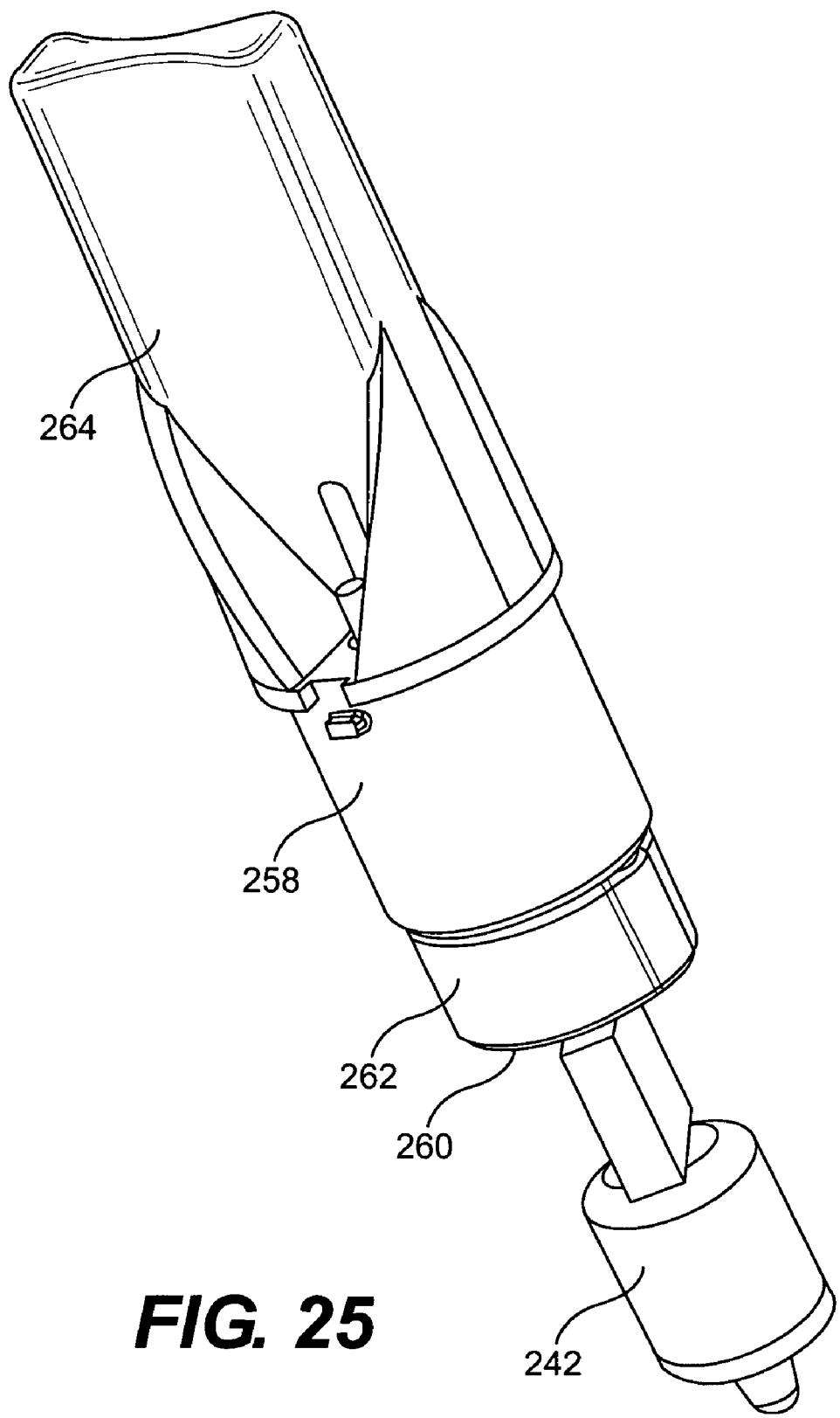
FIG. 25 illustrates a portion of the drink marking means of the embodiment depicted in FIG. 22.

In one embodiment, as depicted in FIGS. 24–25, easier removal and insertion of the radiant energy source 242 may be accomplished by providing a holding means 258 for holding the radiant energy source 242. As depicted, the holding means 258 may include a first end 260 capable of receiving the radiant energy source 242. This first end 260 may further include means 262 for transmitting electrical energy to the radiant energy source 242 for activation. A second end 264 of the holdings means 258 may have a portion that can easily be gripped by the user. The holding means 258 may be capable of insertion into the second end of the reflective cup housing. The holding means 258 may further include a retaining means, such as a snap-lock or twist-lock arrangement, to retain the holding means 258 in the reflective cup housing 238.

In one embodiment, the lidding system may include at least one fixed radiant energy assembly 236. In another embodiment, as depicted in FIG. 22, the lidding system has four fixed radiant energy assemblies 236. Those of ordinary skill in the art will understand that more than four fixed radiant energy assemblies 236 can be used and that the number can be selected based on the number of drink selections desired and the space constraints of the lidding system itself.

For drink marking purposes, the film 20 can be manufactured having the various beverage options, such as "soda", "diet", "cola", "orange", and "water", imprinted on the film. Moreover, the film 20 can be manufactured having a plurality of interiorly located heat shrinkable target regions, where each of the target regions has indicating means for identifying the contents of the container when the target regions are exposed to radiant energy.

When selecting one of the various beverage option, the radiant energy source 242 located above the beverage option on the film 20 desired for selection may be energized such that radiant energy impinges on the surface of the film 20 in the vicinity of the desired option, or target region. For example, if the container 16 is filled with water, the radiant energy source 242 located above the mark on the film 20 identifying water is activated such that the radiant energy impinges on the film 20 under the "water" position, the area to be marked containing energy absorbing material, such as ink containing carbon black. In one embodiment, the drink selections on the film 20 may be provided with a contrasting background such that when the film 20 is marked the selection is easily identifiable. The film substrate may include, either printed thereon or incorporated into the substrate, thermochromic ink.

When a drink marking system 234 is included in the lidding system, the activation plate 118 should be configured to allow the radiant energy emitted from the radiant energy source 242 to pass through the activation plate 118 and impinge the film 20, as the activation plate 118 is interposed between the radiant energy sources 242 and the film 20. In particular, in one embodiment, the activation plate 118 may be constructed of materials that minimize loss of radiant energy, thereby allowing sufficient radiant energy to pass through and contact the film, such as plastic or glass. In addition, an optical coating may be used to minimize energy loss and/or heat build-up in the activation plate 118. Those of ordinary skill in the art will understand that a variety of materials can be used to construct the activation plate 118. In addition, to assist in directing the radiant energy to the target, portions of the activation plate 118 can be masked with a material that will not allow radiant energy to pass therethrough, thereby assisting in directing the radiant energy substantially to the target area.

Figure 26:
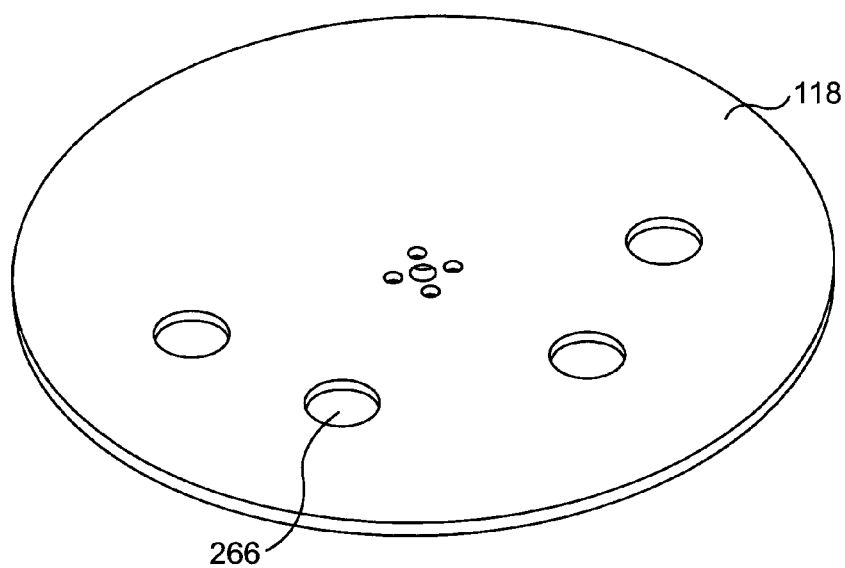
FIG. 26 illustrates an activation plate according to an embodiment of the present invention.

In another embodiment, as depicted in FIG. 26, the activation plate 118 may be constructed of a material, such as aluminum, that does not allow radiant energy to pass therethrough, with orifices 266 formed in the activation plate to allow radiant energy from the activated radiant energy sources 242 to pass through and impinge on the target area of the film 20. The orifices 266 should be arranged such that each orifice is located above a target area. The orifice 266 may be a circular opening or, in another embodiment, may have a marking pattern for use in identifying the contents of the beverage container. There are a large variety of marking patterns that can be used, including an arrow, a circle of dots that will encircle the word, a check mark, a dot, etc. For example, if there are four different possibilities for the contents of the container, i.e., "cola", "diet", "water", and "other", there may be four engravings, e.g., arrows, dots, circle of dots, words, etc., on the activation plate 118. The marking pattern should be in alignment with the selections on the film 20.

In one embodiment, the target area has a single black layer. In this embodiment, a relatively clear or lighter spot may appear in the middle of a dark area. In another embodiment, the film has two ink layers, the bottom layer being black and the top layer being white. In this embodiment, when the radiant energy impinges the film, a relatively clear spot appears in the middle of a light area.

In another embodiment, a thermochromic ink layer is included. In particularly, in one embodiment, the marking options printed onto the film have absorbent, reflective, or contrast-enhancing and thermochromic layers. Accordingly, after the container is filled with a specific beverage, radiant energy may be directed to the film at the beverage option selected. The radiant energy results in the heating of the absorbent material in the vicinity of the beverage option selected and thereby causes a localized increase in temperature of the indicia-former identifying that option. The increase in temperature causes the indicia-former identifying that option to change color (e.g., from white to black). The resultant black marking identifies the option selected, thus indicating the contents of the container. As radiant energy is not directed at the indicia-formers identifying other drink options, those indicia-formers do not change color. Accordingly, the beverage option selected is identified by the color change of the particular indicia-former identifying that option.

The identification marking can take numerous configurations. For example, configurations can include a circle enclosing the letter "x", a check mark, or even a word or words identifying the beverage. In one embodiment, the source of the radiant energy is positioned from about 0.3 inches to about 1.0 inch away from the film. In one embodiment, the source of the radiant energy is positioned approximately 0.5 inches from the film.

In another embodiment, radiant energy can be directed to the absorbent layers at the options not selected so that the beverage option selected would be the only option identified that did not undergo a change from one visual condition to a second visual condition.

In one embodiment, the film is manufactured by applying an absorbent material onto at least a portion of a thin film substrate which is substantially transparent to radiant energy. The absorbent material should be sufficiently opaque to radiant energy to absorb radiant energy and convert it to heat energy. An energy sensitive indicia-former which undergoes conversion from a first visual condition to a second visual condition upon exposure to heat energy may then be applied onto the film substrate. One method of application is by printing.

The following examples were generated using a thermochromatic ink of the present invention.

EXAMPLE 1

A test was performed to confirm the ability of the combination of the thermochromic and absorbing inks to form in the indicia-former after it undergoes exposure to radiant energy in the form of a lightbulb. A 75-gauge CLYSAR film manufactured by Bemis Corporation was printed with an absorbent material consisting of a black ink that contains carbon pigment sold under the name Brazilia TN15787 by Coates Ink, a division of Sun Chemical. Then a white ink sold by Coates Ink under the trade name Lunar TN12316 was printed over discrete portions of the black layer of absorbent material to provide indicia areas showing the various types of drink options, resulting in each indicia area having a gray color which serves to provide a contrasting background for the indicia formed upon conversion to the second visual condition. Next, an indicia-former composed of a white thermochromic ink manufactured by Sherwood Technologies, LLD, Nottingham, UK, under the trade name Sherwood Type 90 was printed over each gray-colored indicia area. The resulting indicia areas were gray in color.

The film was exposed to a 350-watt halogen lightbulb, causing the thermochromic ink to turn from gray to black. The change in color of the indicia area was visible, but it was felt that the contrast could be improved as described in Example 2.

EXAMPLE 2

The test procedure used in Example 1 was repeated, except that additional white ink was provided for contrast on each indicia area, resulting in the indicia area having a white appearance relative to the gray appearance in Example 1 above. Then the thermochromic indicia-former was added over the white layer and exposed to the same 350-watt halogen lightbulb, causing the indicia-former to change from white to black. Accordingly, the color change of the thermochromic ink in Example 2 was more pronounced and easier to see.

EXAMPLE 3

The film substrate was treated with the absorbent ink for radiant energy absorption, white ink to provide contrast and thermochromic ink as the indicia-former, as in Example 1. The treated film was exposed to the 350-watt halogen lightbulb for one-half second at a distance of 0.5 inch. Following such exposure, the thermochromic layer changed from white to black.

EXAMPLE 4

A packaging film was prepared as in Example 3. The period of exposure of the treated film to the 350-watt halogen lightbulb at a distance of 0.5 inch was changed from 0.5 second to 1.0 second. The resulting heat melted the film, causing a hole to form in the film, indicating over-treatment.

EXAMPLE 5

The film of Example 1 was exposed to radiant energy from a 100-watt halogen bulb for one-quarter of a second. The halogen bulb was operating at 30% of full power (duty cycle energized 30% of the time during activation period). Radiant energy was applied to the film at a distance of 0.5 inch. These conditions resulted in the transformation of the thermochromic ink from white to black, without any noticeable deleterious effect on the thermochromic ink layer.

EXAMPLE 6

The film of Example 2 was exposed to radiant energy from a 100-watt halogen bulb for one-quarter of a second. The halogen bulb was operating at 30% of full power (duty cycle energized 30% of the time during activation period). Radiant energy was applied to the film at a distance of 0.5 inch. These conditions resulted in the transformation of the thermochromic ink from white to black, without any noticeable deleterious effect on the thermochromic ink layer.

EXAMPLE 7

The film of Example 1 was treated with the black energy absorbent ink, two layers of white ink for contrast and thermochromic ink. The thermochromic ink was applied in the configuration of a circle enclosing the letter "x". The film was exposed to radiant energy from a 100-watt halogen bulb for one-quarter of a second. The halogen bulb was operating at 30% of full power (duty cycle energized 30% of time during activation period). Radiant energy was applied to the film of a distance of 0.5 inch. The condition resulted in the transformation of the thermochromic ink from white to black, resulting in a very distinct circle enclosing the letter "x".

In operation, the user may select the appropriate radiant energy source 242 to be energized by, for example, depressing a button located on the lidding system housing (not shown) for the appropriate drink selection. For example, if the container contains water, the user will depress the button marked "water." By depressing the button, electronic logic (not shown) will cause the appropriate fixed radiant energy source to be activated during lidding of the container. After lidding, the film will contain a mark on the surface identifying the contents of the container. In one embodiment, two drink selections can be chosen. For example, if the container contains diet cola, both the "diet" and "cola" buttons can be depressed and, after lidding is completed, the film will contain marks on both the "diet" and "cola" target areas.

In operation, when the radiant energy impinges on the film 20, the activated portion of the film 20, which may be printed with an energy absorbing substance, may leave a substantially circular area on the film 20 that is thinner than the area not impinged on by radiant energy.

When thermochromatic ink is included, the radiant energy source 242 is pulsed for a period of time sufficient to treat the thermochromic ink. In one embodiment, a pulse-width modulated signal from a micro-controller (not shown) is included to control the average voltage level of the radiant energy source 242. This allows the radiant energy source 242 to be maintained in a continually pre-warmed state. In particular, as described above with regard to the straw-hole lamp, the average voltage across the radiant energy source 242 is controlled by varying the duty cycle of a high frequency signal, thereby controlling the light and heat output. In one embodiment, the high frequency signal may be approximately 7 kHz.

The present invention may also include drink containers covered by heat shrinkable flexible films. According to this embodiment of the invention, an open-top container may be covered by a heat shrinkable, flexible packaging film having at least one heat sensitive indicia-former on the surface thereof. The film material may comprise a thin film substrate which is flexible and contracts when heated, and which is substantially transparent to radiant energy, thereby remaining substantially unchanged by radiant energy. An absorbent material may overlay at least a portion of the film substrate. The absorbent material may be sufficiently opaque to radiant energy to absorb and convert radiant energy into heat energy. This heat energy may cause the heat sensitive indicia-former carried by the film to undergo conversion from a first visual condition to a second visual condition. This change in visual condition may occurs at a temperature below that at which the film is caused to shrink.

The invention may further include a method of preparing and sealing beverage containers. According to this embodiment of the invention, an open-top container may be filled with a beverage. The open-top container may then be covered with the film of the invention. The film material may then be subjected to energy, which is converted to heat energy. The heat energy may cause the film material to shrink to form a seal over the open top, and the indicia-former is thereafter exposed to heat sufficient to transform it from the first visual condition to the second visual condition.

Alternatively, the sealing step can be carried out simultaneously with or after the step of transforming the indicia former from a first visual condition to a second visual condition.

Figure 7:
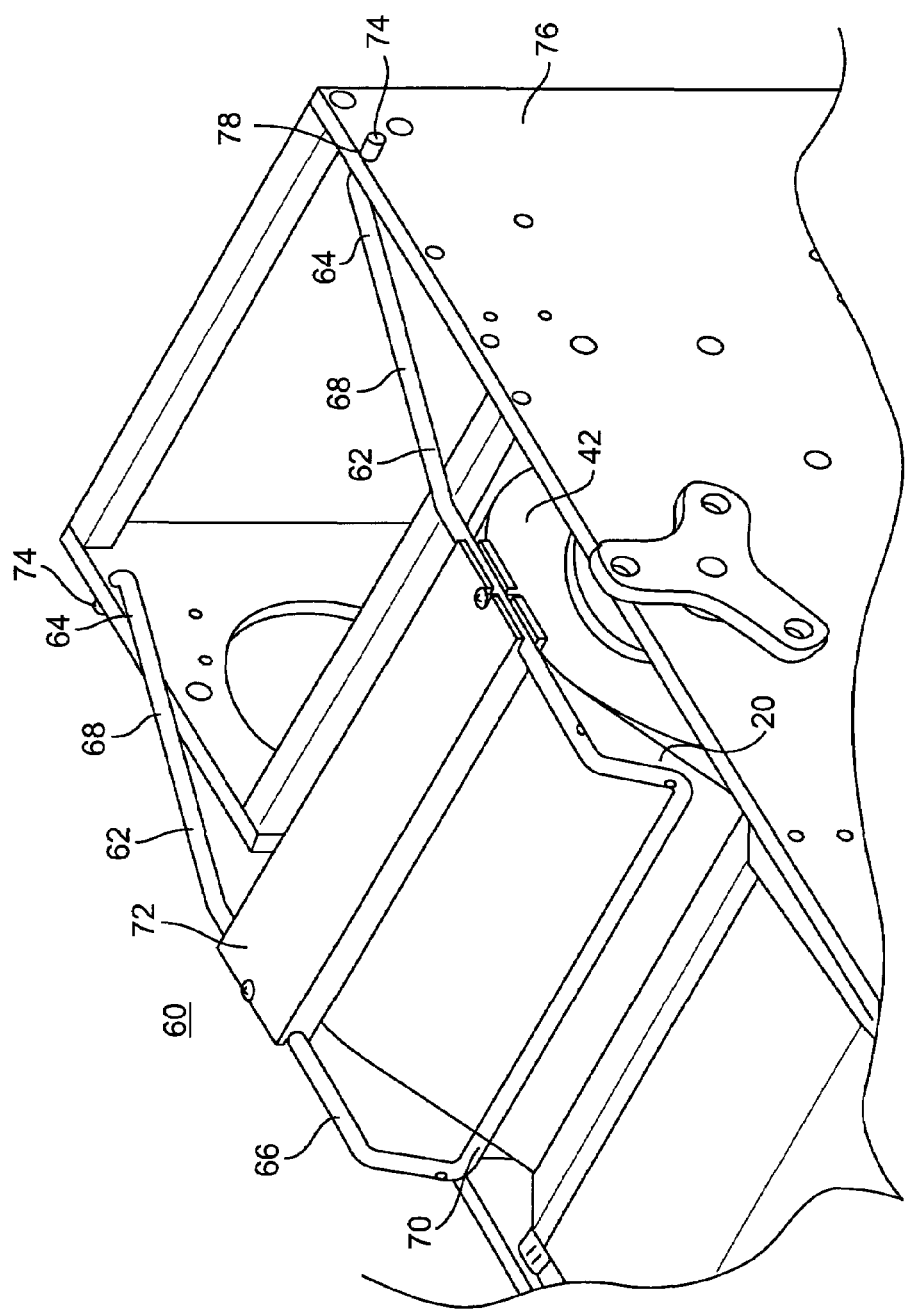
FIG. 7 is a perspective view of a film brake and tension controller according to an embodiment of the present invention.
Figure 8:
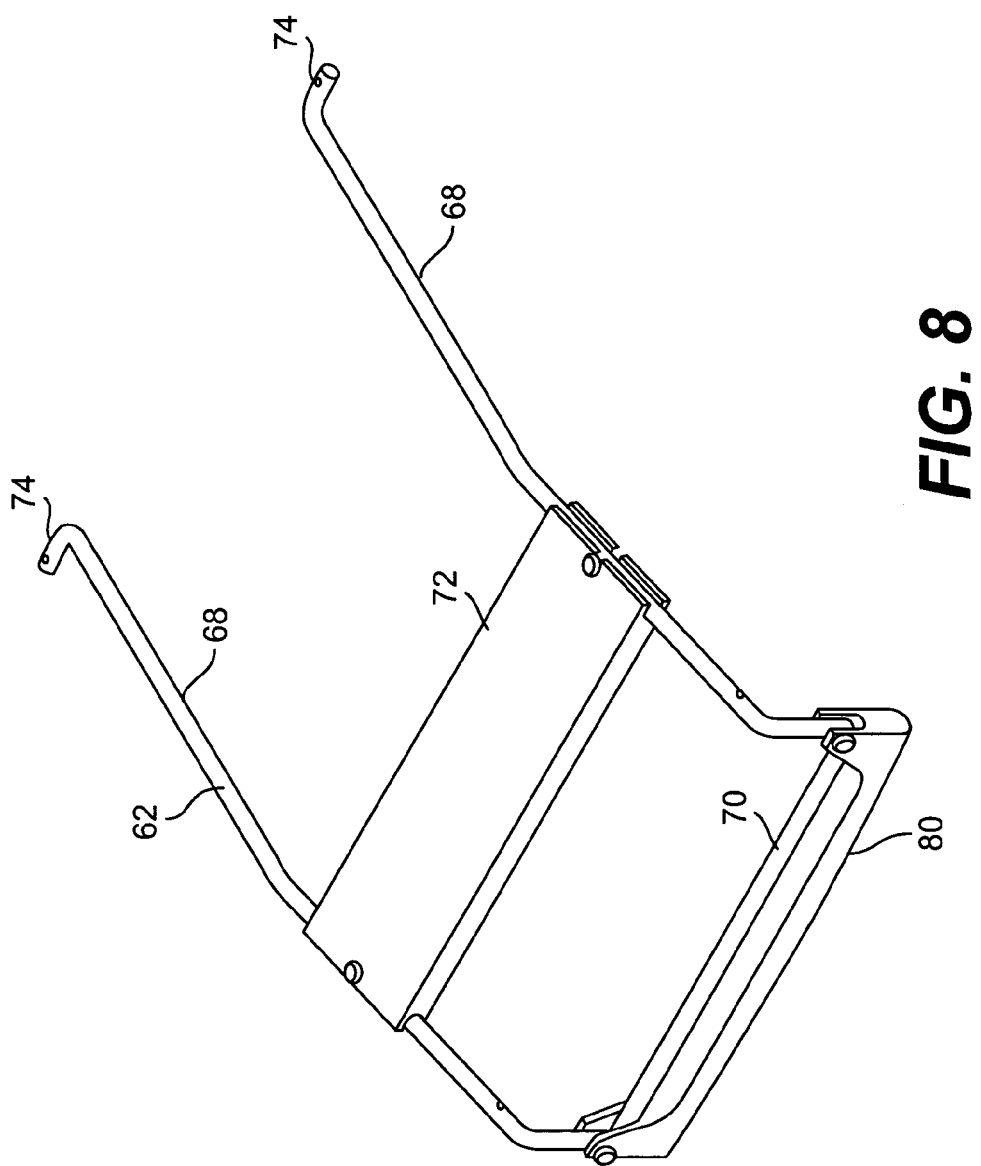
FIG. 8 is a perspective view of a mechanical arm of a film brake and tension controller according to another embodiment of the present invention.

In one embodiment, as shown in FIG. 7, the invention may include a film brake and tension controller. The film brake and tension controller 60 may include a mechanical arm 62 having a first end 64 and a second end 66. As also shown in FIG. 8, the mechanical arm 62 may be substantially U-shaped, where the top, open portion of the "U" is the first end 64, and the bottom, connected portion of the "U" is the second end 66. The U-shaped mechanical arm 62 may be formed by at least two substantially parallel legs 68 extending from the first end 64 and connected by a cross bar 70 at the second end 66.

The film brake and tension controller 60 may further include a force applying means 72 interposed between the first end 64 and second end 66. In the embodiment shown, the force applying means 72 is a weight. Those of ordinary skill in the art will understand that the force applying means 72 can be other biasing means, such as a spring. The force applying means 72 bridges the two parallel legs 68. The force applying means 72 can be separately attached to the legs 68, as depicted in FIGS. 7 and 8, or can be integral with the legs 68. In one embodiment, the mechanical arm 62 and force applying means 72 may be fabricated of stainless steel. Those of ordinary skill in the art will recognize, however, that the mechanical arm 62 and force applying means 72 can be fabricated of various other materials, such as polycarbonate or carbon steel.

In one embodiment, the surface of the force applying means 72 contacting the film is substantially flat. Those of ordinary skill in the art will understand, however, that the lower surface of the force applying means 72 can be modified to accommodate a non-uniform film 20. For example, if the film 20 has eye marks located along its side edges, the diameter of the film roll at those locations may be greater than that at the center portion of the film 20 not having an eye mark. As such, to maintain contact between the force applying means 72 and the center portion of the film 20, a portion of the lower surface of the force applying means may be removed to provide clearance for the eye mark line.

The mass of the force applying means 72 will be dependent on numerous factors, including the gauge and width of the film, the average diameter of the supply roll, the force and speed applied to the supply roll during the unwinding process, and other factors, such as the coefficient of friction between the film 20 and the contacting components, e.g., the force applying means 72 and the cross bar 70. In one embodiment, the force applying means 72 has a mass of about 1.5 to about 3.5 lbs., and in an exemplary embodiment, a mass of about 3.2 lbs. Those of ordinary skill in the art will be readily able to determine the appropriate weight to provide optimum film 20 tension.

Figure 27:
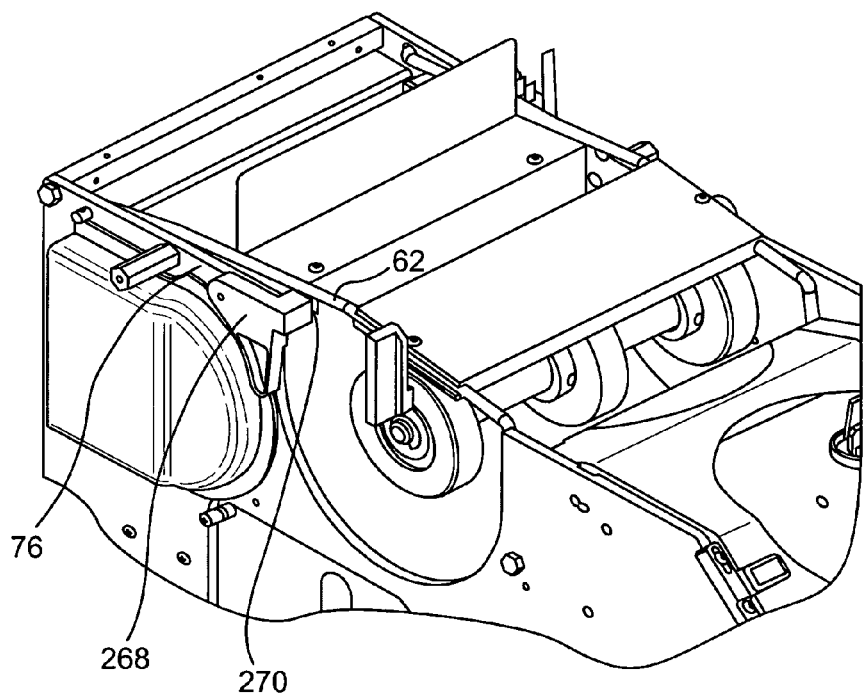
FIG. 27 illustrates another embodiment of a film brake and tension controller of the present invention.

The first end 64 of the mechanical arm 62 may have pivot ends 74. As shown in FIG. 7, the pivot ends 74 are capable of being mounted to a frame 76. The pivot ends 74 may allow the mechanical arm 62 to pivot about the frame 76 as the film is advanced from the supply roll to the take-up roll and as the diameter of the supply roll decreases. The pivot ends 74 may further allow for the mechanical arm 62 to be moved for maintenance of the lidding system or to install a new supply roll in the lidding system. Moreover, in one embodiment, as depicted in FIG. 27, a film brake lift assembly 268 may be included to assist in lifting the mechanical arm 62 and then holding the mechanical arm 62 in an upward position. The film brake lift assembly 268 may be pivotally attached to the lidding system frame 76 and be capable of pivoting upwardly and holding the mechanical arm 62 in an upward position. As shown in FIG. 27, the film brake lift assembly may have a detent 270 for positively locking onto the mechanical arm 62. In one embodiment, the pivot ends 74 are substantially perpendicular to the mechanical arm 62, such that they are capable of being received by receiving holes 78 in the frame 76, as depicted in FIG. 7. Those of ordinary skill in the art will understand that there are various methods for attaching the film brake and tension controller 60 to the lidding system frame 76. For example, the frame 76 could be equipped with rotatable brackets (not shown) that are capable of receiving the pivot ends 74.

As shown in FIGS. 7 and 8, the second end 66 of the mechanical arm 62 is configured at an angular orientation to the first end 64. The second end 66 includes the cross bar 70 which connects the legs 68. In the embodiments depicted, the cross bar 70 is disposed for contact with the film 20. In particular, the cross bar 70 may assist in maintaining the tension in the film 20. In one embodiment, the cross bar 70 is linear, that is, parallel with the width of the film 20. In another embodiment, the cross bar 70 may be at least slightly V-shaped.

In the embodiment depicted in FIG. 8, a guide bar 80 is attached to the cross bar 70. The bottom portion of the guide bar 80 is disposed for contact with the film 20 and, accordingly, should be a smooth surface. The guide bar 80 can be fabricated of delrin, stainless steel, or other indirect food-contact approved materials. The guide bar 80 can be linear, at least slightly V-shaped, or any other shape that will provide tension and act as a smoothing bar. In addition, the guide bar 80 could be a roller.

The operation of the described embodiments of the film brake and tension controller 60, in combination with a lidding system 40, will now be discussed. FIG. 7 depicts the film brake and tension controller 60 in conjunction with a portion of the lidding system 40. The film brake and tension controller 60 may be attached to the frame 76 of the lidding system. As shown in FIG. 7, the film brake and tension controller 60 may be positioned such that the force applying means 72 is in contact with an upper surface of the supply roll 42. The force applying means 72 provides a downward force onto the supply roll 42. In particular, the force applying means 72 may provide a downward force sufficient to substantially reduce or eliminate overspin of the supply roll 42 after the film 20 is advanced. In one embodiment, the force applying means 72 has a mass of about 1.5 to about 3.5 lbs., and in an exemplary embodiment, a mass of about 3.2 lbs.

As the film 20 passes from the supply roll 42 to the lidding section (not shown in FIG. 7), the cross bar 70 (or guide bar 80, if included) may contact the film 20 across its entire width. Because the second end 66 of the film brake and tension controller 60 is oriented at a downward angular orientation, the film 20 may be caused to follow a "V" path as it leaves the supply roll 42. When tension is first applied to the film 20 to advance the film 20, the portion of the film 20 in the "V" path may pull upward on the mechanical arm 62, causing the mechanical arm 62 to pivot about the pivot ends 74. During this advancing action, the force applying means 72 may float above the supply roll 42. After the advancing action ceases, the mechanical arm 62 may lower until the force applying means 72 contacts the supply roll 42. The cross bar 70 (or the guide bar 80, if included), which may be in constant contact with the film 20, will likewise lower, thereby taking up the slack in the film 20 and maintaining a substantially uniform tension in the film 20. The movement of the supply roll 42 may then be stopped by the friction resulting from the force applying means 72 resting on the supply roll 42.

Figure 10:
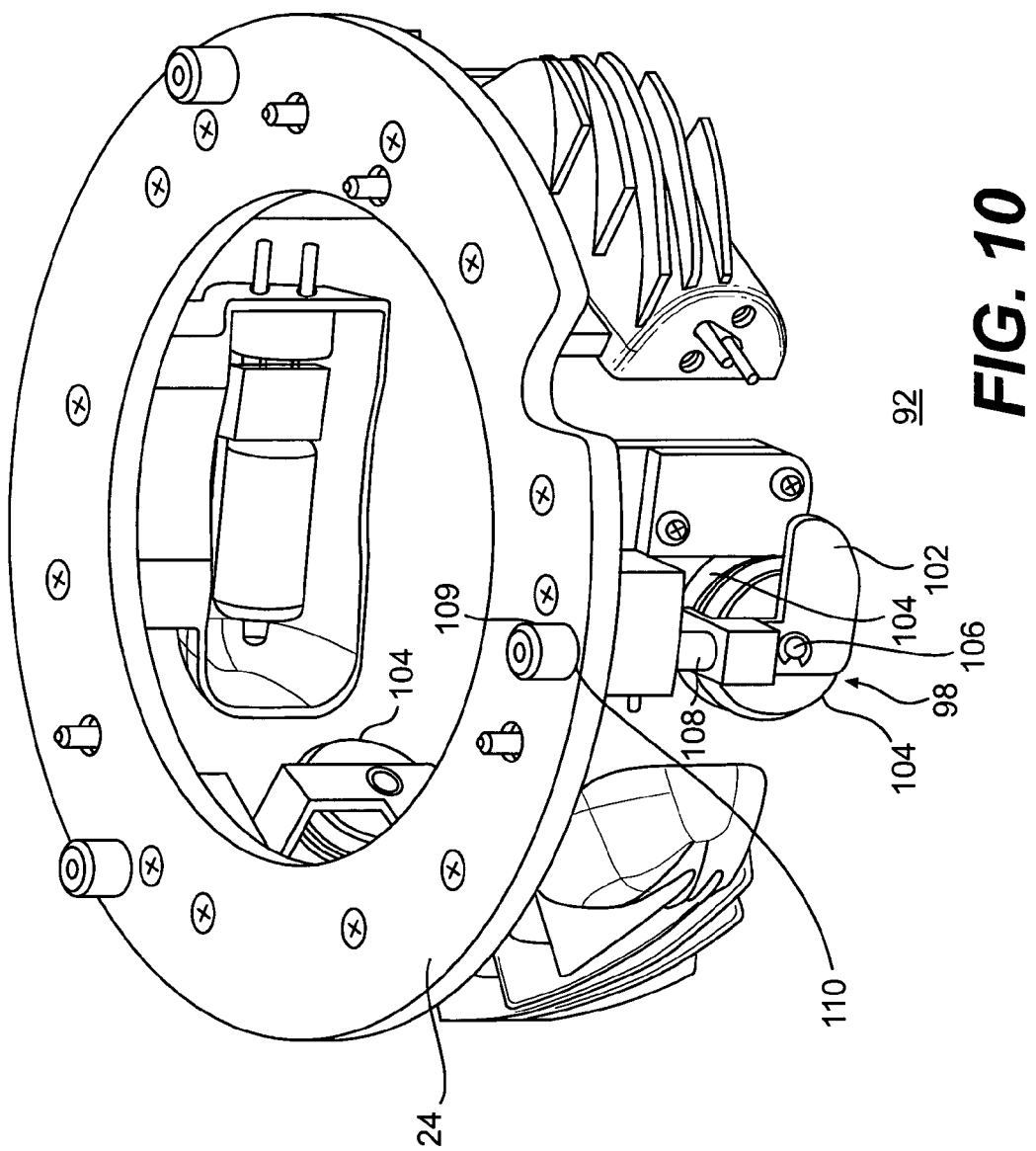
FIG. 10 is a perspective view of a modular rotational assembly including a web cutter according to an embodiment of the present invention.
Figure 11:
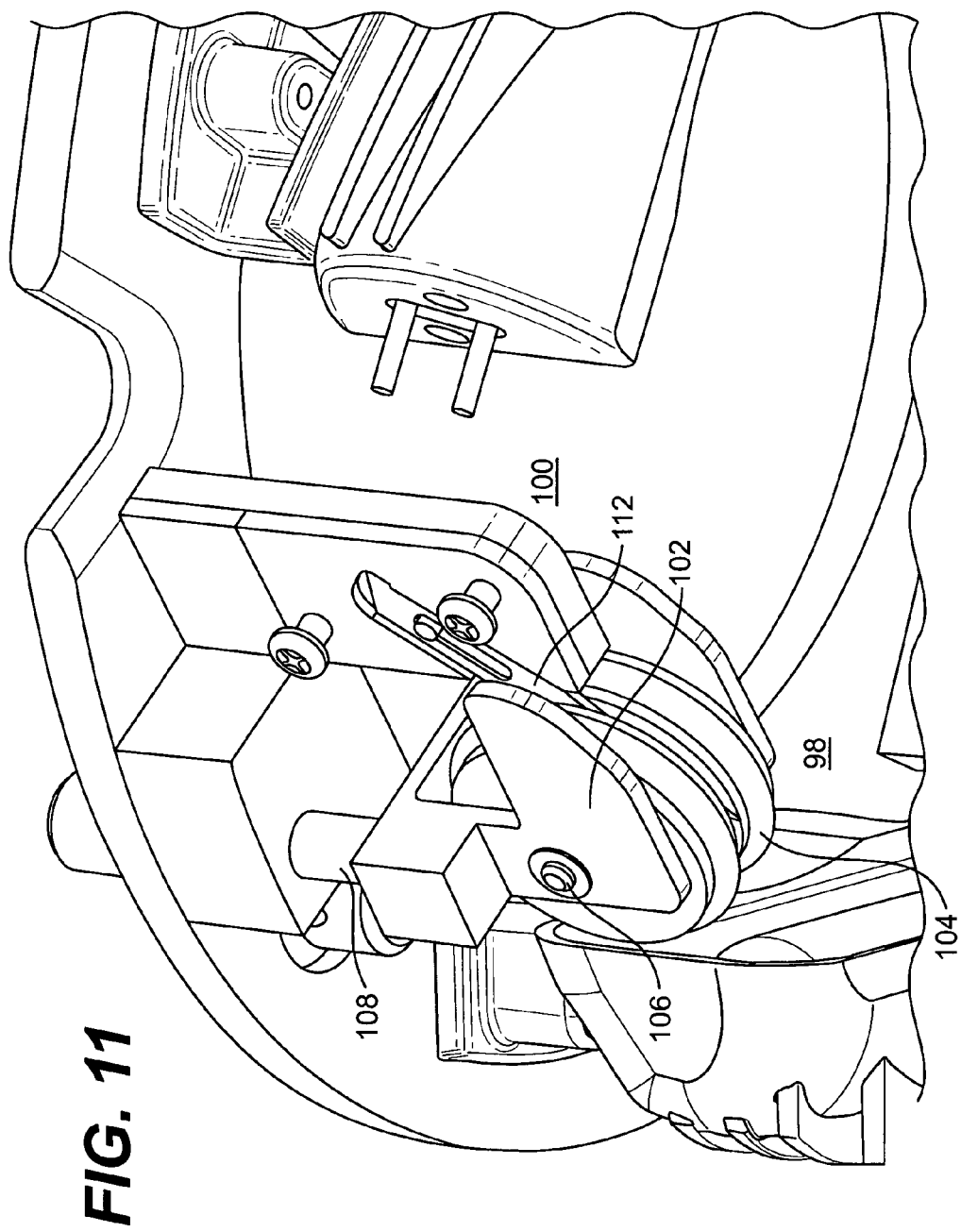
FIG. 11 is another perspective view of a modular rotational assembly including a web cutter according to an embodiment of the present invention.

In one embodiment, as shown in FIGS. 9–11, the invention includes a web cutter 92. According to one embodiment, the web cutter 92 may include the top plate 82, the fixed ring 84, the lower plate 88, a solenoid 94, and the modular rotational assembly 22. The top plate 82 may be in communication with the fixed ring 84. In particular, when a web cutter 92 is included, the top plate 82 may have top plate positioning members 86 which are in sliding communication with fixed ring recesses 58 in the fixed ring 84. A spring member 96 may be positioned in the fixed ring recess 58. The spring member 96 may be capable of maintaining a separating force between the top plate 82 and the fixed ring 84. Those of ordinary skill in the art will understand that the spring member 96 can be located separately from the fixed ring recess 58. Moreover, those of ordinary skill in the art will understand that the spring member 96 can be vertical coil springs, as shown in FIG. 9, or can be a variety of other spring-like members.

When a web cutter 92 is included, the modular rotational assembly 22 may include, in addition to the above described components, at least one wheel assembly 98 and at least one cutting member assembly 100. In one embodiment, at least two wheel assemblies 98 may be used. In one embodiment, at least two cutting member assemblies 100 may be used. Those of ordinary skill in the art will understand that more than two wheel assemblies 98 and more that two cutting member assemblies 100 can be used in this invention. In one embodiment, the modular rotational assembly 22 has three wheel assemblies 98. Those of ordinary skill in the art will understand that more than two cutting member assemblies 100 can be used in this invention. In one embodiment, the modular rotational assembly 22 has three cutting member assemblies 100. In one embodiment, the modular rotational assembly 22 has the same number of cutting member assemblies 100 as wheel assemblies 98.

In one embodiment, each wheel assembly 98 includes a wheel housing 102 having at least two wheels 104 located therein. The wheels 104 may be rotatably mounted on an axis, such as an axle 106. Each wheel assembly 98 may further include a post 108, the post 108 may be integral with or attached to the wheel housing 102. The upper plate 24 may be in communication with the wheel assembly 98. The upper plate 24 may have receiving holes 110 located about its periphery that are capable of receiving the wheel assembly posts 108. In one embodiment, a post 108 may be in sliding communication with a corresponding receiving hole 110 of the upper plate 24. In one embodiment, the post 108 may further be in sliding communication with a post bushing 109, the post bushing 109 further in communication with the upper plate 24.

Each cutting member assembly 100 may be attached to or integral with a surface of the upper plate 24 and may be substantially perpendicular to the upper plate 24. In one embodiment, as depicted in FIG. 14 the cutting member assembly 100 may include a slide locking means 176, the slide locking means 176 may further include at least one locking post 178, the locking post 178 having a lower body portion 180 and an upper body portion 182, and further extending above the upper plate 24. The locking post 178 may have a substantially cylindrical shaped body. The lower body portion 180 may be smaller in diameter than the upper portion 182 of the locking post 178. In the embodiment depicted in FIG. 14, the upper plate 24 has three cutting member assemblies 100, each assembly 100 having a locking post 178. In the embodiment depicted in FIG. 14, each locking post 178 is integral with its associated cutting member assembly 100, and the locking posts 178 extend through the upper plate 24. In this embodiment, the cutting member assemblies 100, and hence the locking posts 178, form a part of the modular rotational assembly 22, and function as described above with regard to the modular rotational assembly 22.

A cutting member 112 may be attached to each cutting member assembly 100. The cutting members 112 can be a blade, knife, or any other cutting apparatus known to those of ordinary skill in the art, or later discovered, as appropriate for cutting a web. Cutting member life is one aspect to be considered when choosing a cutting member. Commonly used blades are made of carbon steel and surgical stainless steel. In one embodiment, the blade is made of 400 series stainless steel. One blade that has been used is a stainless steel cutting blade, with a Goldenedge® hard wear resistant coating and a Nedox® SF-2 release coating, available from General Magnaplate. Other blades that may be used include stainless steel blades coated with a ceramic coating, such as Titanium Nitride, Titanium Carbide, Tantalum Nitride, or Tantalum Carbide. The blades can be coated by various coating means, including, but not limited to, plasma spray and flame spray. Still other blades available include cryogenically treated stainless steel blades, heat treated blades, sintered blades, carbide blades, and diamond coated blades. Those of ordinary skill in the art will understand that a variety of cutting members are available and will be able to select the appropriate cutting member based on a variety of factors, including cutting member life and cost.

Figure 28:
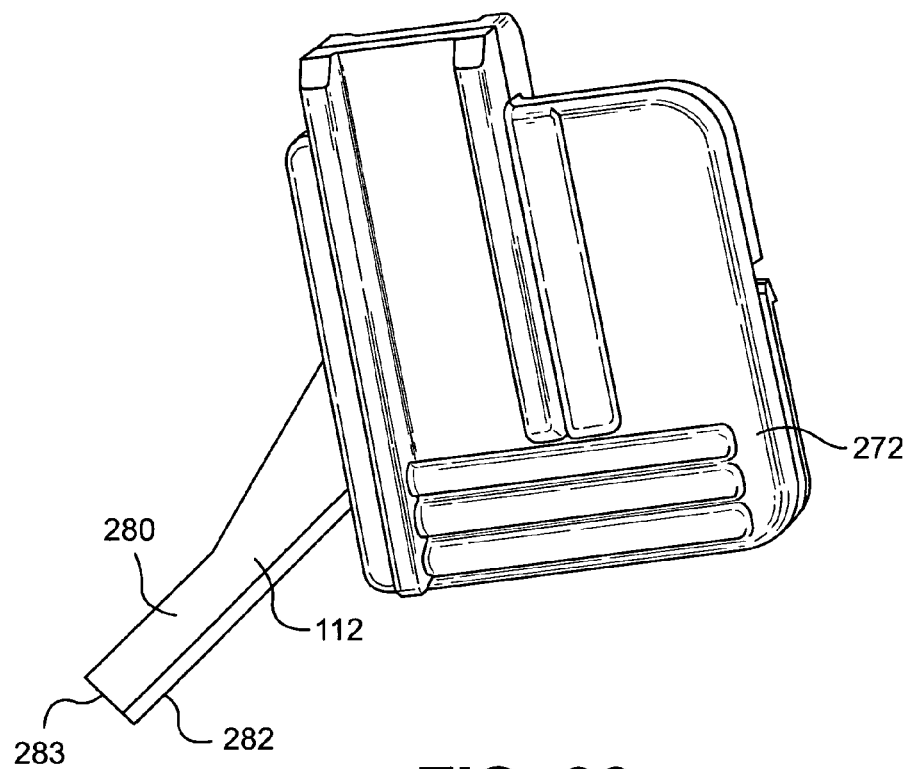
FIG. 28 illustrates a blade and blade holder according to an embodiment of the present invention.

In one embodiment, as depicted in FIG. 28, the cutting member 112 may be held by a cutting member holder 272. In one embodiment, the cutting member holder 272 may be a two-piece structure wherein the cutting member 112 is held within the two pieces. In another embodiment, the cutting member 112 may be attached to, or integrally molded into, one-half of the two-piece structure (see FIG. 29). In yet another embodiment, the cutting member holder 272 may be a one-piece structure and the cutting member 112 is integrally molded within the one-piece structure. When a two-piece structure is used, the two halves may be joined by any method known to those of ordinary skill in the art, including, but not limited to, adhesives, sonic welding, and snap-lock.

Figure 30:
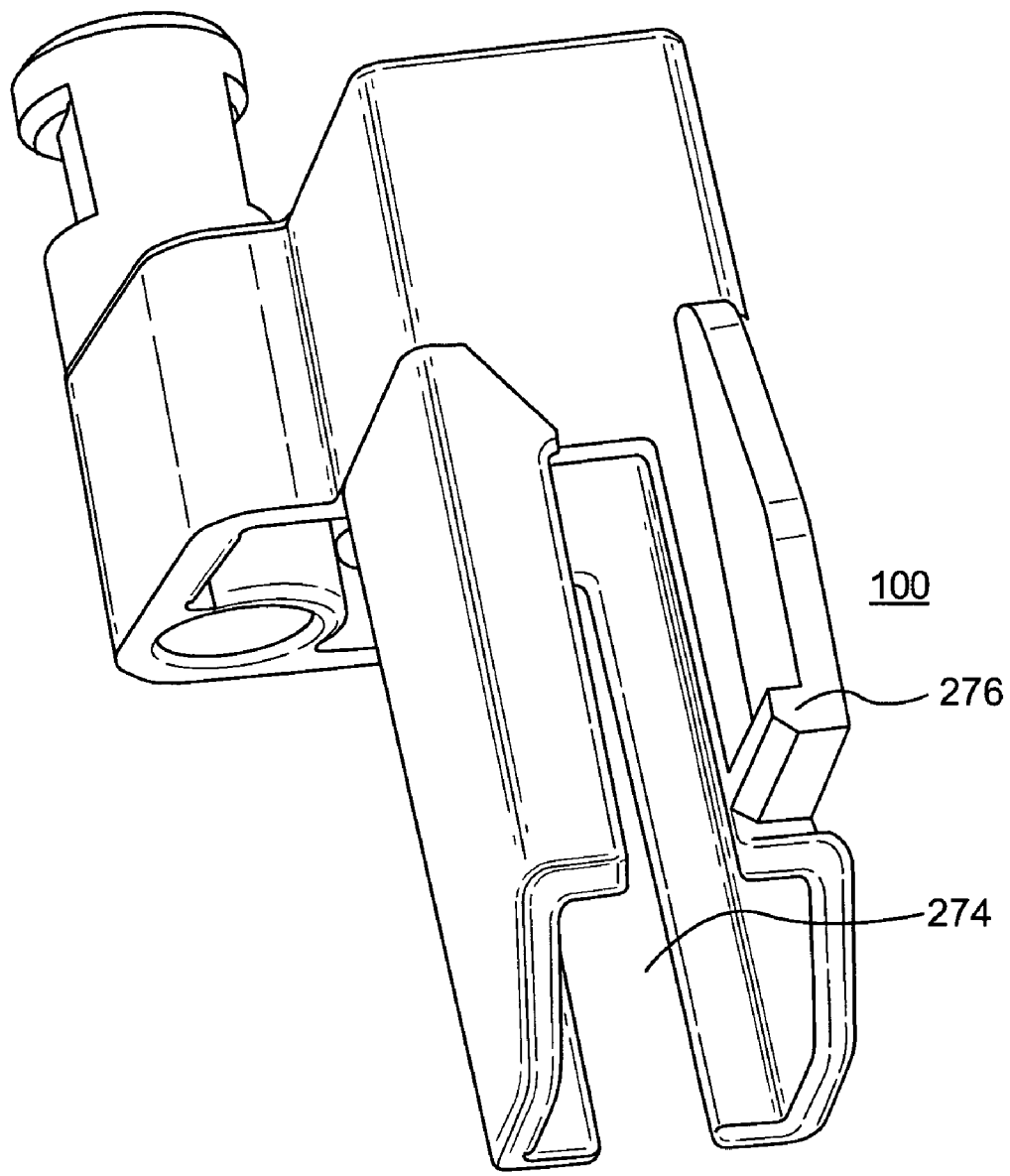
FIG. 30 illustrates a portion of a cutting member assembly according to an embodiment of the present invention.

In one embodiment, the cutting member holder 272 is capable of being manually inserted into and removed from the cutting member assembly 100. As shown in FIG. 30, the cutting member assembly 100 may have a receiving orifice 274 that is capable of receiving the cutting member holder 272. The receiving orifice 274 may have a protrusion 276 that is capable of being in lockable communication with a holder protrusion 278 located on the body of the cutting member holder 272. In operation, when the cutting member holder 272 is fully inserted into the receiving orifice 274, the orifice protrusion 276 may overlap the holder protrusion 278, thereby positively holding the cutting member holder 272 in place. Those of ordinary skill in the art will appreciate that there are various other structures and methods that can be employed to positively hold the cutting member holder in the receiving orifice.

Figure 29:
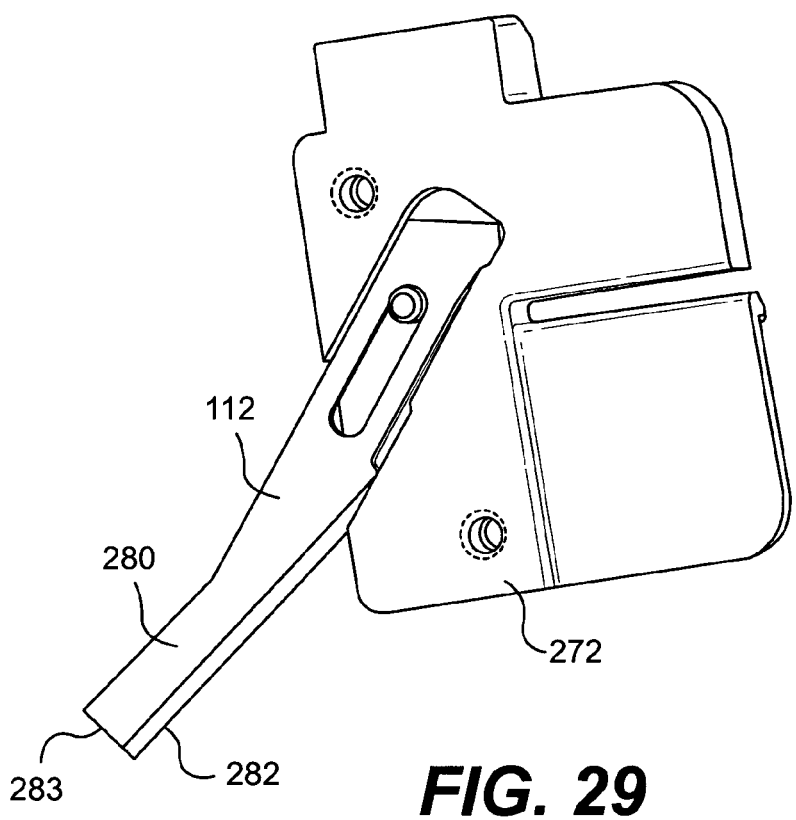
FIG. 29 is another view of a blade and blade holder according to an embodiment of the present invention.

In the embodiment depicted in FIGS. 28–29, the leading edge 282 of the cutting member 112 may have a double beveled edge to provide a sharp edge for cutting the film. Moreover, the cutting member 112 may have a substantially rectangular body portion 280 in the cutting area, such that the leading edge 282 and the trailing edge 283 meet at a substantially right angle.

Each cutting member assembly 100 and, hence, each cutting member 112 may be oriented such that the cutting end of the cutting member 112 lies between the wheels 104 of a wheel assembly 98 when the web cutter 92 is at rest. Moreover, when the web cutter 92 is at rest, the cutting members 112 can be prevented from extending below the wheels 104. In particular, at rest, the posts 108 can be in contact with the fixed ring 84. According to one embodiment, when the web cutter 92 is engaged, i.e., capable of cutting the film 20, as described below, the cutting members 112 may be allowed to protrude below the wheels 104 because the cutting member assembly 100 is moved vertically away from the fixed ring 84 allowing the wheel assembly 98 to retract.

As noted previously, the lower plate 88 may be positioned beneath the modular rotational assembly 22. The lower plate 88 may have an opening 90 for receiving an open-topped beverage container 16. The opening 90 may be substantially circular. In one embodiment, the opening 90 has a diameter slightly larger than the outside brim 18 diameter of the largest beverage container 16 to be lidded with the device, for example 4.25". When a web cutter 92 is included in the system, the lower plate 88 may heave a cutting groove 114 (see FIG. 9) that is capable of receiving one or more cutting members 112. The cutting groove 114 may be substantially circular. The modular rotational assembly 22 and the lower plate 88 may be oriented such that the cutting members 112 are capable of traveling in the cutting groove 114.

In the embodiment depicted in FIG. 9, the web cutter 92 may include the glass clamp 116. The glass clamp 116 may be interposed between the solenoid 94 and the activation plate 118. In particular, the solenoid 94 may be positioned above and in contact with a first end of the glass clamp 116 and the protective optical element 34 is in contact with a second end of the glass clamp 116.

The film 20 may be disposed between the lower plate 88 and the modular rotational assembly 22. In particular, as most clearly shown in FIG. 9, the film 20 may be located between the lower plate 88 and the wheels 104 of the wheel assembly 98. According to one embodiment, when the web cutter 92 is in the stand-by mode, the wheels 104 should not contact with the film 20, and the cutting members 112 should not protrude below the wheels 104. In addition, because the cutting members 112 should not protrude below the wheels 104, the cutting members 112 are prevented from coming into contact with or cutting an operator.

The modularity of the rotational assembly 22, discussed above, allows for the removal of the modular rotational assembly 22 for servicing and maintenance, as well as its replacement in the lidding system with a spare modular rotational assembly 22. In addition, because of the protection from the cutting members 112 provided by the wheels 104, the modular rotational assembly 22 can be removed without exposing the operator to the risk of being cut. In particular, prior to removal of the modular rotational assembly 22, clips (not shown) can be placed on the exposed portion 111 of the wheel assembly posts 108, thereby preventing the wheels 104 from being pushed upwards and exposing the cutting members 112.

Figure 31:
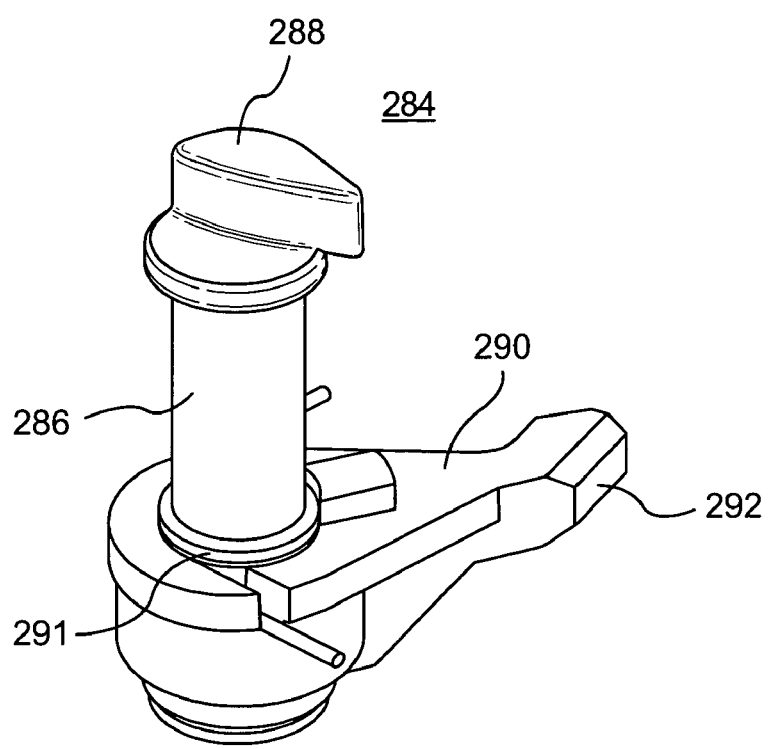
FIG. 31 illustrates a wheel retraction stopper means according to an embodiment of the present invention.

In one embodiment, the modular rotational assembly 22 may include positively biased and pivotable wheel retraction stopper means 284. In particular, as depicted in FIGS. 14 and 31, the wheel retraction stopper means 284, which is in communication with the upper plate 24, may include a cylindrical housing 286 having a pivot driver 288 located at one end that extends above the upper plate 24 and a stopper piece 290 located at the opposite end. In the embodiment depicted in FIG. 14, the pivot driver 288 has a length and a width, the length being dimensionally longer than the width. The cylindrical housing 286 may include a biasing means 291 that forces a finger portion 292 (see FIG. 31) of the stopper piece 290 to contact the exposed portion of the wheel assembly posts 108, thereby preventing the wheels 104 from being pushed upwards and exposing the cutting members 112. The biasing means 291 should provide torsional biasing force to the stopper piece 290. In one embodiment, the biasing means 291 is a torsion spring. Those of ordinary skill in the art will understand that there are other methods that can provide the appropriate torsional biasing force to the stopper piece. Other such methods will be readily apparent to the skilled artisan and may be used in the present invention.

In operation, when the modular rotational assembly 22 is disengaged from the driver 48, the stopper piece 290 contacts the exposed portion of the wheel assembly posts 108, thereby preventing the wheels 104 from being pushed upwards and exposing the cutting members 112. As such, when the modular rotational assembly 22 is removed, the risk of injury to the person removing the assembly is reduced, as the cutting members 112 are prevented from extending below the wheels 104. When the modular rotational assembly 22 is placed into communication with the driver 48, prior to rotating the assembly 22 into engagement with the driver 48, the pivot driver 288 may be received by a pivot driver receiving portion 294 (see FIG. 15) located on the driver 48. As shown in FIG. 15, the pivot driver receiving portion 294 may have an opening 296 at one end that mimics the shape of the pivot driver 288, and an elongated portion 298 having a width that is dimensionally shorter than the length of the pivot driver 288. When the modular rotational assembly 22 is rotated into place, the pivot driver 288 may slide from the opening 296 to the elongated portion 298, causing the pivot driver 288 to turn, thereby rotating the stopper piece 290 to rotate away from the post 108 and allowing the post 108, and hence the wheels 104, to be pushed upwards and expose the cutting members 112. Those of ordinary skill in the art will understand that there are other means available for pivoting the stopper piece away from the post and thereby allowing vertical movement of the wheels.

The operation of the web cutter 92 will now be discussed. After an open-topped container, such as a beverage container 16, has been lidded, the film 20 is advanced to the web cutter 92 for preparation, i.e., cutting, of the next lid. The web cutter 92 may include a sensor 122 (see FIGS. 5 and 12). As the film 20 is advanced, the sensor 122 may determine the location of an eye mark (not shown) on the film 20. When the eye mark reaches a specified location, the sensor 122 may cause the movement of the film 20 to stop and, in addition, activate the web cutter 92 program, which is operated by a controller.

According to the web cutter 92 program, the solenoid 94, which is positioned above and in contact with the glass clamp 116, may push downward on the glass clamp 116, thereby forcing the modular rotational assembly 22 downward. The downward force is transferred to the modular rotational assembly 22 through the vertical alignment mounting bracket 136. As the upper plate 24 and the modular rotational assembly 22 travel downward, the wheels 104 of the wheel assemblies 98 contact the lower plate 88, thereby stopping the vertical travel of the wheels 104. To allow the upper plate 24 and the modular rotational assembly 22 to continue to travel downward, the wheel assembly posts 108 may extend through the upper plate 24. The travel of the upper plate 24 and the modular rotational assembly 22 may continue until the protective optical element 34 contacts the lower plate 88. While the wheels 104 may be prevented from further travel by the lower plate 88, the cutting members 112 may travel further to extend below the wheels 104 and into the lower plate cutting groove 114. The web cutter 92 is now in the operating position.

Once in the operating position, the driver 48 is activated, causing the modular rotational assembly 22, along with the one or more cutting members 112, to rotate. Those of ordinary skill in the art will understand that the rotation of the modular rotational assembly 22 can also start at the same time that the solenoid 94 is activated. As the cutting members 112 rotate, the film 20 is cut. The wheels 104 may provide tension on the film 20 as it is being cut. In particular, because one wheel 104 of each wheel assembly 98 is located on either side of the cutting member 112, as the film 20 is cut, the wheels 104 may hold the film 20 in position. The degree of rotation of the modular rotational assembly 22 is determined by the number of cutting members 112 used. For instance, if two cutting members 112 are used, the driver 48 should rotate at least 180 degrees, that is, at least one-half of the circumference. On the other hand, if five cutting members 112 are used, the driver 48 need only travel at least seventy-two degrees, or at least one-fifth of the circumference.

Once the film 20 has been cut, the cutting assembly 100 may retract to its rest position. An open-topped container 16 can then be lifted through the opening 90 in the lower plate 88, thereby contacting the film 20, and initiating the sealing process, as described above.

Figure 12:
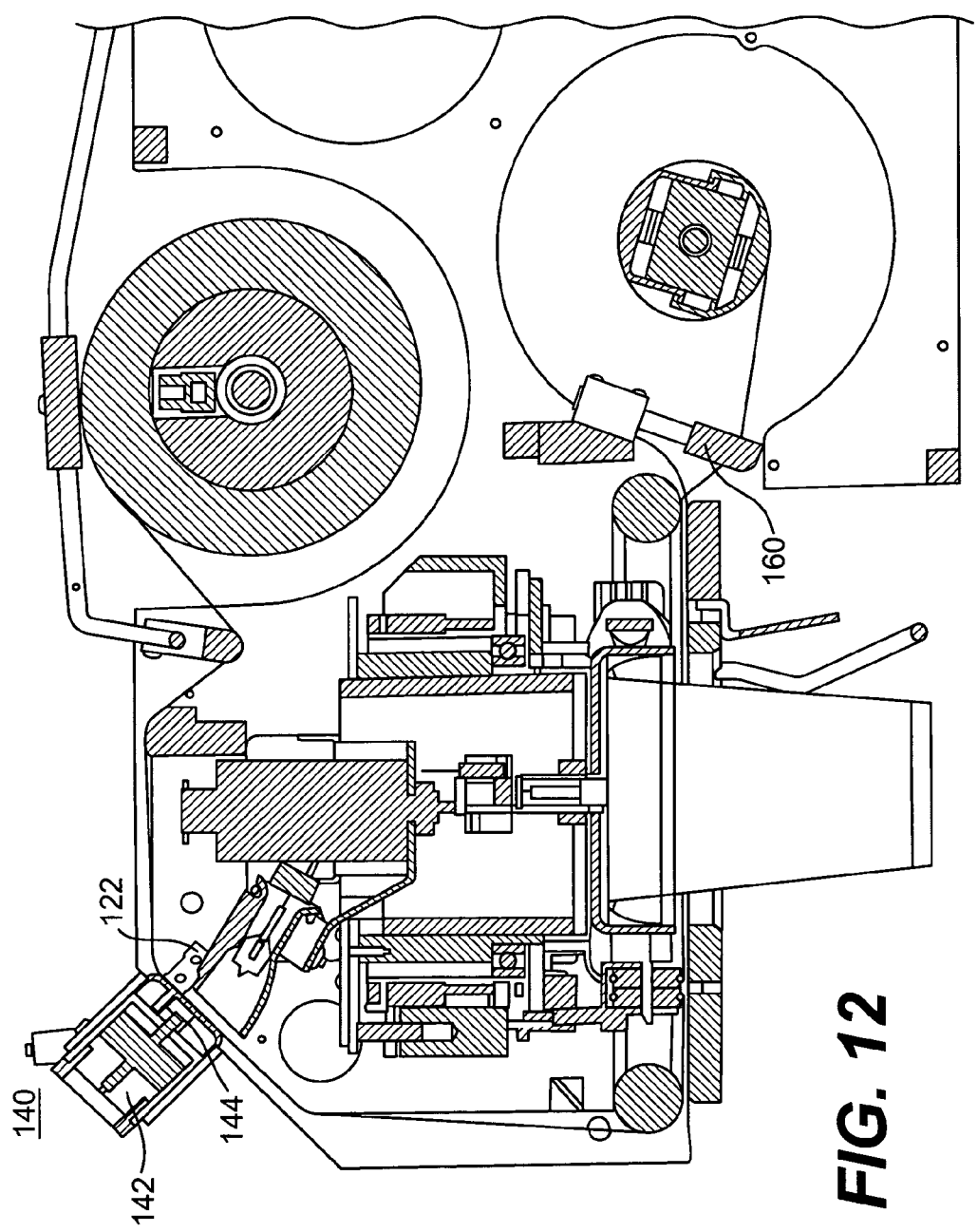
FIG. 12 is a cut away view of a lidding system including a perforation assembly according to an embodiment of the present invention.

In another embodiment, the lidding system 40 may include a perforation assembly 140. When the beverage in the container being lidded is carbonated, gases can build, thereby possibly deteriorating the sealing strength or appearance of the lid. Accordingly, it may be desirable to allow for the release of these gases. One method for releasing the gases that has been effective is to puncture, or provide a slit in, the film 20 prior to lidding. In one embodiment, as depicted in FIG. 12, the perforation assembly 140 may include a solenoid 142 and a perforation blade 144. The perforation assembly 140 may also be located exterior of the lidding system 40. After the film 20 is advanced to the cutting position, the solenoid 142 may be activated, causing the blade 144 to puncture the film 20. In this embodiment, the solenoid 140 acts downwardly on the blade 144, thereby pushing the blade 144 into the film 20 such that it punctures the film 20.

Figure 32:
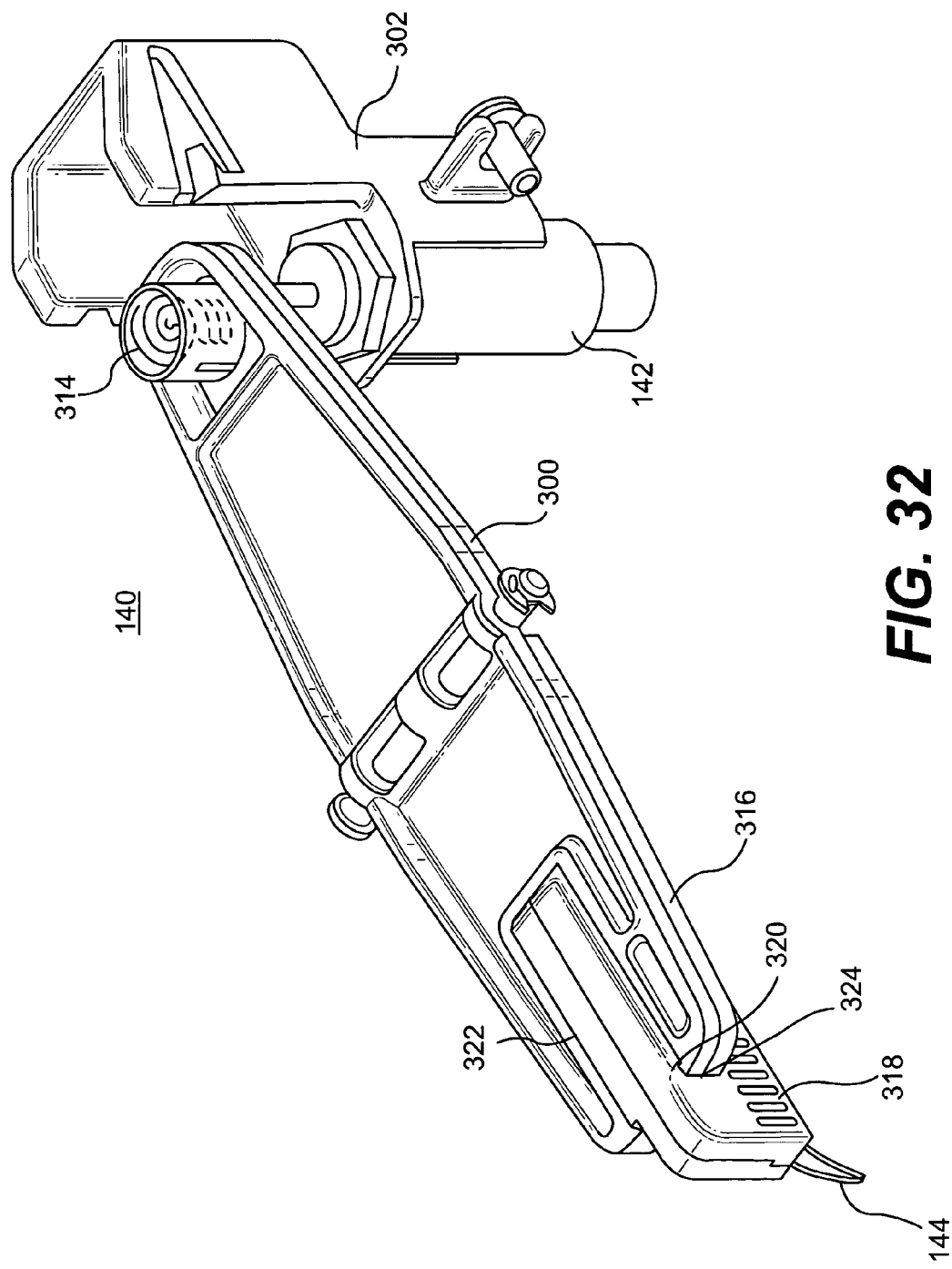
FIG. 32 illustrates a perforation assembly according to an embodiment of the present invention.
Figure 33:
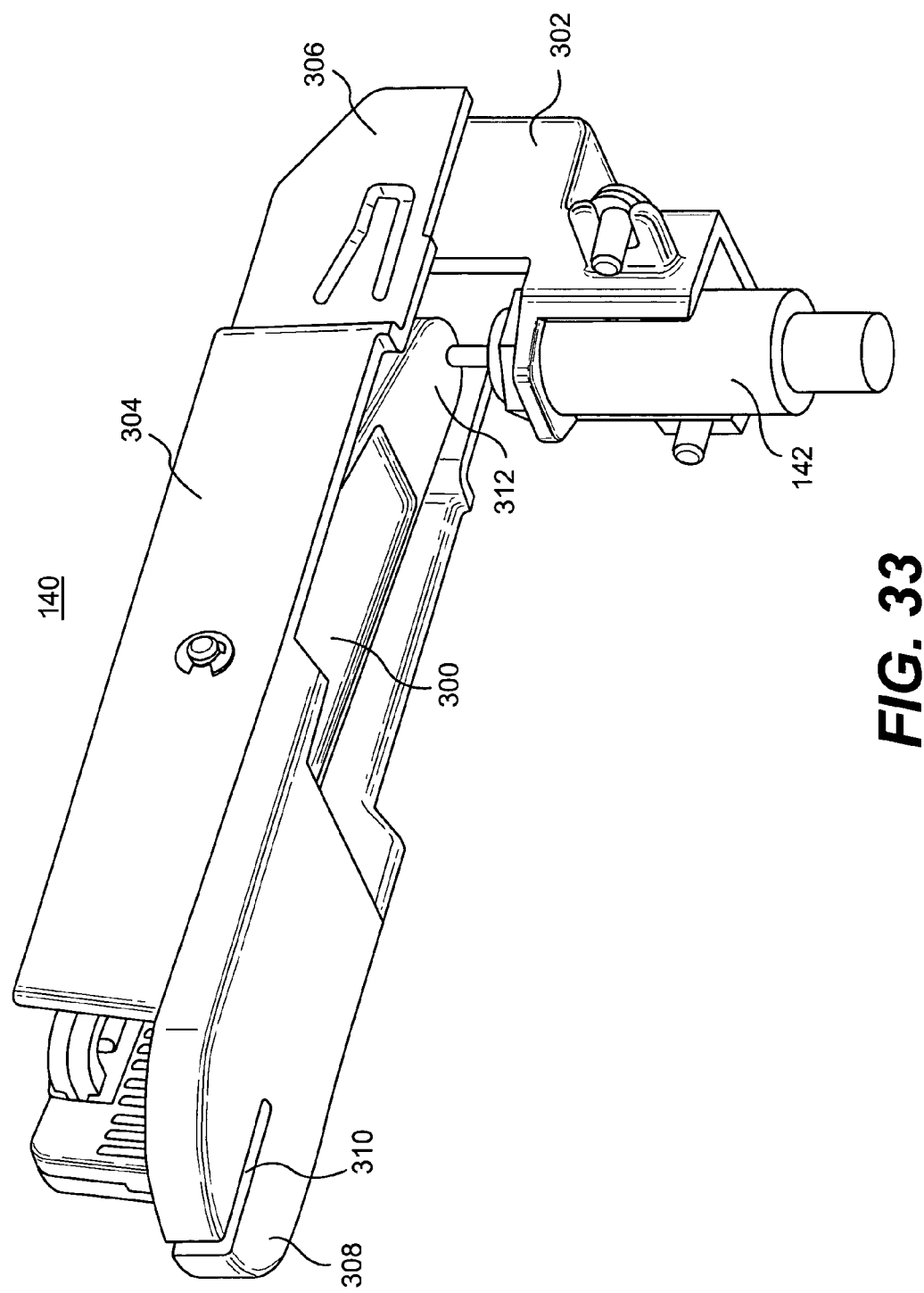
FIG. 33 is another view of the perforation assembly depicted in FIG. 32.
Figure 34:
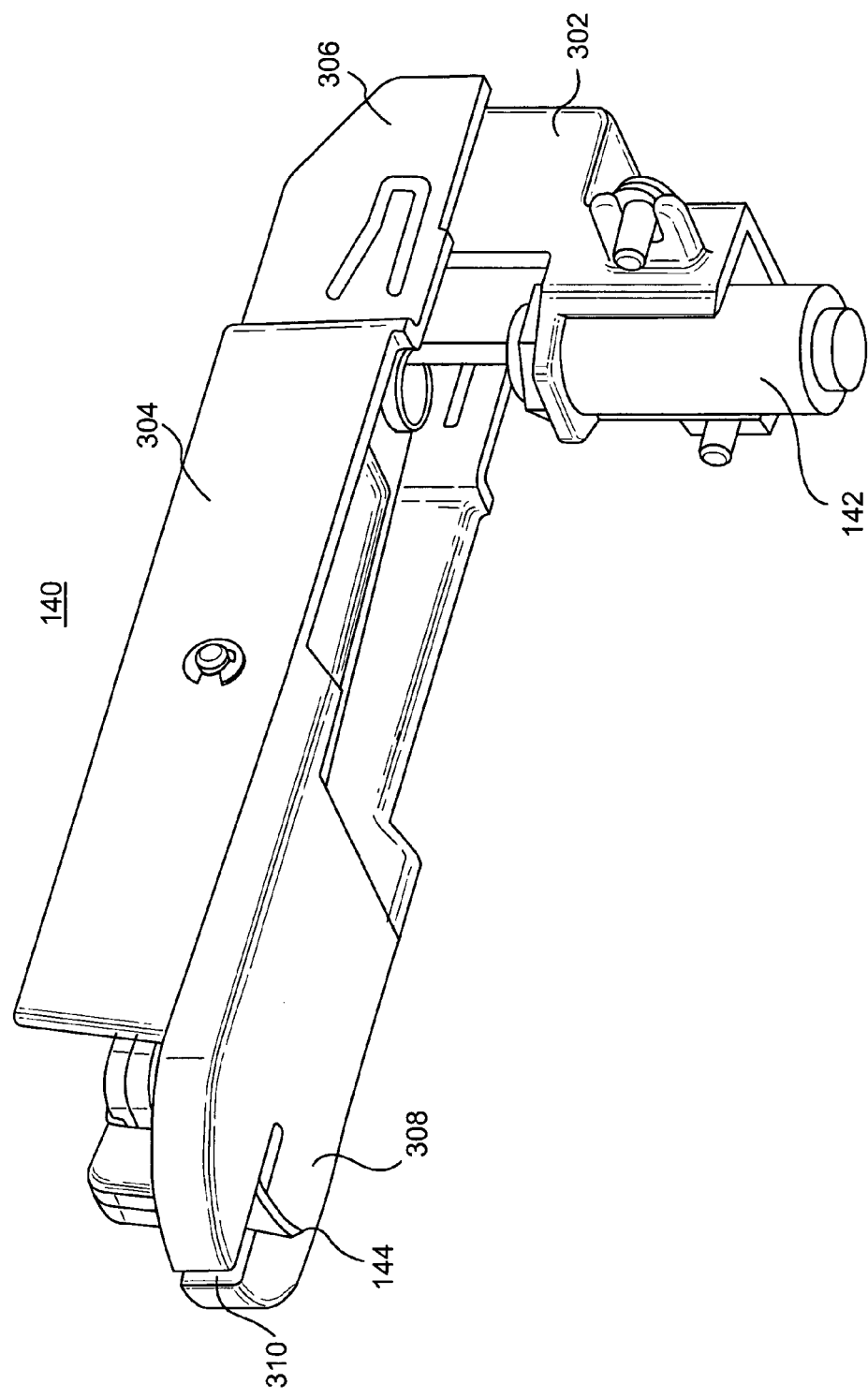
FIG. 34 is yet another view of the perforation assembly depicted in FIG. 32.

In another embodiment, depicted in FIG. 32, the perforation assembly 140 may include a solenoid 142, a pivotally mounted perforation arm 300, and a perforation blade 144. In particular, the solenoid 142 may be housed in a solenoid mounting bracket 302, which may be fixedly attached to the frame (not shown). As shown in FIGS. 33–34, at an upper end, the mounting bracket 3022 may be in communication with a perforation blade guard 304. A first end 306 of the blade guard 304 may be pivotally attached to the mounting bracket 302, and a second end 308 of the blade guard 304 may have a recessed portion 310. As shown in FIGS. 33–34, the perforation arm 300 may be pivotally mounted to the perforation blade guard 304. A first end 312 of the perforation arm 300 may be in communication with the solenoid 142. The first end 312 of the perforation arm 300 may be downwardly biased against the solenoid 142 by a spring 314 (see FIG. 32), or other means known to those of ordinary skill in the art for providing a biasing force. A second end 316 of the perforation arm 300 may be in communication with the perforation blade 144. The perforation blade 144 depicted in FIG. 32 is a standard sickle-shaped surgical blade, although any blade capable of puncturing the film 20 may be used.

In one embodiment as depicted in FIG. 32, the blade 144 may be held by a blade holder 318, the blade holder 318 in direct communication with the perforation arm 300. In one embodiment, the blade holder 318 may be a two-piece structure wherein the blade 144 is held within the two pieces. In another embodiment, the blade 144 may be integrally molded to one-half of the two-piece structure. In yet another embodiment, the blade holder 318 may be a one-piece structure and the blade 144 is integrally molded within the one-piece structure. When a two-piece structure is used, the two halves of the blade holder can be connected by snap-lock means, adhesive, sonic welding, or other methods know to those of ordinary skill in the art. Those of ordinary skill in the art will understand that there are other methods for puncturing the film to allow for escape of gas. Moreover, those of ordinary skill in the art will appreciate that gas permeable films could be used with the present invention.

In one embodiment, the blade holder 318 is capable of being positively held by the perforation arm 300. In particular, as shown in FIG. 32, the blade holder may have protrusions 320. In addition the perforation arm 300 may have a receiving slot 322, where the distal ends of the arms of the slot 322 have holding members 324. In operation, the blade holder 318 may be inserted into the receiving slot 322 such that the holding members 324 are in an overlapping relationship with the blade holder protrusions 320, thereby positively holding the blade holder 318 in position.

As described above, after the film 20 is advanced to the cutting position, the solenoid 142 may be activated. When the solenoid 142 is activated, the solenoid 142 acts upwardly on the perforation arm 300. The perforation arm 300 pivots about its axis, bringing the blade 144 into contact with the film 20.

Figure 13:
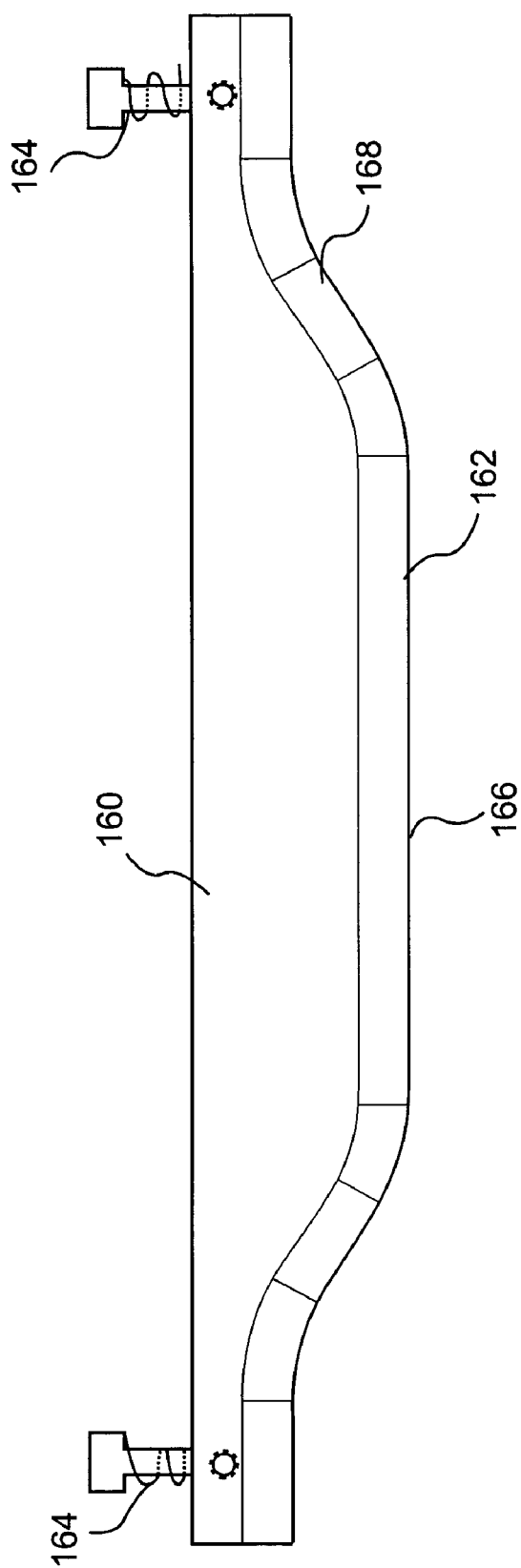
FIG. 13 is a view of a guide portion for use with a lidding system according to the present invention.

In yet another embodiment of the present invention, as depicted in FIGS. 12–13, the lidding system 40 may include a film guide 160 for controlling the movement of the film 20 and for keeping the film 20 in proper alignment as it is being transferred from the web cutter 92 to the take-up reel 44. This guide 160 is designed to effectively control alignment of both a continuous film, as well as a non-continuous film, e.g., a film having cutouts.

Figure 35:
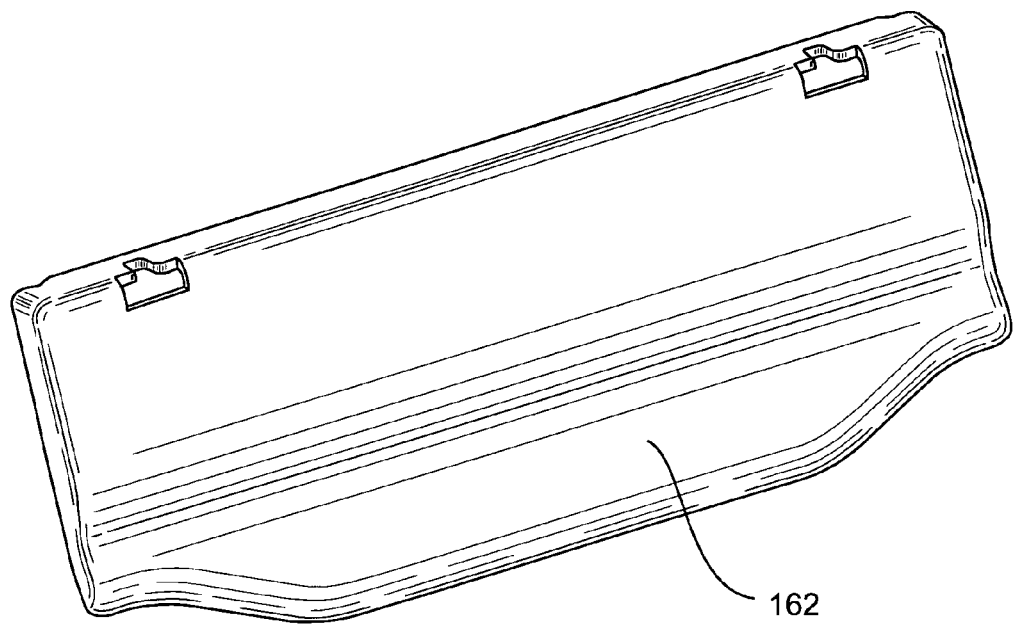
FIG. 35 illustrates a trapezoidally-shaped guide portion according to an embodiment of the present invention.

As seen in FIG. 13, the film guide 160 may comprise a generally trapezoidally-shaped guide portion 162. According to one embodiment, the film guide 160 may be mounted substantially perpendicularly to the machine direction of the film 20. In one embodiment, the film guide 160 is mounted on spring-like means 164 such that the film guide 160 is capable of moving up and down to accommodate the film 20 as it travels to the take-up reel 44. In another embodiment, the trapezoidally-shaped guide portion 162 can be mounted on an axis having pivot ends (not shown), thereby allowing the trapezoidally-shaped guide portion 162 to pivot about the axis so as to maintain a proper guiding position of the web regardless of whether a continuous film 20 or a film 20 with cutouts is being guided. In still yet another embodiment, as depicted in FIG. 35, the trapeziodally-shaped guide portion 162 is a single, fixed piece. The upper portion 166 of the trapezoidally-shaped guide portion 162 may be dimensioned such that it is shorter in length than the diameter of a cutout portion of the film 20. Thus, when the film having cutout portions passes over the film guide 160, the upper portion 166 may protrude through the cutout portion and the outer edges of the cutout portion may contact the angular side portions 168 of the trapezoidally-shaped guide portion 162. When the angular side portions 168 are in contact with the film 20, the film 20 may be forced outward, thereby maintaining proper tension and alignment of the film 20. When proper tension and alignment of the film 20 is maintained, the film 20 can be smoothly transferred to the take-up reel 44.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for heat-shrinking a film onto an open-topped container including:
   at least one reflective cup having a reflective interior surface; and
   at least one radiant energy source, the at least one reflective cup and the at least one radiant energy source being rotationally mounted to allow the at least one reflective cup to rotate around a central axis while simultaneously directing radiant energy from the at least one radiant energy source toward the central axis,
   wherein the interior surface of the reflective cup has at least an elliptical portion and a parabolic portion.

2. The heat shrinking system according to claim 1 including at least two reflective cups.

3. The heat shrinking system according to claim 1 including at least three reflective cups.

4. The heat shrinking system according to claim 1 further including a protective optical element.

5. The heat shrinking system according to claim 4 wherein the protective optical element is plastic.

6. The heat shrinking system according to claim 4 wherein the protective optical element is glass.

7. The heat shrinking system according to claim 1 wherein the interior surface of the at least one reflective cup is coated with a material to enhance surface reflectivity.

8. The heat shrinking system according to claim 7 wherein the interior surface of the at least one reflective cup is coated with a gold or silver metallic reflective surface.

9. The heat shrinking system according to claim 1 wherein the at least one reflective cup has cooling fins.

10. The heat shrinking system according to claim 1 wherein the at least one radiant energy source is pre-heated.

11. The heat shrinking system according to claim 1 further including a marking means.

12. The heat shrinking system according to claim 11 wherein the marking means is a straw-hole lamp.

13. The heat shrinking system according to claim 12 wherein the straw-hole lamp is pre-heated.

14. The heat shrinking system according to claim 12 wherein the straw-hole lamp further includes a reflective cup.

15. The heat shrinking system according to claim 14 wherein the straw-hole lamp further including a reflective cup has cooling fins.

16. The heat shrinking system according to claim 14 wherein an inner reflective surface of the straw-hole lamp further including a reflective cup is substantially ellipsoidal.

17. The heat shrinking system according to claim 12 wherein the straw-hole lamp is capable of imparting radiant energy on a selected radiant energy absorbing area on the film.

18. The heat shrinking system according to claim 17 wherein the straw-hole lamp is capable of imparting onto the film a weakened area having a strengthening annulus surrounding the weakened area.

19. The heat shrinking system according to claim 1 further including a radiant energy drink marking system.

20. The heat shrinking system according to claim 19 wherein the radiant energy drink marking system includes at least one fixed radiant energy assembly, including a drink marking radiant energy source capable of imparting radiant energy, the fixed radiant energy assembly capable of directing radiant energy to a surface of the film.

21. The heat shrinking system according to claim 20, the at least one fixed radiant energy assembly further including a drink marking reflective cup and a drink marking reflective cup housing.

22. The heat shrinking system according to claim 21 wherein the drink marking reflective cup housing is elongated and wherein the elongated drink marking reflective cup housing has cooling fins.

23. The heat shrinking system according to claim 21 wherein an inner surface of the drink marking reflective cup is substantially ellipsoidal.

24. The heat shrinking system according to claim 20 including at least two fixed radiant energy assemblies.

25. The heat shrinking system according to claim 20 including four fixed radiant energy assemblies.

26. The heat shrinking system according to claim 20 wherein the film has at least one indicia for indicating drink type on a surface thereof.

27. The heat shrinking system according to claim 26 wherein the at least one indicia is selected from the group consisting of "soda", "diet", "cola", "water", "orange", and "other".

28. The heat shrinking system according to claim 26 wherein the at least one indicia includes a radiant energy absorbent area.

29. The heat shrinking system according to claim 26 wherein the at least one fixed radiant energy assembly is located in proximity to the at least one indicia, and wherein the radiant energy imparted from the at least one fixed radiant energy assembly is capable of impinging its proximate indicia.

30. The heat shrinking system according to claim 20, wherein the drink marking radiant energy source is pre-heated.

31. The heat shrinking system according to claim 1 further including a film brake and tension controller.

32. The heat shrinking system according to claim 31 wherein the film brake and tension controller includes:
   a substantially U-shaped mechanical arm having a first end and a second end, the second end forming a cross bar; and
   a force applying means.

33. The heat shrinking system according to claim 32 wherein the force applying means is a weight.

34. The heat shrinking system according to claim 32 wherein the force applying means is a spring.

35. The heat shrinking system according to claim 32 wherein the cross bar is at least slightly V-shaped.

36. The heat shrinking system according to claim 32 further including a guide bar, the guide bar being in communication with the cross bar.

37. The heat shrinking system according to claim 36 wherein the guide bar is at least slightly V-shaped.

38. The heat shrinking system according to claim 32 wherein the first end of the mechanical arm has pivot ends.

39. The heat shrinking system according to claim 32 wherein the second end is at an angular orientation to the first end.

40. The heat shrinking system according to claim 33 wherein the force applying means has a mass of about 1.5 to about 3.5 lbs.

41. The heat shrinking system according to claim 1 further including a web cutter.

42. The heat shrinking system according to claim 41 wherein the web cutter includes:
   at least one wheel assembly, wherein the wheel assembly includes a wheel housing and at least two wheel members; and
   at least one cutting member disposed between the at least two wheel members,
   wherein the at least one wheel assembly has a first position wherein the at least one cutting member does not extend below the at least two wheel members and a second position wherein the at least one cutting member extends below the at least two wheel members.

43. The heat shrinking system according to claim 42 wherein the web cutter further includes an upper plate having at least one receiving hole, and wherein the at least one wheel assembly includes at least one post that is in slideable communication with the at least one receiving hole, and wherein the at least one cutting member is in fixed communication with the upper plate.

44. The heat shrinking system according to claim 43, the web cutter further including:
   a top plate;
   a vertical alignment mounting bracket, wherein the vertical alignment mounting bracket is in communication with the top plate and in communication with the upper plate; and a fixed ring, wherein the fixed ring is capable of being in communication with a distal end of the at least one post.

45. The heat shrinking system according to claim 44, the web cutter further including a fixed ring recess in the fixed ring, wherein the fixed ring recess is capable of receiving a top plate positioning member, and wherein the top plate positioning member is in fixed communication with the top plate.

46. The heat shrinking system according to claim 45, the web cutter further including a spring member, wherein the spring member is capable of maintaining a separating force between the top plate and the fixed ring.

47. The heat shrinking system according to claim 44, the web cutter further including a lower plate.

48. The heat shrinking system according to claim 47, wherein the lower plate has a cutting groove capable of receiving the cutting member.

49. The heat shrinking system according to claim 47, wherein the lower plate has an opening capable of receiving an open-topped container.

50. The heat shrinking system according to claim 44, the web cutter further including a glass clamp in communication with the vertical alignment bracket.

51. The heat shrinking system according to claim 50, the web cutter further including a solenoid in communication with the glass clamp and capable of exerting a downward force on the glass clamp.

52. The heat shrinking system according to claim 43 further including a driver in communication with the upper plate, the driver capable of providing rotational movement to the upper plate.

53. The heat shrinking system according to claim 42 wherein the web cutter includes at least two wheel assemblies.

54. The heat shrinking system according to claim 42 wherein the web cutter includes at least three wheel assemblies.

55. The heat shrinking system according to claim 42 wherein the web cutter includes at least two cutting members.

56. The heat shrinking system according to claim 42 wherein the web cutter includes at least three cutting members.

57. The heat shrinking system according to claim 42 wherein the at least two wheel members are rotatably mounted on an axis.

58. The heat shrinking system according to claim 41 wherein the web cutter includes:
a modular rotational assembly, wherein the modular rotational assembly includes an upper plate having at least one receiving hole, at least one wheel assembly, wherein the at least one wheel assembly includes a wheel housing and at least two wheel members, and at least one cutting member disposed between the at least two wheel members,
wherein the at least one wheel assembly has a first position wherein the at least one cutting member does not extend below the at least two wheel members and a second position wherein the at least one cutting member extends below the at least two wheel members.

59. The heat shrinking system according to claim 58 wherein the at least one wheel assembly includes at least one post that is in slideable communication with the at least one receiving hole, and wherein the at least one cutting member is in fixed communication with the upper plate.

60. The heat shrinking system according to claim 58 wherein the web cutter includes at least two wheel assemblies.

61. The heat shrinking system according to claim 58 wherein the web cutter includes at least three wheel assemblies.

62. The heat shrinking system according to claim 58 wherein the web cutter includes at least two cutting members.

63. The heat shrinking system according to claim 58 wherein the web cutter includes at least three cutting members.

64. The heat shrinking system according to claim 58 wherein the at least two wheel members are rotatably mounted on an axis.

65. The heat shrinking system according to claim 58 wherein the at least one cutting member is housed within at least one cutting member assembly, wherein an upper portion of the at least one cutting member assembly extends above the upper plate.

66. The heat shrinking system according to claim 58 wherein the upper portion of the at least one cutting member is a locking post.

67. The heat shrinking system according to claim 66 further including a driver, and wherein the modular rotational assembly is slideably connectable to the driver.

68. The heat shrinking system according to claim 67 wherein the modular rotational assembly further includes at least two locking posts and the driver further includes at least two detents capable of receiving the at least two locking posts.

69. The heat shrinking system according to claim 58 further including at least one wheel retraction stopper means capable of holding the at least two wheel members in the first position when the modular rotational assembly is removed from the heat shrinking system.

70. The heat shrinking system according to claim 69 wherein the at least one wheel retraction stopper means includes a cylindrical housing, a pivot driver located at a first end of the cylindrical housing and extending above the upper plate, and a stopper piece located at a second end of the cylindrical housing.

71. The heat shrinking system according to claim 70 wherein the stopper piece is positively biased to contact a wheel assembly post.

72. The heat shrinking system according to claim 71 further including a driver, wherein the driver further includes openings capable of receiving the pivot driver.

73. The heat shrinking system according to claim 72 wherein the stopper piece is capable of being moved away from the post when the pivot driver is received in at least one of the openings.

74. The heat shrinking system according to claim 1 further including a perforation assembly.

75. The heat shrinking system according to claim 74 wherein the perforation assembly includes a solenoid, a pivotally mounted perforation arm, and a perforation blade, wherein the solenoid is capable of displacing the perforation arm.

76. The heat shrinking system according to claim 43 further including a perforation blade guard.

77. The heat shrinking system according to claim 43 wherein the pivotally mounted perforation arm is downwardly biased against the solenoid.

78. The heat shrinking system according to claim 43 wherein an end of the perforation blade is housed in a blade holder.

79. The heat shrinking system according to claim 46 wherein the perforation blade is integrally molded to the blade holder.

80. The heat shrinking system according to claim 46 wherein the perforation arm is capable of positively holding the blade holder.

81. The heat shrinking system according to claim 1 further including a film guide.

82. A system for heat-shrinking a film onto an open-topped container including:
   a modular rotational assembly, the modular rotational assembly including at least one reflective cup having a reflective interior surface, and at least one radiant energy source,
   wherein the interior surface of the at least one reflective cup has at least an elliptical portion and a parabolic portion, and
   wherein the at least one reflective cup and the at least one radiant energy source are rotationally mounted to allow the at least one reflective cup to rotate around a central axis while simultaneously directing radiant energy from the at least one radiant energy source toward the central axis.

83. The heat shrinking system according to claim 82 including at least two reflective cups.

84. The heat shrinking system according to claim 82 including at least three reflective cups.

85. The heat shrinking system according to claim 82 further including a protective optical element.

86. The heat shrinking system according to claim 85 wherein the protective optical element is plastic.

87. The heat shrinking system according to claim 85 wherein the protective optical element is glass.

88. The heat shrinking system according to claim 82 wherein the interior surface of the at least one reflective cup is coated with a material to enhance surface reflectivity.

89. The heat shrinking system according to claim 82 wherein the interior surface of the at least one reflective cup is coated with a gold or silver metallic reflective surface.

90. The heat shrinking system according to claim 82 further including a perforation assembly.

91. The heat shrinking system according to claim 82 further including a film guide.

92. The heat shrinking system according to claim 82 further including a driver, and wherein the modular rotational assembly is slideably connectable to the driver.

93. The heat shrinking system according to claim 82 wherein the modular rotational assembly further includes at least two locking posts and the driver further includes at least two detents capable of receiving the at least two locking posts.

94. A system for heat-shrinking a film onto an open-topped container including at least one reflective cup having a reflective interior surface wherein the interior surface of the at least one reflective cup has as least an elliptical portion and a parabolic portion, and
   wherein the at least one reflective cup is mounted to allow the at least one reflective cup to rotate around a central axis while simultaneously allowing the reflective interior surface to face the central axis.

95. The heat-shrinking system according to claim 94 wherein the reflective cup includes at least one radiant energy source.

96. The heat-shrinking system according to claim 94 further including a protective optical element, wherein the protective optical element is provided at an opening in the heat-shrinking system.

97. The heat-shrinking system according to claim 96 wherein the protective optical element is plastic.

98. The heat-shrinking system according to claim 96 wherein the protective optical element is glass.

99. The heat-shrinking system according to claim 94 wherein the interior surface of the reflective cup is coated with a material to enhance surface reflectivity.

100. The heat-shrinking system according to claim 99 wherein the interior surface of the reflective cup is coated with a gold or silver metallic reflective surface.

* * * * *